US012578558B2

(12) United States Patent
Tsai et al.

(10) Patent No.: US 12,578,558 B2
(45) Date of Patent: Mar. 17, 2026

(54) IMAGING LENS MODULE AND ELECTRONIC DEVICE

(71) Applicant: LARGAN PRECISION CO., LTD., Taichung City (TW)

(72) Inventors: Chun-Hua Tsai, Taichung City (TW); Chen Wei Fan, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 699 days.

(21) Appl. No.: 17/886,355

(22) Filed: Aug. 11, 2022

(65) Prior Publication Data

US 2023/0324656 A1　Oct. 12, 2023

(30) Foreign Application Priority Data

Apr. 8, 2022　(TW) .................................. 111113388

(51) Int. Cl.
　*G02B 13/00*　(2006.01)
　*G02B 7/02*　(2021.01)
(52) U.S. Cl.
　CPC ......... *G02B 13/0065* (2013.01); *G02B 7/021* (2013.01)
(58) Field of Classification Search
　CPC ............................ G02B 13/0065; G02B 7/021
　USPC ........................................................ 359/350
　See application file for complete search history.

(56) References Cited

U.S. PATENT DOCUMENTS 6,084,715 A　7/2000　Aoki et al.
6,094,315 A　7/2000　Aoki 6,178,048 B1　1/2001　Togino et al.
2005/0207038 A1*　9/2005　Inamoto ............... G02B 17/086
　　　　　　　　　　　　　　　　　　　　359/857
2015/0253576 A1　9/2015　Sugihara et al.
2015/0260988 A1　9/2015　Sugihara et al.
(Continued)

FOREIGN PATENT DOCUMENTS

CN　102981238 B　3/2016
CN　209928148 U　1/2020
(Continued)

OTHER PUBLICATIONS

Machine Translation of 2020068594 (Year: 2025).*

(Continued)

*Primary Examiner* — Jerry L Brooks

(74) *Attorney, Agent, or Firm* — Maschoff Brennan

(57) ABSTRACT

An imaging lens module includes an optical element holder being one-piece formed, a lens element and a light folding component corresponding to the lens element. Each of two side surfaces of the optical element holder has a light through hole, and light passes through the optical element holder via the light through holes. The optical element holder includes a lens element accommodation portion and a folding component accommodation portion respectively for the lens element and the light folding component to be disposed therein. The light folding component includes a light receive surface, a first reflection surface and a light exit surface. The light enters the light folding component from the light receive surface, the first reflection surface is configured to reflect the light coming from the light receive surface so as to redirect the light, and the light exits the light folding component from the light exit surface.

33 Claims, 51 Drawing Sheets

(56)          References Cited

U.S. PATENT DOCUMENTS

| | | | |
|---|---|---|---|
| 2018/0059379 A1* | 3/2018 | Chou | ................. G02B 13/0065 |
| 2021/0096338 A1 | 4/2021 | Saiga | |
| 2022/0196993 A1 | 6/2022 | Liao et al. | |

FOREIGN PATENT DOCUMENTS

| | | | | |
|---|---|---|---|---|
| CN | 108535830 | B | 5/2020 | |
| CN | 211577534 | U | 9/2020 | |
| CN | 112904529 | A | 6/2021 | |
| CN | 214225579 | U | 9/2021 | |
| CN | 214409431 | U | 10/2021 | |
| CN | 113992813 | A | 1/2022 | |
| EP | 1312968 | A1 | 5/2003 | |
| JP | H08292368 | A | 11/1996 | |
| JP | H08292371 | A | 11/1996 | |
| TW | I707188 | B | 10/2020 | |
| WO | WO-2020068594 | A1 * | 4/2020 | ........... G02B 13/007 |
| WO | WO-2022066953 | A1 * | 3/2022 | ......... G02B 13/0065 |

OTHER PUBLICATIONS

Machine Translation of 2022066953 (Year: 2025).*
European Search Report dated Sep. 8, 2023 in application No. 23160810.0.
Taiwan Office Action issued in corresponding application No. 111113388, dated May 17, 2023.

\* cited by examiner

1d

20d

34

34

10d

EL5

30d

50d

30d

IMAGING LENS MODULE AND ELECTRONIC DEVICE

RELATED APPLICATIONS

This application claims priority to Taiwan Application 111113388, filed on Apr. 8, 2022, which is incorporated by reference herein in its entirety.

BACKGROUND

Technical Field

The present disclosure relates to an imaging lens module and an electronic device, more particularly to an imaging lens module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, mobile phones equipped with optical systems are trending towards multi-functionality for various applications, and therefore the functionality requirements for the optical systems have been increasing.

Conventionally, a light folding component and a lens element of an imaging lens module are preliminarily installed on two individual retainers, and then, the two retainers are assembled. However, assembly errors usually occur in such assembly manner, and thus, the image quality would be compromised. In addition, the light folding component can be easily damaged or displaced by external forces, thus reducing the assembly reliability of the imaging lens module. Therefore, providing an imaging lens module satisfying the requirements of high image quality, high assembly accuracy of the light folding component and the lens element, and good assembly reliability of the imaging lens module is a hot topic in this field.

SUMMARY

According to one aspect of the present disclosure, an imaging lens module includes an optical element holder, at least one lens element, a light folding component and a first retaining element. The optical element holder is one-piece formed. Each of two side surfaces of the optical element holder has a light through hole, and light passes through the optical element holder via the light through holes. The optical element holder includes a lens element accommodation portion and a folding component accommodation portion. The at least one lens element is disposed in the lens element accommodation portion, and the light passes through the at least one lens element. The light folding component is disposed in the folding component accommodation portion and corresponding to the at least one lens element. The light folding component includes a light receive surface, a first reflection surface and a light exit surface. The light enters the light folding component from the light receive surface, the first reflection surface is configured to reflect the light coming from the light receive surface so as to redirect the light, and the light exits the light folding component from the light exit surface. In addition, the first retaining element has at least one corresponsive surface, and the at least one corresponsive surface is in physical contact with the light folding component.

According to another aspect of the present disclosure, an imaging lens module includes an optical element holder, at least one lens element, a light folding component and an alignment structure. The optical element holder is one-piece formed. Each of two side surfaces of the optical element holder has a light through hole, and light passes through the optical element holder via the light through holes. The optical element holder includes a lens element accommodation portion and a folding component accommodation portion. The at least one lens element is disposed in the lens element accommodation portion, and the light passes through the at least one lens element. The light folding component is disposed in the folding component accommodation portion and corresponding to the at least one lens element. The light folding component includes a light receive surface, a first reflection surface and a light exit surface. The light enters the light folding component from the light receive surface, the first reflection surface is configured to reflect the light coming from the light receive surface so as to redirect the light, and the light exits the light folding component from the light exit surface. In addition, the alignment structure is disposed on the folding component accommodation portion, and the alignment structure has at least one contact surface in physical contact with the light folding component.

According to another aspect of the present disclosure, an electronic device includes one of the aforementioned imaging lens modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
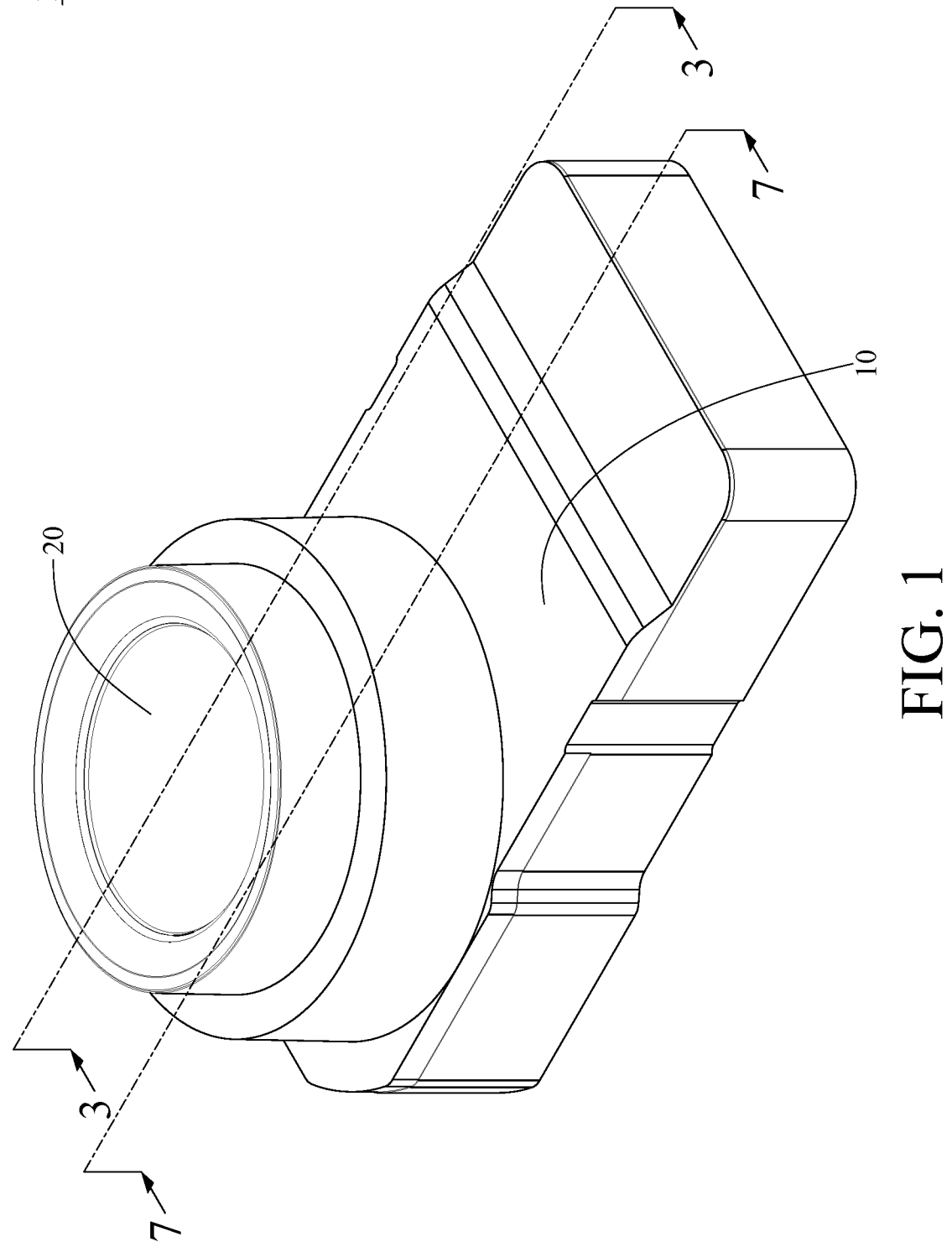
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module. The imaging lens module includes an optical element holder, at least one lens element and a light folding component.

Each of two side surfaces of the optical element holder has a light through hole, and light passes through the optical element holder via the two light through holes. The optical element holder includes a lens element accommodation portion and a folding component accommodation portion, and the optical element holder is one-piece formed. Therefore, the optical element holder being one-piece formed is favorable for improving the assembly accuracy of the light folding component and the lens element.

The lens element is disposed in the lens element accommodation portion, and the light passes through the lens element.

The light folding component is disposed in the folding component accommodation portion and disposed corresponding to the lens element. The light folding component includes a light receive surface, a first reflection surface and a light exit surface. The light enters the light folding component from the light receive surface, the first reflection surface is configured to reflect the light coming from the light receive surface so as to redirect the light, and the light exits the light folding component from the light exit surface. Therefore, the light folding component can fold the light travelling path so as to reduce the size of the imaging lens module.

The imaging lens module can further include a first retaining element, and the first retaining element has at least one corresponsive surface in physical contact with the light folding component. Therefore, the corresponsive surface of the first retaining element can provide the light folding component with at least one normal force which can improve the assembly reliability of the light folding component so as to prevent the light folding component from being damaged or displaced when being impacted by external forces. Moreover, during a compression process, the first retaining element can facilitate the light folding component to be fitted into the folding component accommodation portion of the optical element holder, thereby increasing assembly alignment accuracy.

The imaging lens module can further include an alignment structure disposed on the folding component accommodation portion of the optical element holder and having at least one contact surface, and the contact surface is in physical contact with the light folding component. Therefore, when the light folding component is assembled and in physical contact with the alignment structure, the light folding component and the lens element can be calibrated via passive optical alignment so as to increase assembly accuracy of the light folding component. Moreover, the corresponsive surface of the first retaining element and the contact surface of the alignment structure can correspond to each other to tightly clamp the light folding component, such that the movement of the light folding component in multiple directions can be restricted, thereby increasing assembly reliability. Moreover, the alignment structure can be a protrusion protruding from the folding component accommodation portion or a flat surface on the folding component accommodation portion. Therefore, the light folding component can be positioned by the contact surface of the alignment structure so as to increase assembly yield rate. Note that the alignment structure of the present disclosure is not limited to the configurations as described above.

The first retaining element can include a first recess, and an adhesive is disposed in the first recess, so that the first retaining element and the folding component accommodation portion are fixed to each other via the adhesive. Therefore, it is favorable for increasing the stability between the first retaining element and the folding component accommodation portion so as to resist impacts from external forces. Moreover, the adhesive can be a light curing glue or an organic solvent. The organic solvent can dissolve solid substances on surfaces of adjacent components, and then the liquid mixture including the organic solvent and the dissolved substances can be cured as a unitary solid mass. The organic solvent can be, for example, acetone, butanone, or chloroform, but the present disclosure is not limited thereto. Moreover, retaining walls can be disposed at the periphery of the first recess so as to prevent the adhesive from leakage.

The folding component accommodation portion can include a second recess, and an adhesive is disposed in the second recess, so that the folding component accommodation portion and the light folding component are fixed to each other via the adhesive. Therefore, it is favorable for increasing the stability between the folding component accommodation portion and the light folding component so as to resist impacts from external forces. Moreover, the adhesive can be a light curing glue or an organic solvent. The organic solvent can dissolve solid substances on surfaces of adjacent components, and then the liquid mixture including the organic solvent and the dissolved substances can be cured as a unitary solid mass. The organic solvent can be, for example, acetone, butanone, or chloroform, but the present disclosure is not limited thereto. Moreover, retaining walls can be disposed at the periphery of the second recess so as to prevent the adhesive from leakage.

According to the present disclosure, at least one of the light receive surface, the first reflection surface and the light exit surface of the light folding component can be a freeform surface. Therefore, the light folding component has refractive power, so that the number of lens elements can be reduced. Moreover, the freeform surface can be any curved surface, such as a spherical surface, an aspheric surface, and a non-axisymmetric surface, but the present disclosure is not limited thereto.

The light folding component can further include a second reflection surface, and the second reflection surface is configured to reflect the light coming from the first reflection surface. Therefore, the size of the imaging lens module can be reduced by folding the light travelling path multiple times. Moreover, the second reflection surface and the first reflection surface can be disposed parallel to each other.

According to the present disclosure, the light in the light folding component can undergo at least one total internal reflection. Therefore, there is no need to add additional reflection layer on the light folding component. Moreover, when the light arrives at the interface from a medium of higher refractive index to another medium of lower refractive index and the incident angle is larger than the critical angle, the light undergoes total internal reflection.

The light folding component can be a prism which is one-piece formed. Therefore, the light folding component can be made by plastic injection molding process, which is favorable for mass production and simple assembly process.

The light folding component can be a combination of a plurality of prisms. Therefore, the light folding component consists of a plurality of prisms so as to reduce manufacturing difficulty. Moreover, the prisms can be made of glass material, and thus, the light folding component can endure a high temperature and humidity environment. Moreover, since cemented prisms are relatively fragile, using the first retaining element is favorable for strengthening the stability of the cemented prisms.

The light folding component can further include a light shielding layer. When a light transmission rate of the light shielding layer is T %, the following condition can be satisfied: T % 0.2%. Moreover, the light shielding layer can be disposed on a part of an outer surface of the light folding component so as to prevent interference by external light rays. Moreover, the light shielding layer can be disposed between two cemented prisms so as to eliminate stray light.

The light folding component can further include a light shielding structure, and an area of a light passing region in the light folding component can be reduced by the light shielding structure. Therefore, it is favorable for the light shielding structure to eliminate stray light, so that the image quality can be ensured despite the fact that the light is reflected multiple times. Moreover, the light shielding structure can be a recessed surface inwardly recessed from the outer surface of the light folding component so as to reduce the area of the light passing region in the light folding component. Moreover, the light shielding structure can be disposed between the first reflection surface and the second reflection surface.

The light shielding structure can have a convex-concave structure, such that the light shielding structure has an undulating shape. Therefore, changing the shape of the light shielding structure from smooth to undulating shape is favorable for changing the reflection path of stray light.

The imaging lens module can further include an image surface, and the lens element accommodation portion is at a constant distance from the image surface. Therefore, the folding component accommodation portion also serves as a base which is fixed and connected to a substrate where the image surface is located so as to reduce the number of components and simplify the assembly process.

The imaging lens module can further include a second retaining element, and the second retaining element supports and is in physical contact with the lens element, such that the lens element is fixed to the lens element accommodation portion.

According to the present disclosure, an anti-reflection layer can be disposed on at least one of the light receive surface and the light exit surface of the light folding component. Therefore, it is favorable for reducing stray light and increasing the light transmission rate. Moreover, the anti-reflection layer can be a multilayer film structure having various refractive indices or a subwavelength microstructure, but the present disclosure is not limited thereto.

The present disclosure provides an electronic device including the aforementioned imaging lens module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
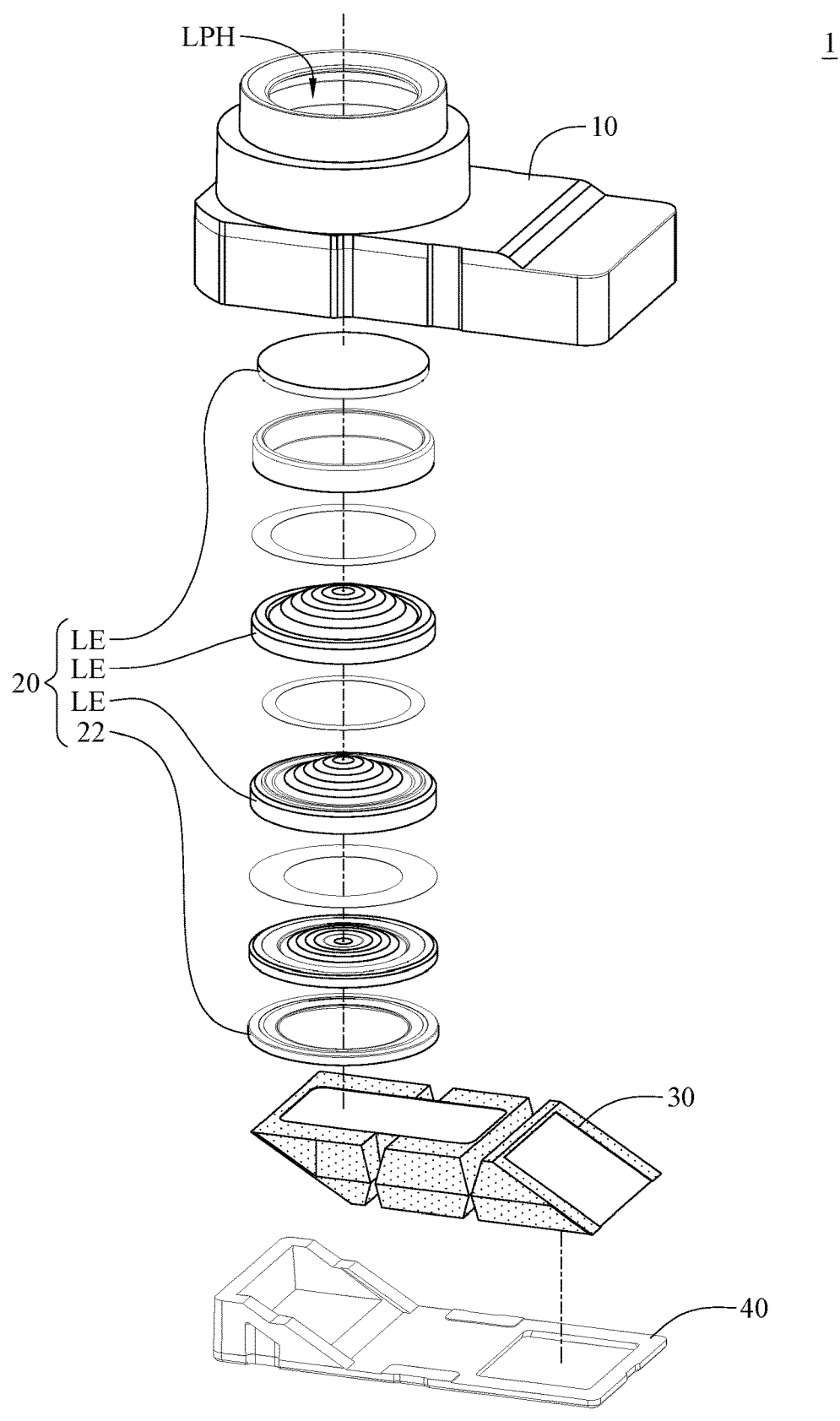
FIG. 2 is an exploded view of the imaging lens module in FIG. 1.
Figure 3:
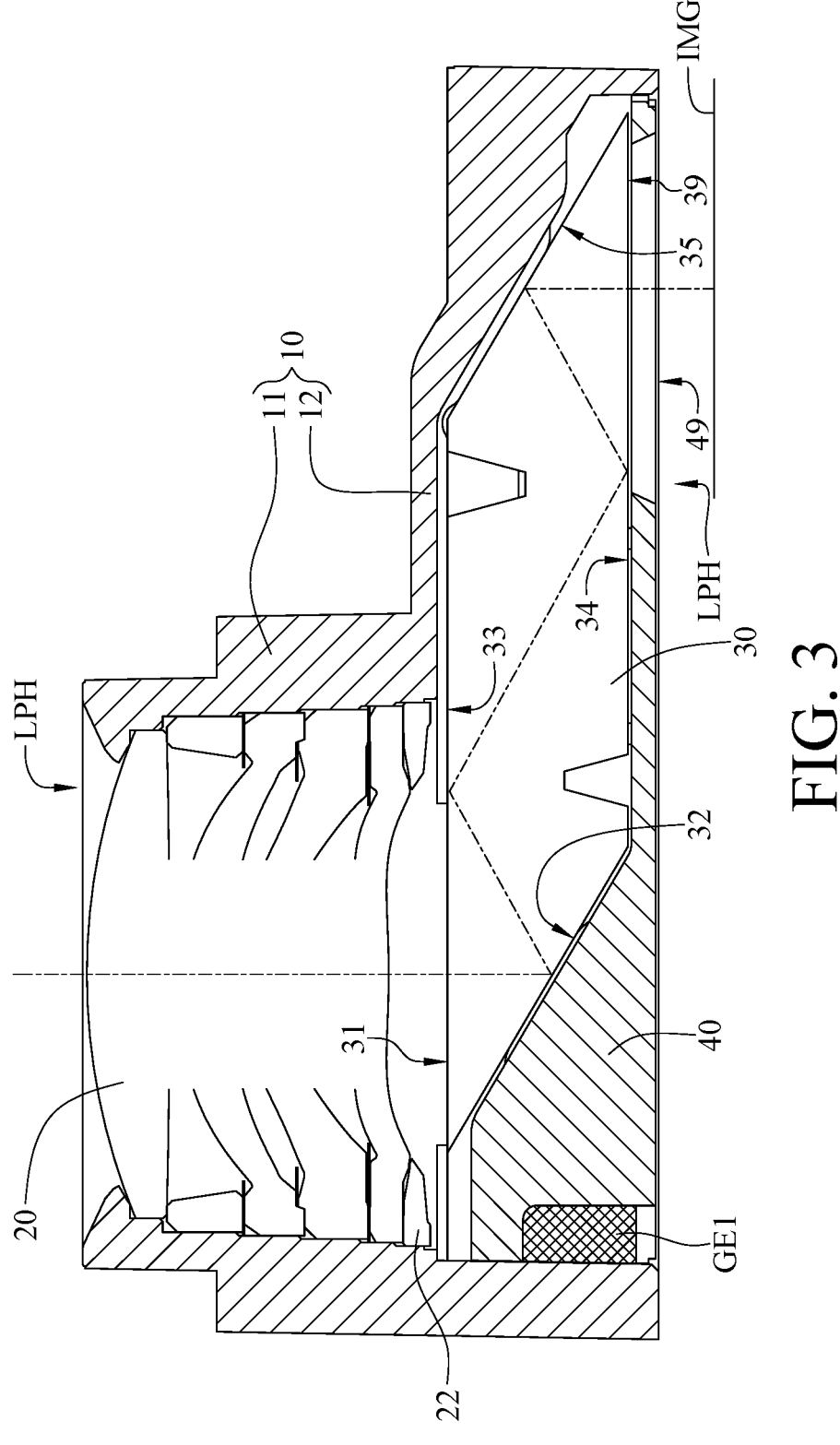
FIG. 3 is a cross-sectional view of the imaging lens module along line 3-3 in FIG. 1.
Figure 4:
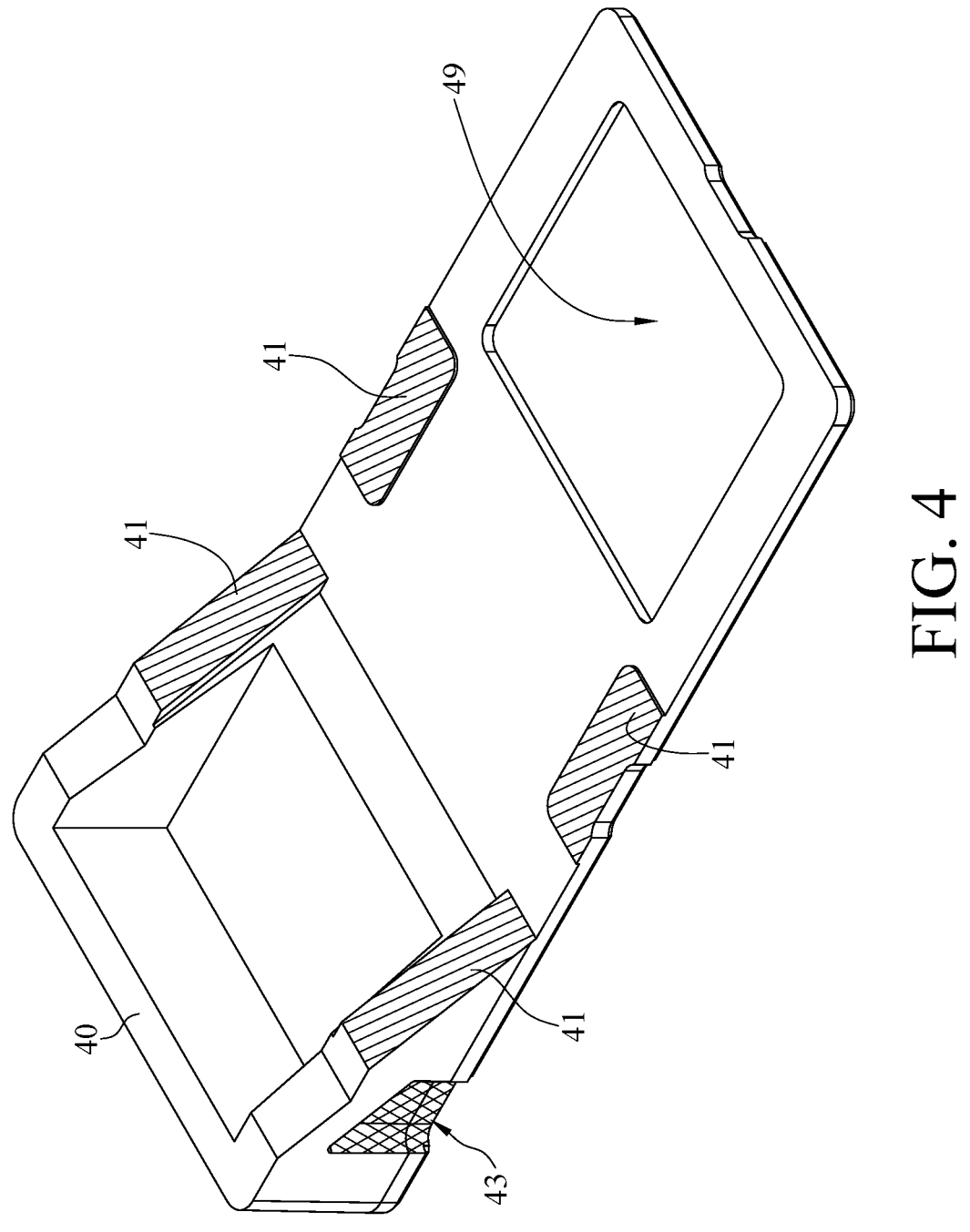
FIG. 4 is a perspective view of a first retaining element of the imaging lens module in FIG. 1.
Figure 5:
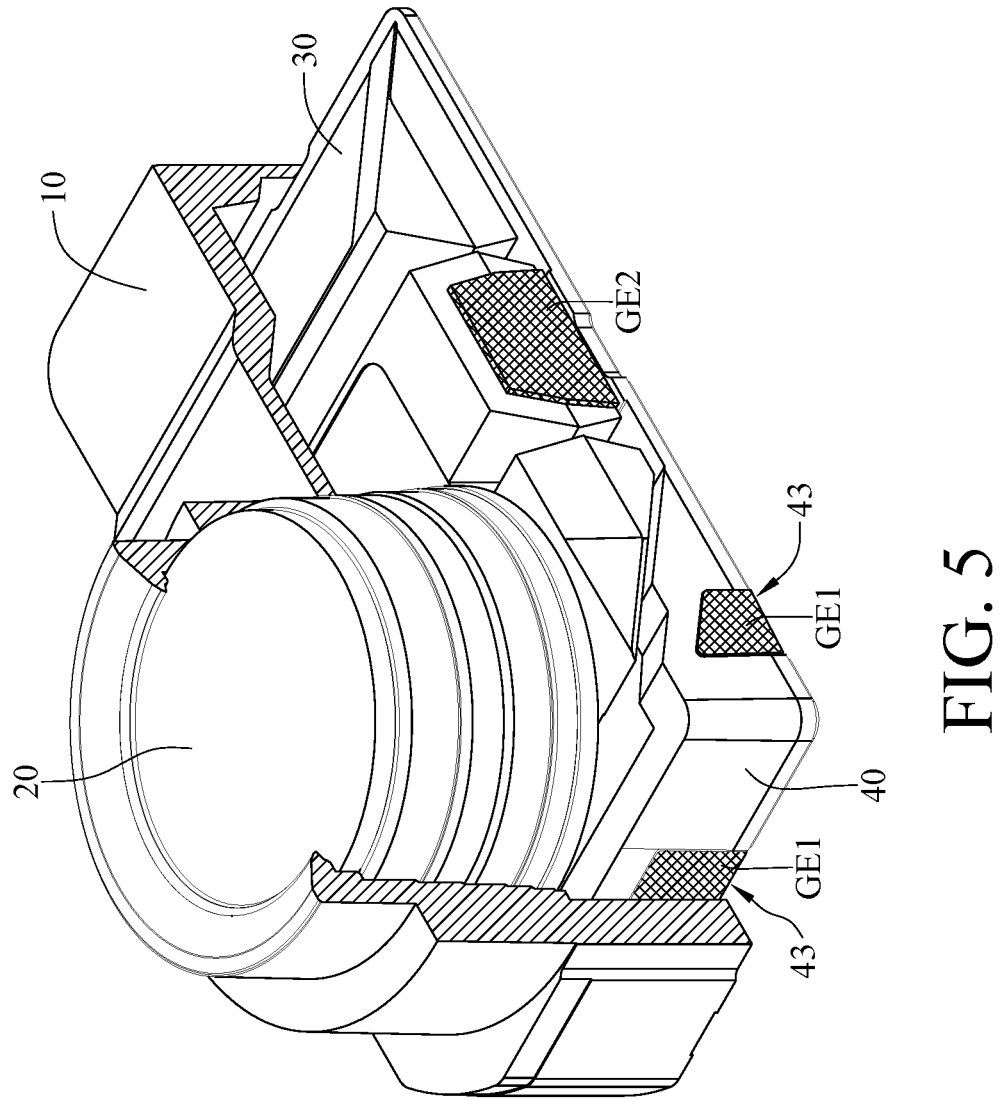
FIG. 5 is a partial sectional view of the imaging lens module in FIG. 1.
Figure 6:
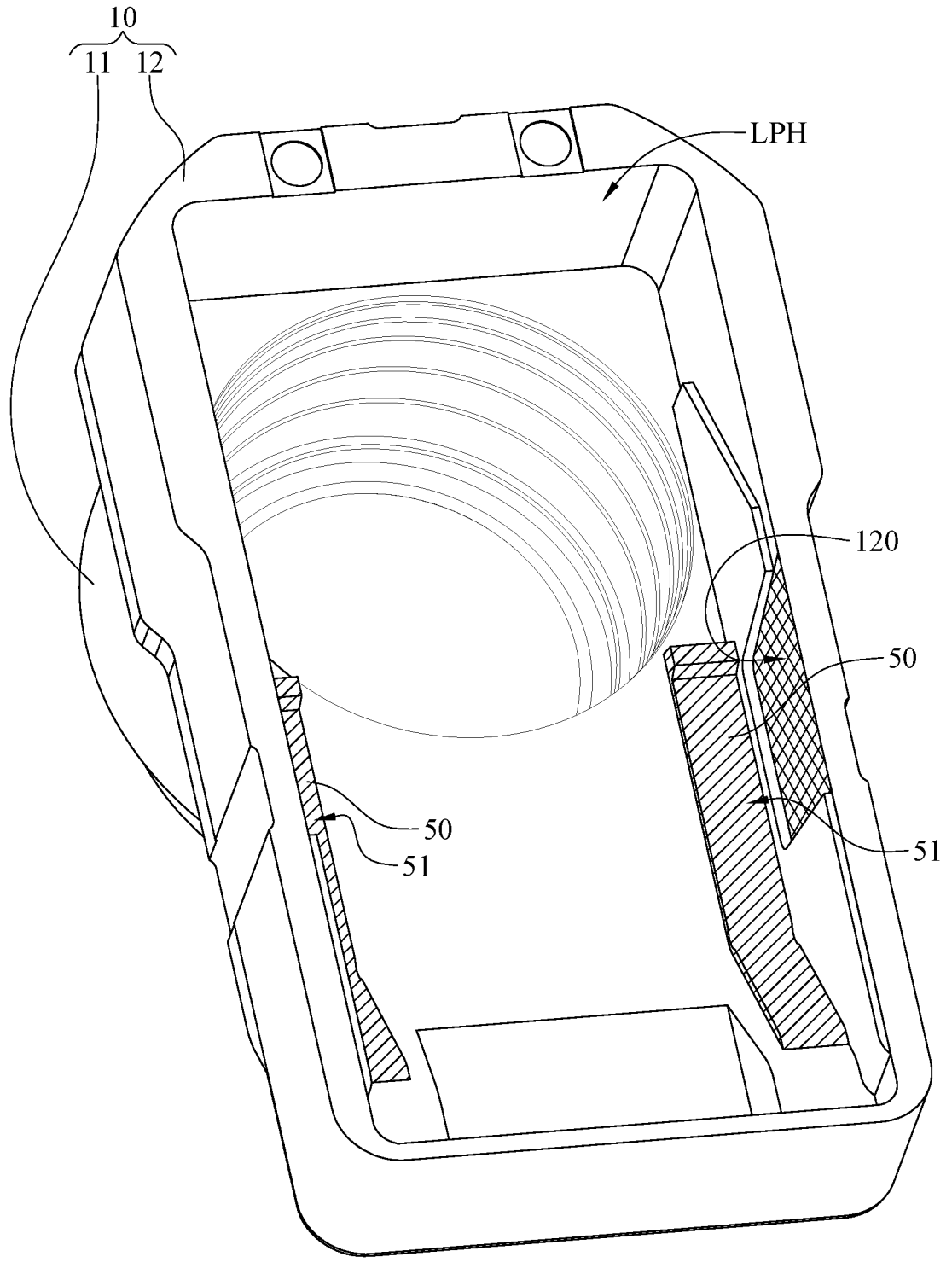
FIG. 6 is a bottom view of an optical element holder of the imaging lens module in FIG. 1.
Figure 7:
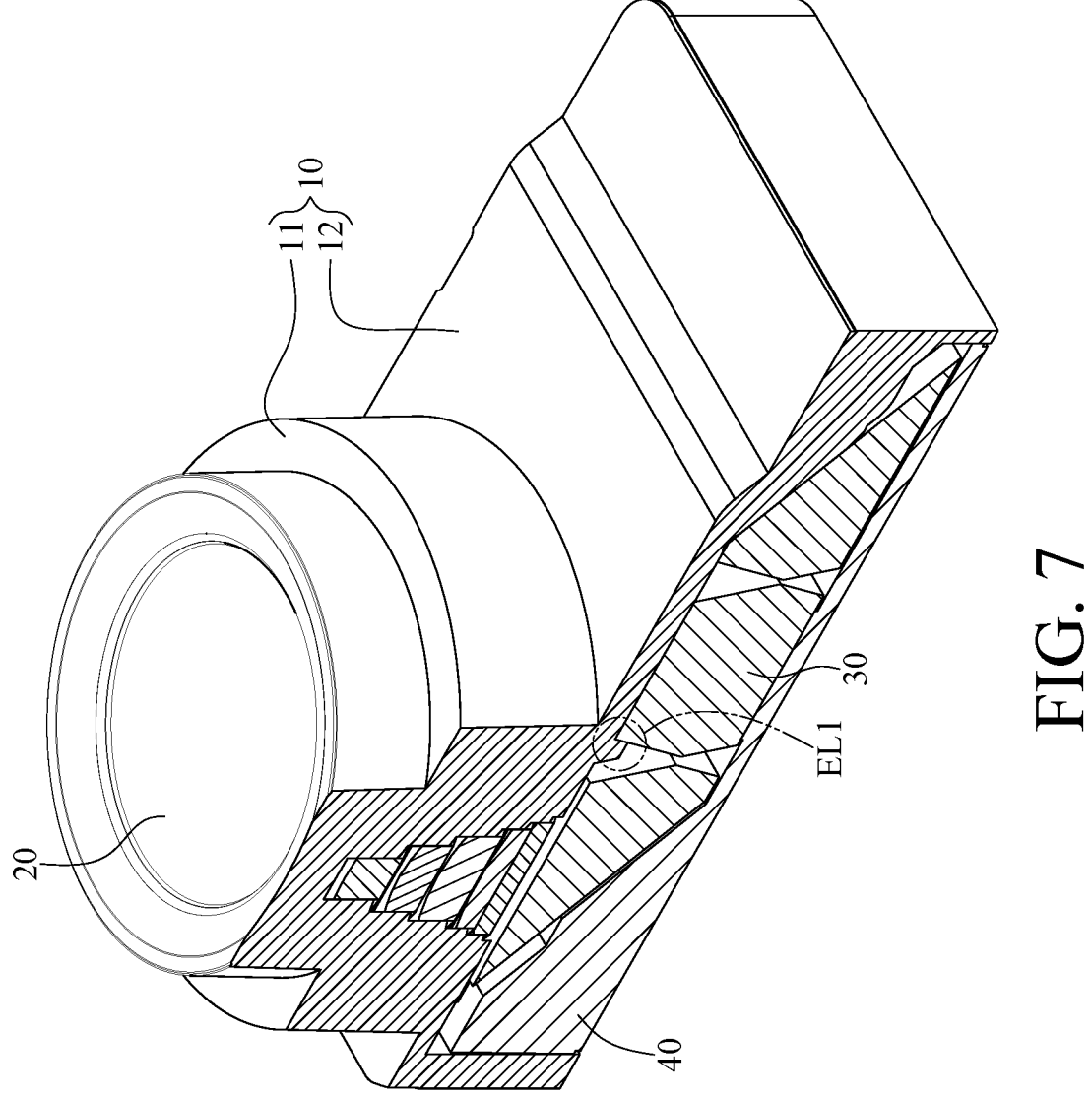
FIG. 7 is a cross-sectional view of the imaging lens module along line 7-7 in FIG. 1.
Figure 8:
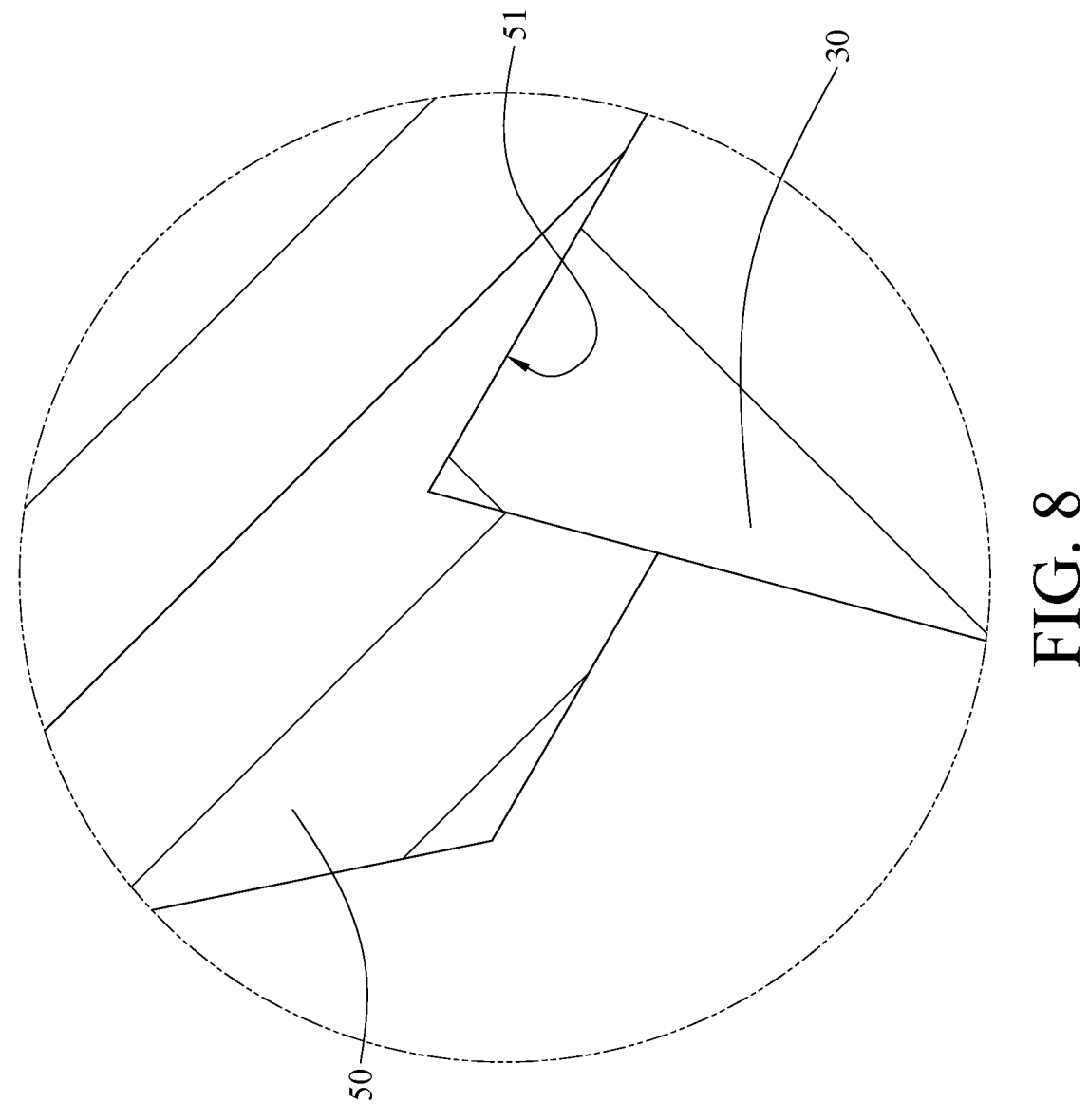
FIG. 8 is an enlarged view of region EL1 in FIG. 7.
Figure 9:
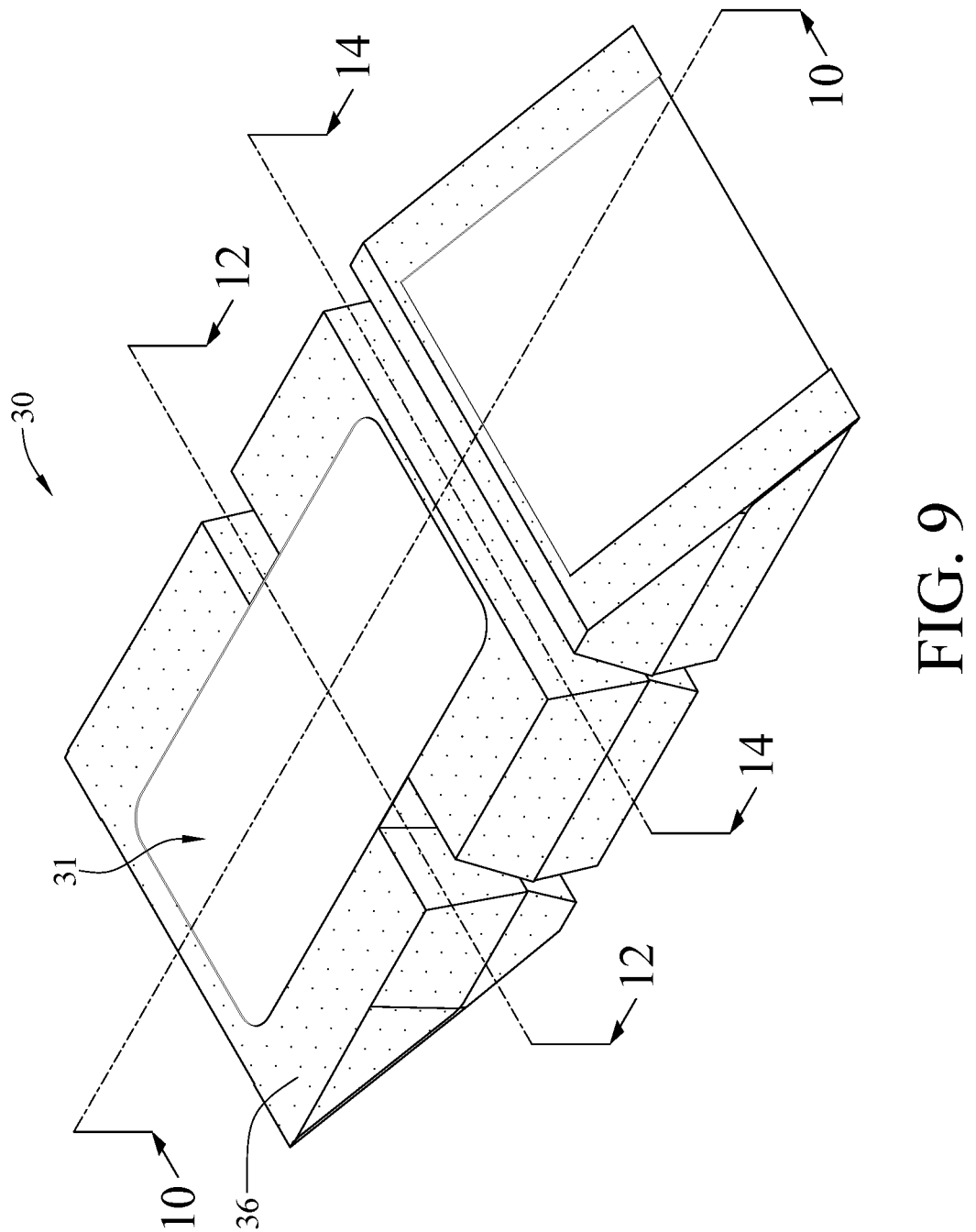
FIG. 9 is a perspective view of a light folding component of the imaging lens module in FIG. 1.
Figure 10:
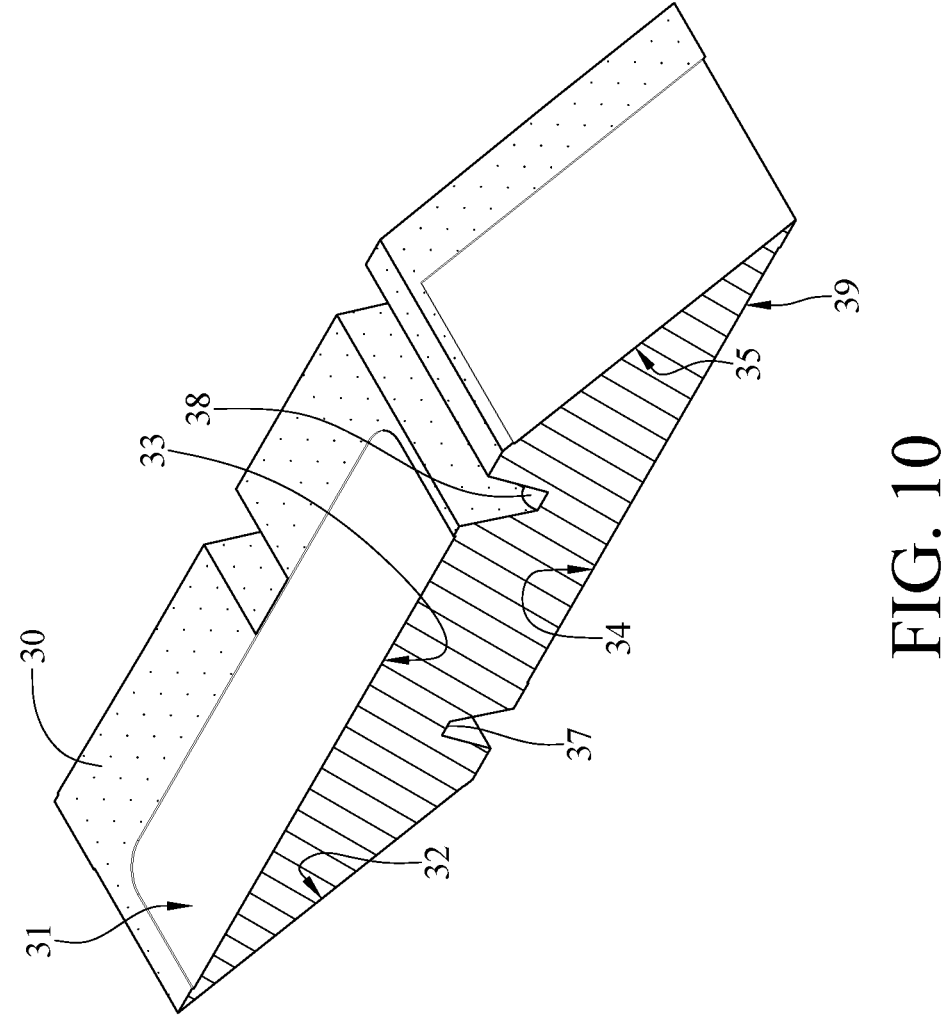
FIG. 10 is a sectional view of the light folding component along line 10-10 in FIG. 9.
Figure 11:
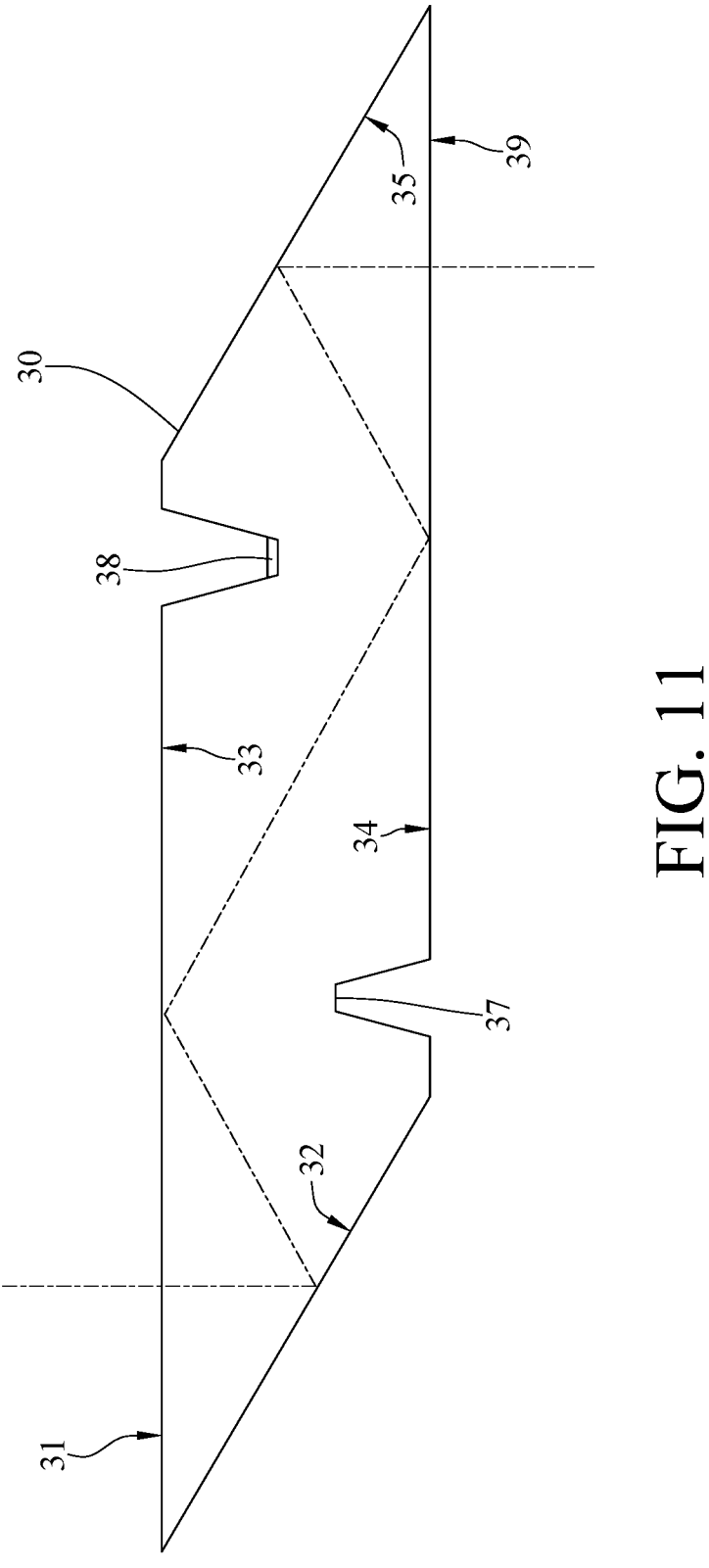
FIG. 11 is a cross-sectional view of the light folding component along line 10-10 in FIG. 9.
Figure 12:
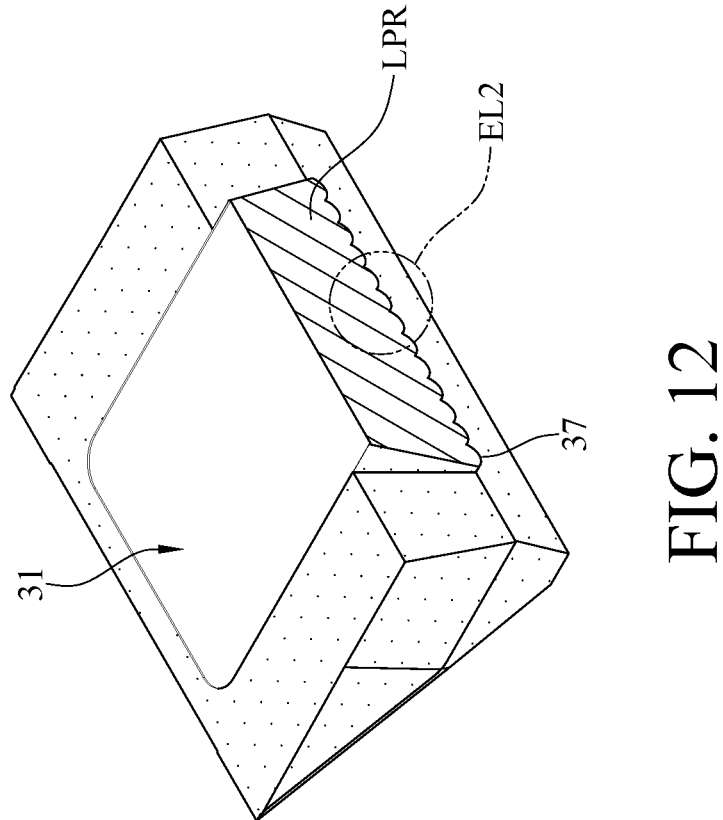
FIG. 12 is a sectional view of the light folding component along line 12-12 in FIG. 9.
Figure 13:
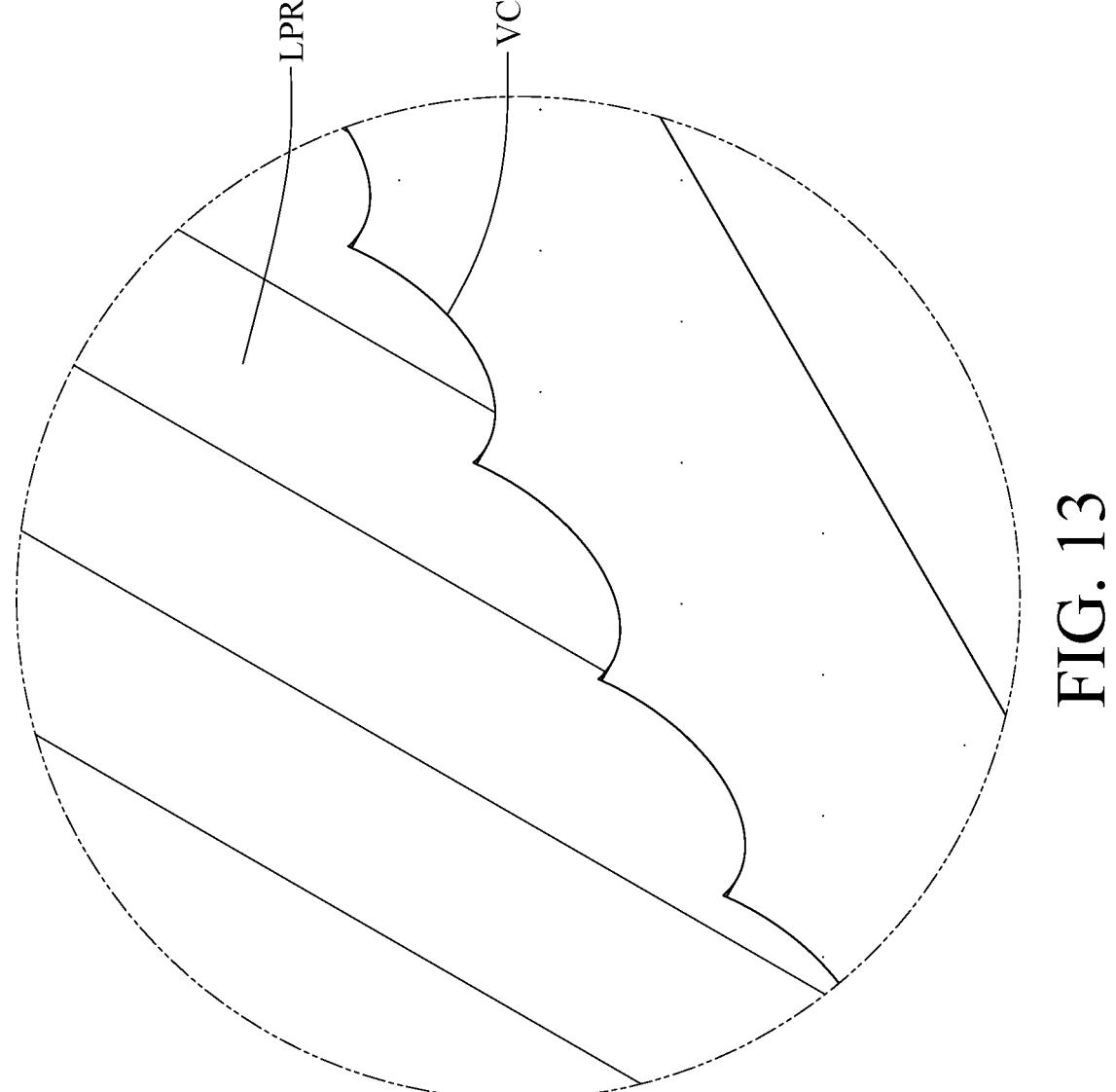
FIG. 13 is an enlarged view of region EL2 in FIG. 12.
Figure 14:
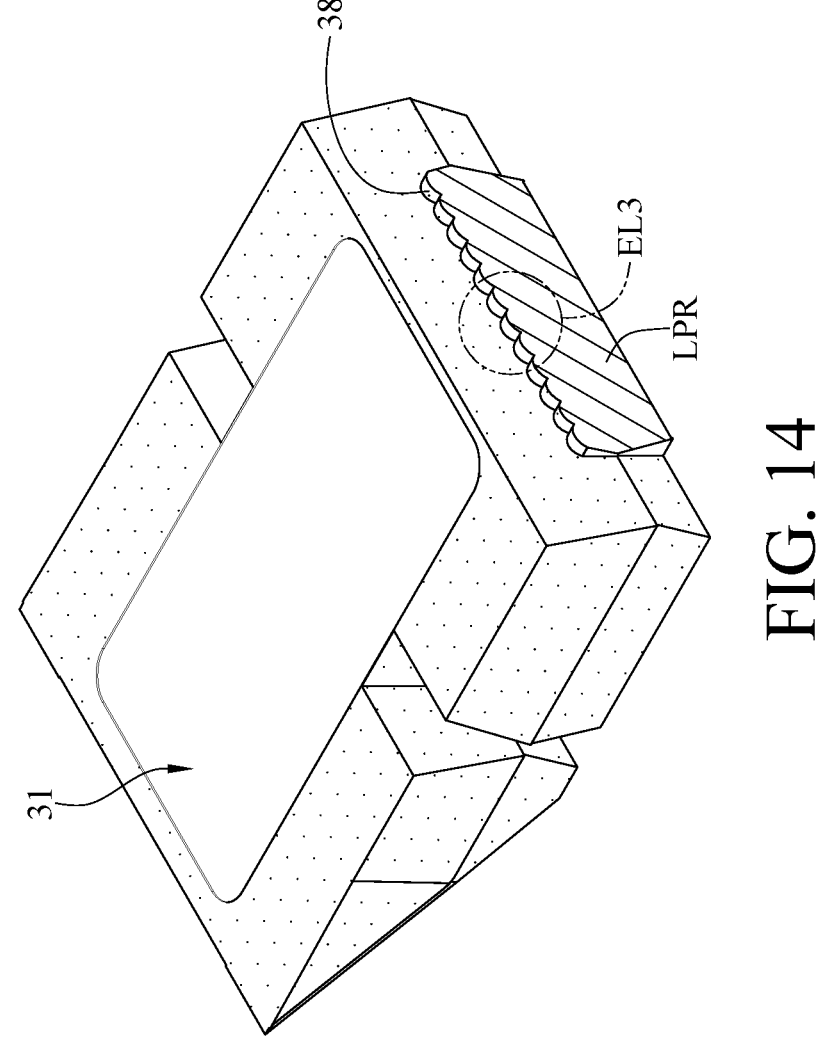
FIG. 14 is a sectional view of the light folding component along line 14-14 in FIG. 9.
Figure 15:
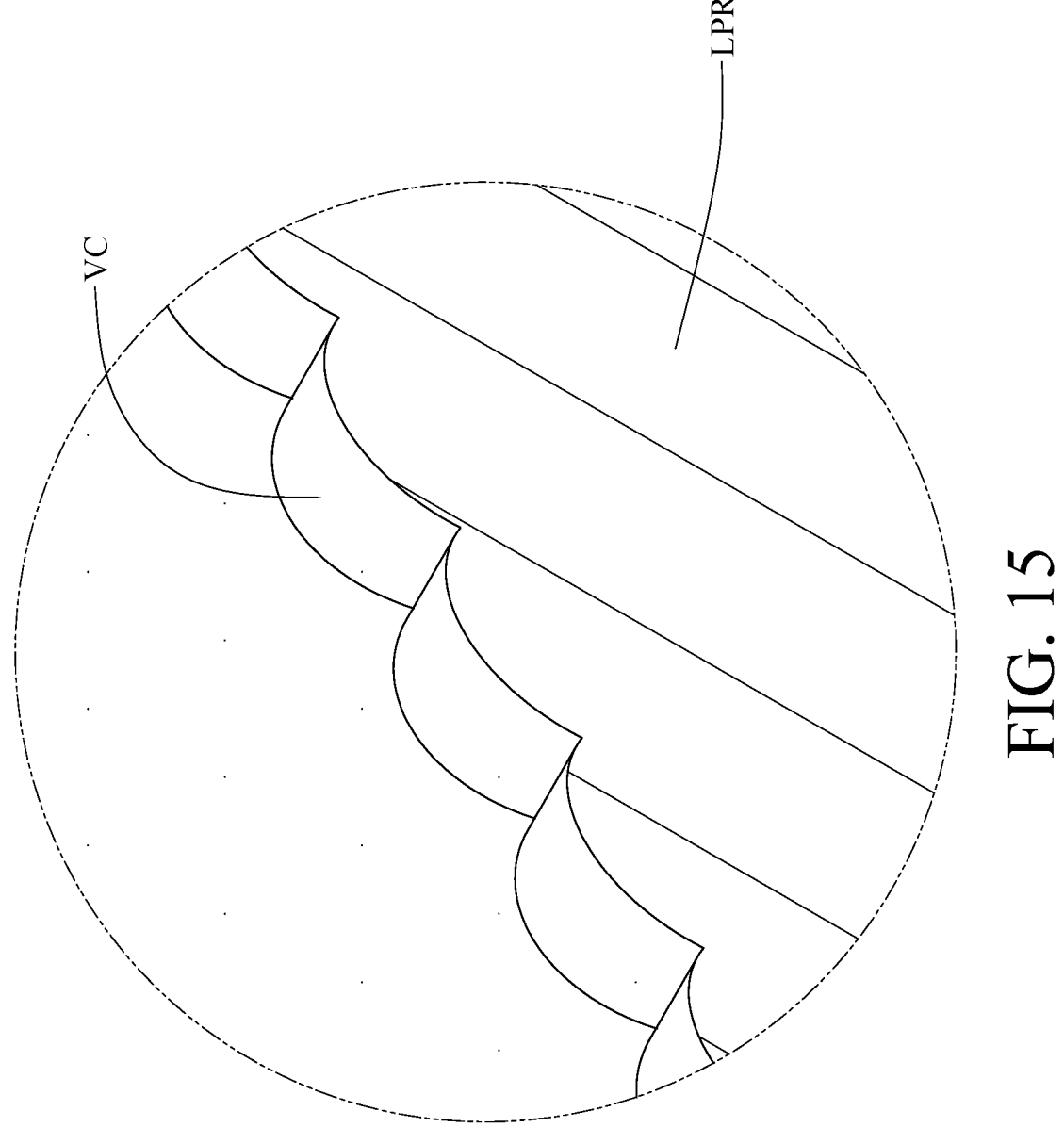
FIG. 15 is an enlarged view of region EL3 in FIG. 14.

FIG. 1 is a perspective view of an imaging lens module according to the 1st embodiment of the present disclosure, FIG. 2 is an exploded view of the imaging lens module in FIG. 1, FIG. 3 is a cross-sectional view of the imaging lens module along line 3-3 in FIG. 1, FIG. 4 is a perspective view of a first retaining element of the imaging lens module in FIG. 1, FIG. 5 is a partial sectional view of the imaging lens module in FIG. 1, FIG. 6 is a bottom view of an optical element holder of the imaging lens module in FIG. 1, FIG. 7 is a cross-sectional view of the imaging lens module along line 7-7 in FIG. 1, FIG. 8 is an enlarged view of region EL1 in FIG. 7, FIG. 9 is a perspective view of a light folding component of the imaging lens module in FIG. 1, FIG. 10 is a sectional view of the light folding component along line 10-10 in FIG. 9, FIG. 11 is a cross-sectional view of the light folding component along line 10-10 in FIG. 9, FIG. 12 is a sectional view of the light folding component along line 12-12 in FIG. 9, FIG. 13 is an enlarged view of region EL2 in FIG. 12, FIG. 14 is a sectional view of the light folding component along line 14-14 in FIG. 9, and FIG. 15 is an enlarged view of region EL3 in FIG. 14.

In this embodiment, an imaging lens module 1 includes an optical element holder 10, a lens assembly 20, an image surface IMG, a light folding component 30, a first retaining element 40 and a plurality of alignment structures 50.

The optical element holder 10 is one-piece formed and includes a lens element accommodation portion 11 and a folding component accommodation portion 12. Each of two side surfaces of the optical element holder 10 has a light through holes LPH, and the light passes through the optical element holder 10 via the two light through holes LPH.

The lens assembly 20 is disposed in the lens element accommodation portion 11 of the optical element holder 10, and the lens assembly 20 includes a plurality of lens elements LE, a second retaining element 22 and a plurality of optical shutters and spacers (their reference numerals are omitted). The light entering the optical element holder 10 passes through the lens elements LE of the lens assembly 20. Furthermore, the second retaining element 22 supports and is in physical contact with the lens elements LE, such that the lens elements LE are fixed to the lens element accommodation portion 11. Moreover, the lens element accommodation portion 11 is at a constant distance from the image surface IMG.

The light folding component 30 is disposed in the folding component accommodation portion 12 of the optical element holder 10 and disposed corresponding to the lens elements LE of the lens assembly 20, and the light folding component 30 is located at an image side of the lens assembly 20. The light folding component 30 includes a light receive surface 31, four reflection surfaces 32, 33, 34 and 35 and a light exit surface 39. The light enters the light folding component 30 from the light receive surface 31, the reflection surfaces 32, 33, 34 and 35 are configured to reflect the light coming from the light receive surface 31 so as to redirect the light, and the light exits the light folding component from the light exit surface 39.

As shown in FIG. 4, the first retaining element 40 has a plurality of corresponsive surfaces 41 in physical contact with the light folding component 30, and the corresponsive surfaces 41 provide the light folding component 30 with a normal force, such that the light folding component 30 tightly fits to the folding component accommodation portion 12 of the optical element holder 10. As seen in FIG. 4 and FIG. 5, the first retaining element 40 includes a plurality of first recesses 43, and adhesives GE1 are respectively disposed in the first recesses 43, so that the first retaining element 40 and the folding component accommodation portion 12 are fixed to each other via the adhesives GE1. Moreover, the first retaining element further has a light through hole 49 corresponding to the light exit surface 39 of the light folding component 30.

Referring to FIG. 6 to FIG. 8, the alignment structures 50 are disposed on the folding component accommodation portion 12 of the optical element holder 10, and each of the alignment structures 50 has a contact surface 51 in physical contact with the light folding component 30. In this embodiment, the alignment structures 50 are protrusions protruding from the folding component accommodation portion 12. In addition, as shown in FIG. 5 and FIG. 6, the folding component accommodation portion 12 includes a plurality of second recesses 120, and adhesives GE2 are respectively disposed in the second recesses 120, so that the folding component accommodation portion 12 and the light folding component 30 are fixed to each other via the adhesives GE2.

In this embodiment, the light folding component 30 reflects the light multiple times by the reflection surfaces 32, 33, 34 and 35, and the light travelling path is thus folded multiple times. Furthermore, as shown in FIG. 3, the light undergoes total internal reflection at the reflection surface 33 and reflection surface 34 of the light folding component 30, and the light is reflected at the reflection surface 32 and the reflection surface 35 of the light folding component 30 by reflection layers on the reflection surface 32 and the reflection surface 35. Moreover, the reflection surface 32 and the reflection surface 35 are disposed parallel to each other, and the reflection surface 33 and the reflection surface 34 are disposed parallel to each other.

In this embodiment, the light folding component 30 is a prism which is one-piece formed, and the light folding component 30 further includes a light shielding layer 36 and two light shielding structures 37 and 38.

As shown in FIG. 9, the light shielding layer 36 is disposed on a part of an outer surface of the light folding component 30 so as to prevent interference by external light rays. Moreover, when a light transmission rate of the light shielding layer 36 is T %, the following condition is satisfied: T % 0.2%.

As shown in FIG. 10 and FIG. 11, the light shielding structure 37 is disposed between the reflection surface 32 and the reflection surface 34, the light shielding structure 38 is disposed between the reflection surface 33 and the reflection surface 35, and each of the light shielding structures 37 and 38 is a recessed surface inwardly recessed from the outer surface of the light folding component 30 so as to reduce an area of a light passing region LPR in the light folding component 30. Moreover, as shown in FIG. 12 to FIG. 15, each of the light shielding structures 37 and 38 has a convex-concave structure VC, such that the light shielding structures 37 and 38 have undulating shapes.

2nd Embodiment

Figure 16:
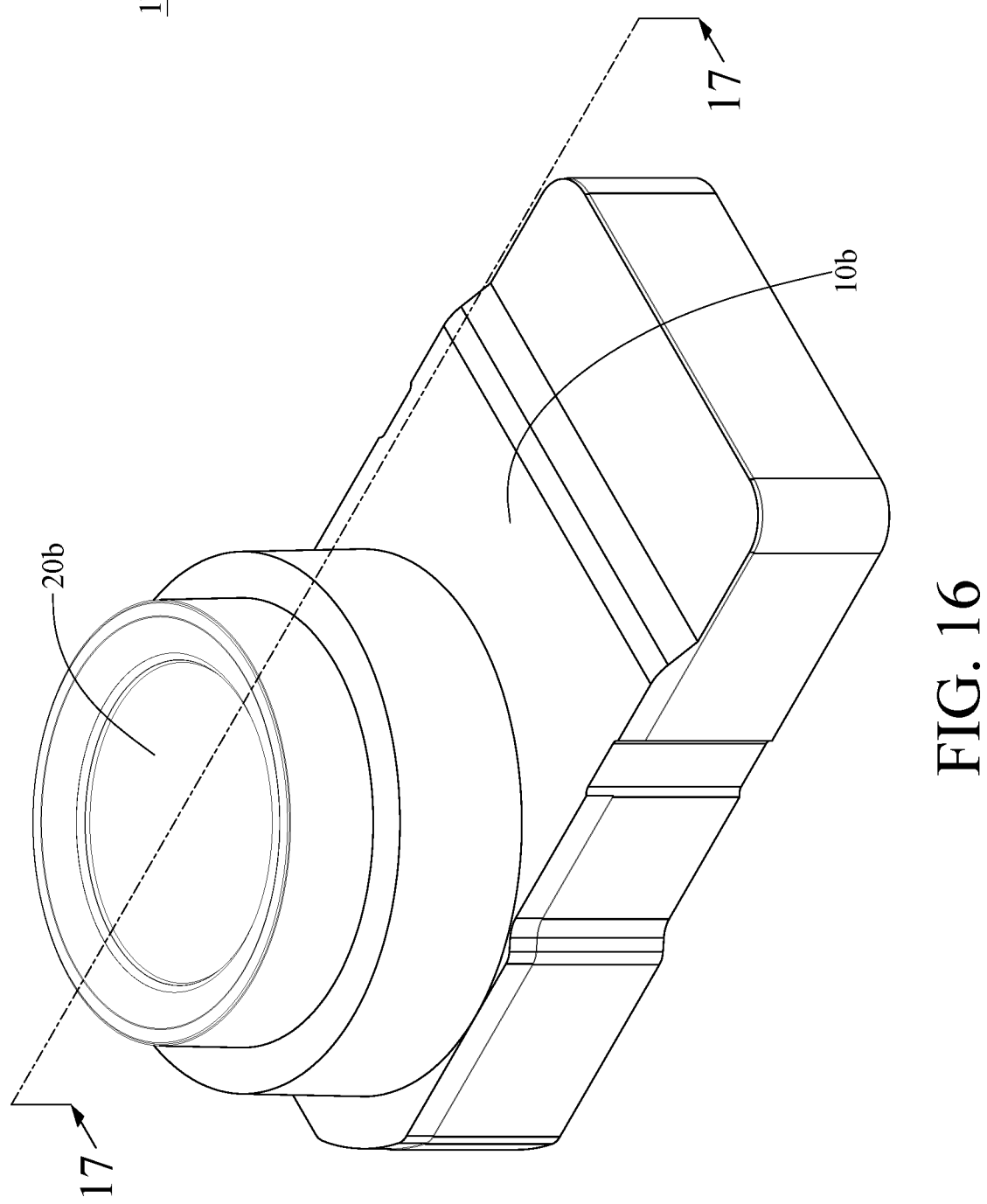
FIG. 16 is a perspective view of an imaging lens module according to the 2nd embodiment of the present disclosure.
Figure 17:
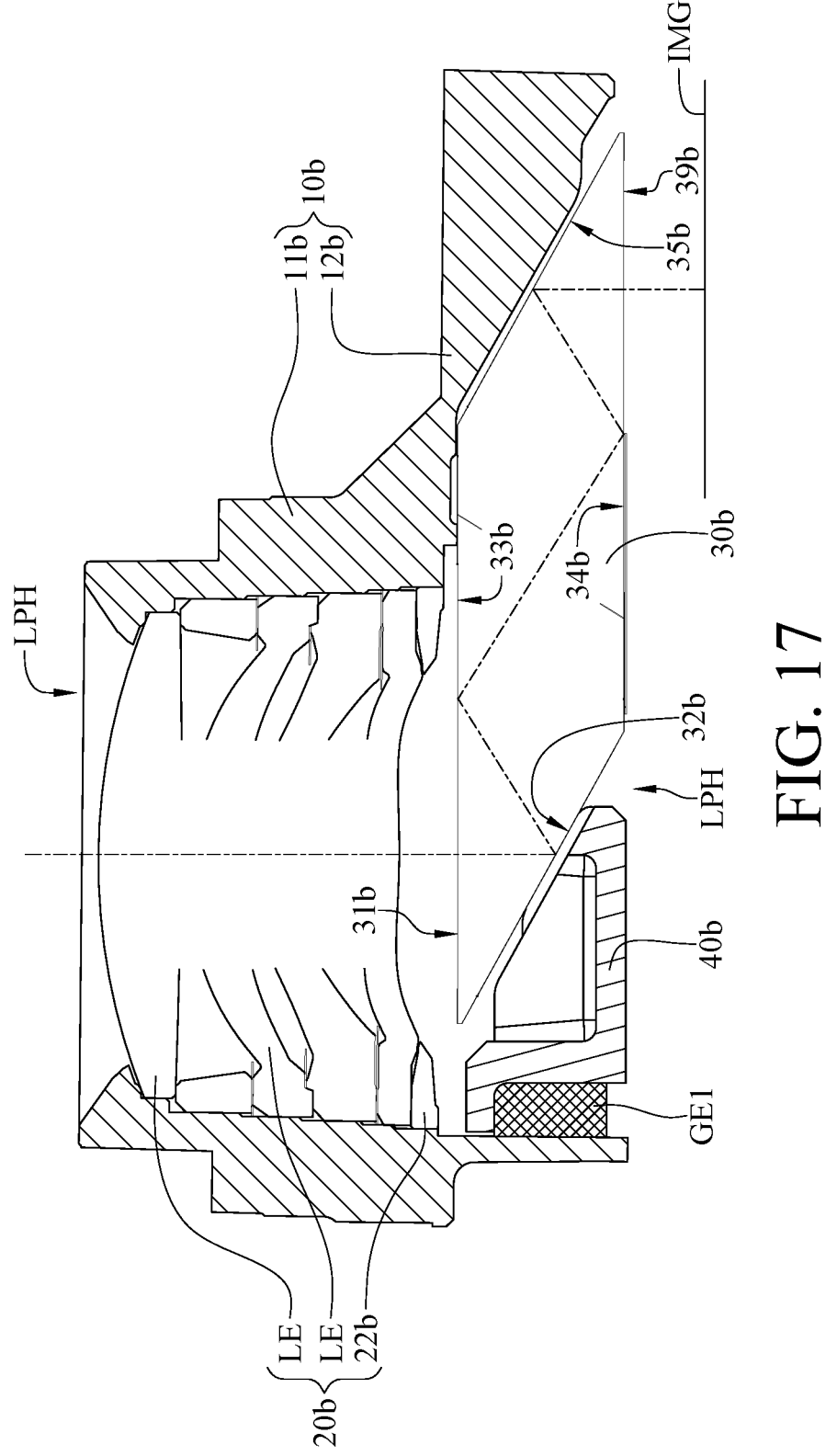
FIG. 17 is a cross-sectional view of the imaging lens module along line 17-17 in FIG. 16.
Figure 18:
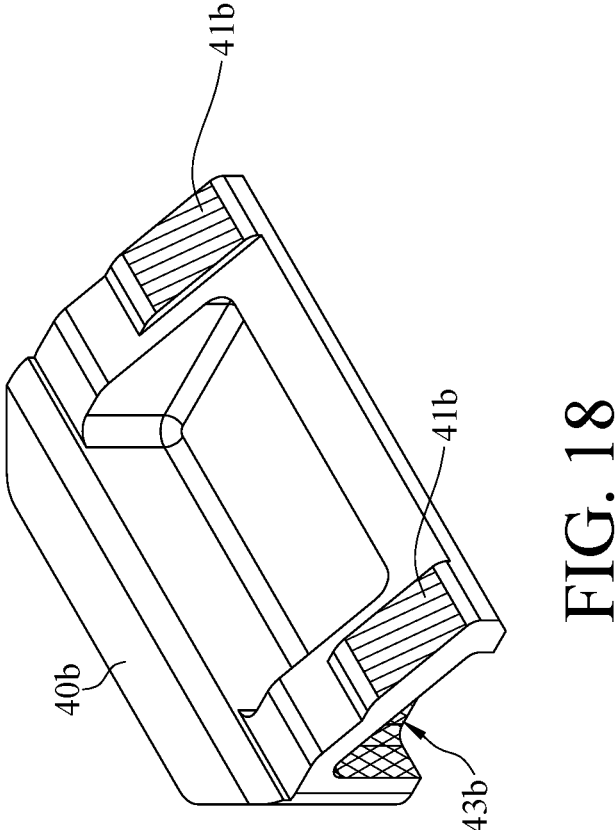
FIG. 18 is a perspective view of a first retaining element of the imaging lens module in FIG. 16.
Figure 19:
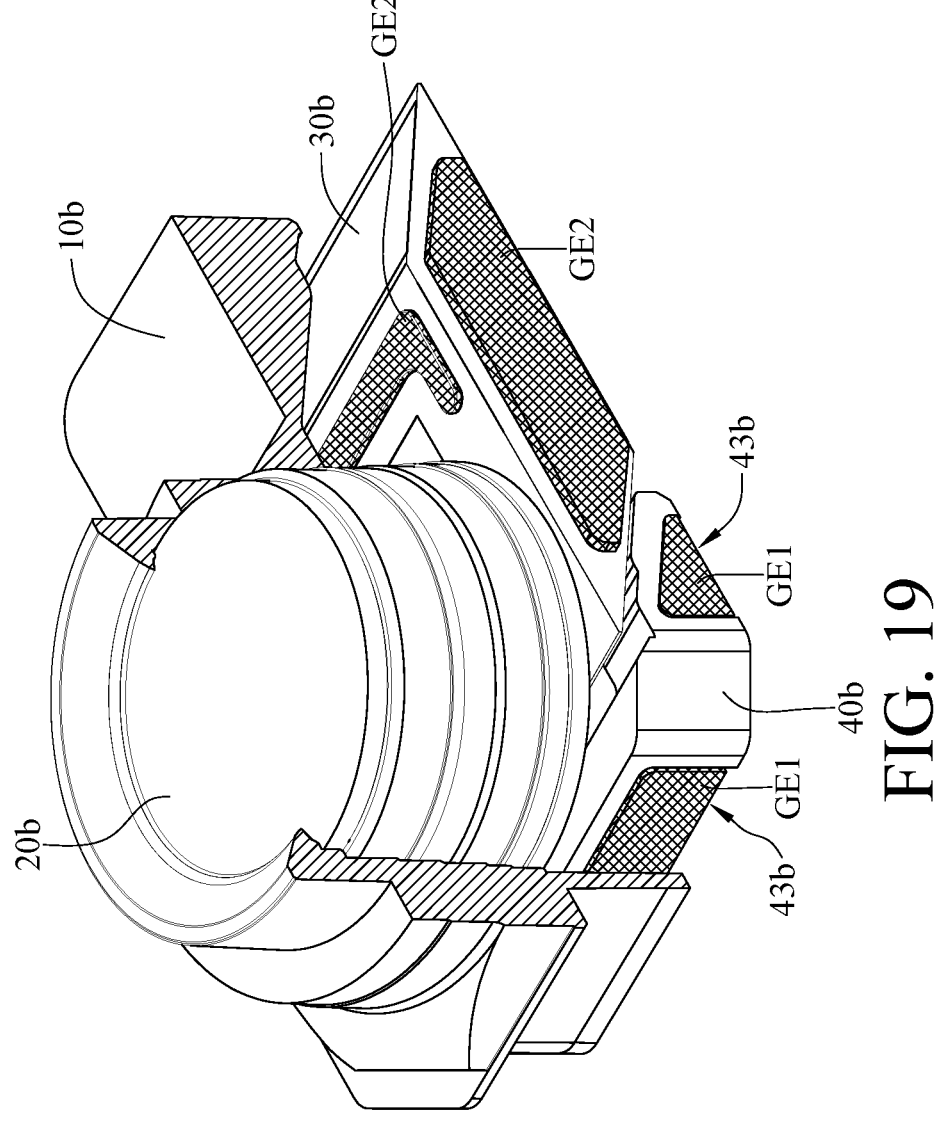
FIG. 19 is a partial sectional view of the imaging lens module in FIG. 16.
Figure 20:
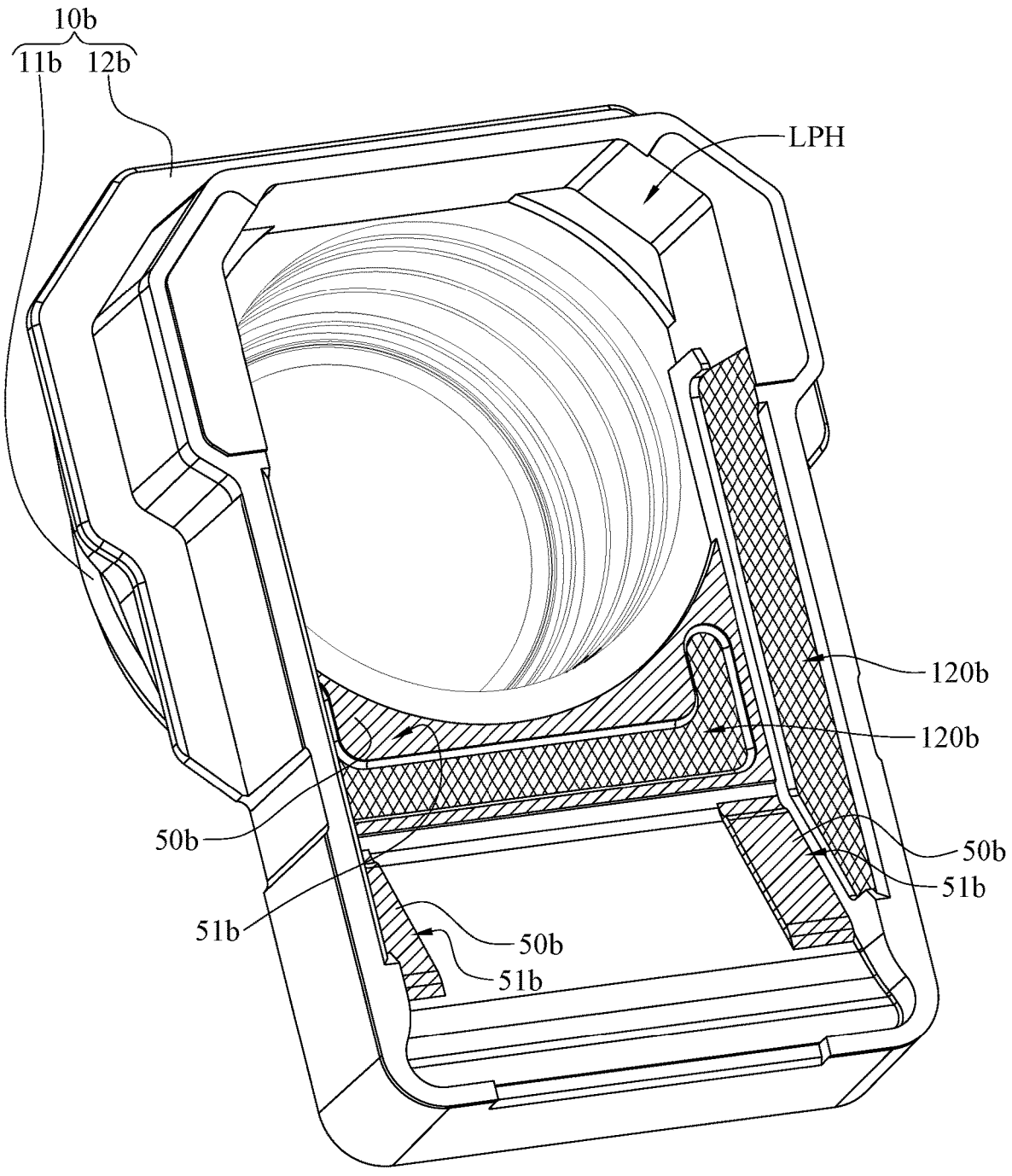
FIG. 20 is a bottom view of an optical element holder of the imaging lens module in FIG. 16.
Figure 21:
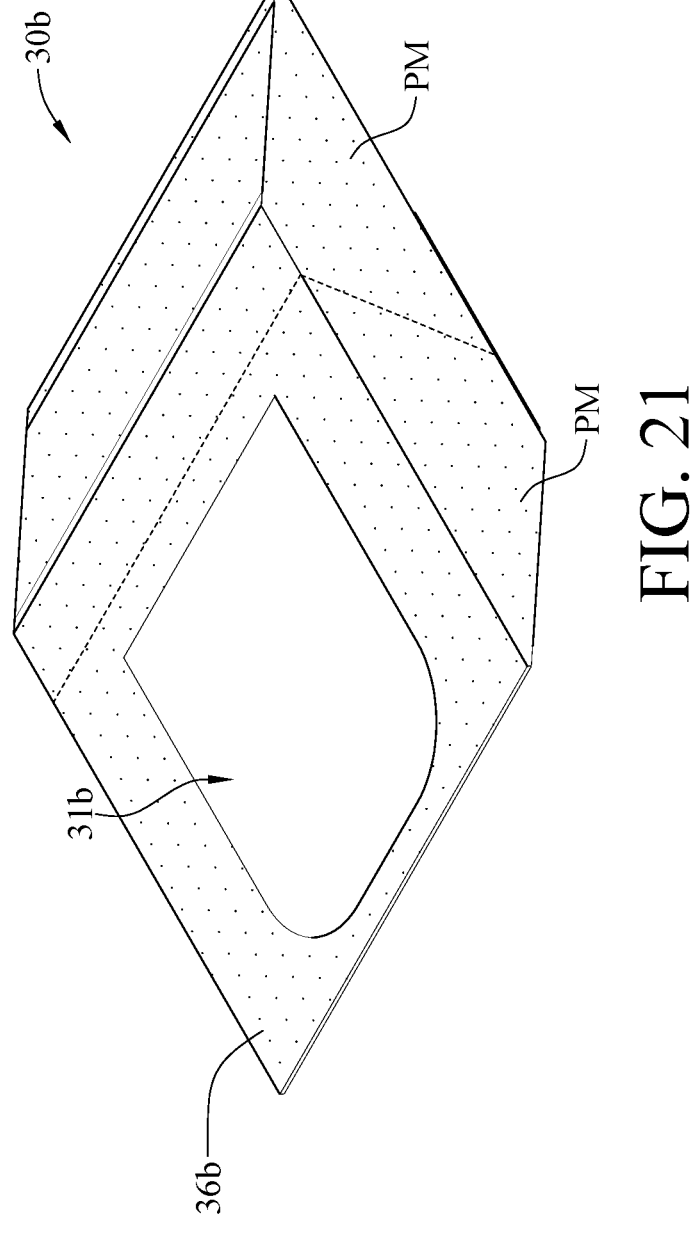
FIG. 21 is a perspective view of a light folding component of the imaging lens module in FIG. 16.
Figure 22:
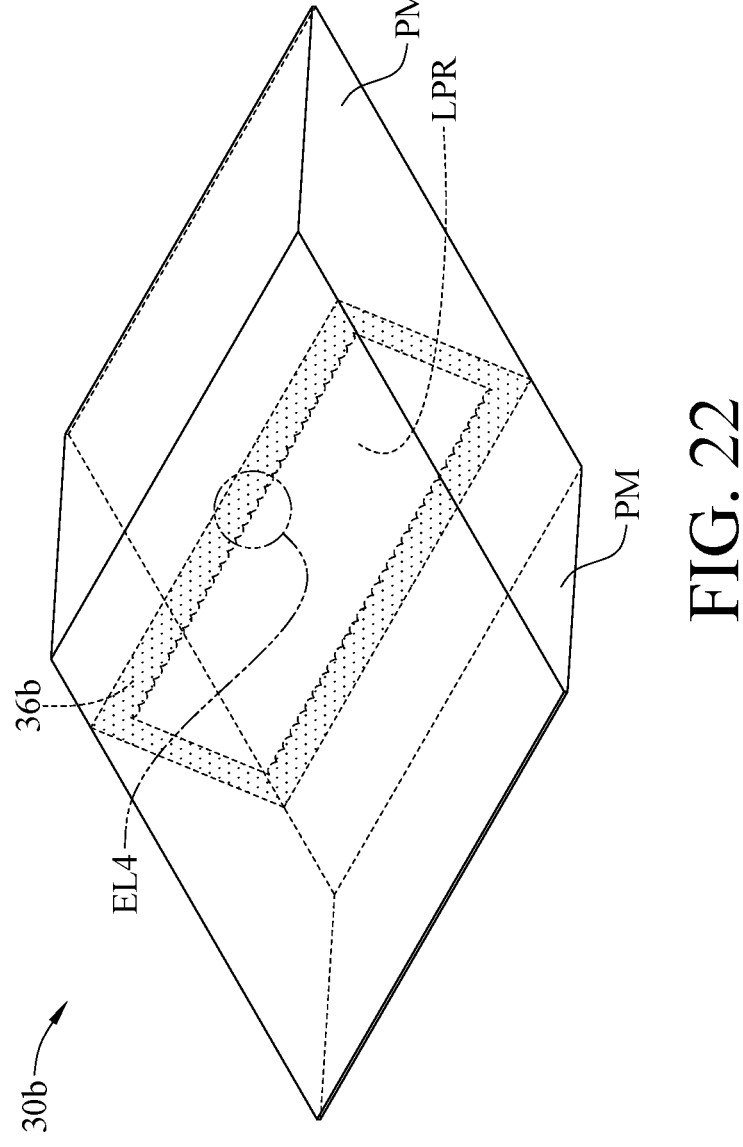
FIG. 22 is a schematic view of the light folding component and a light shielding layer thereof in FIG. 21.
Figure 23:
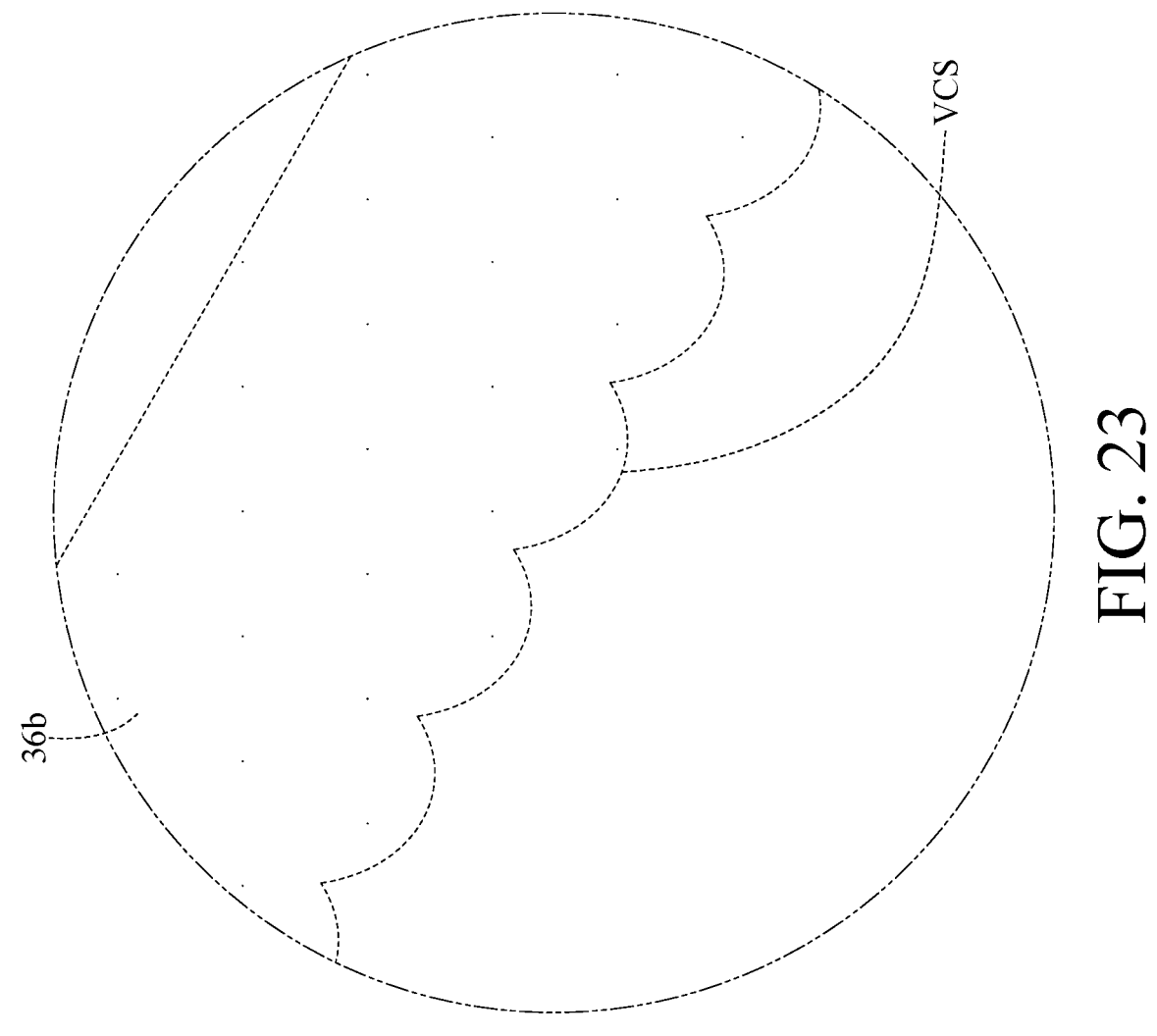
FIG. 23 is an enlarged view of region EL4 in FIG. 22.
Figure 24:
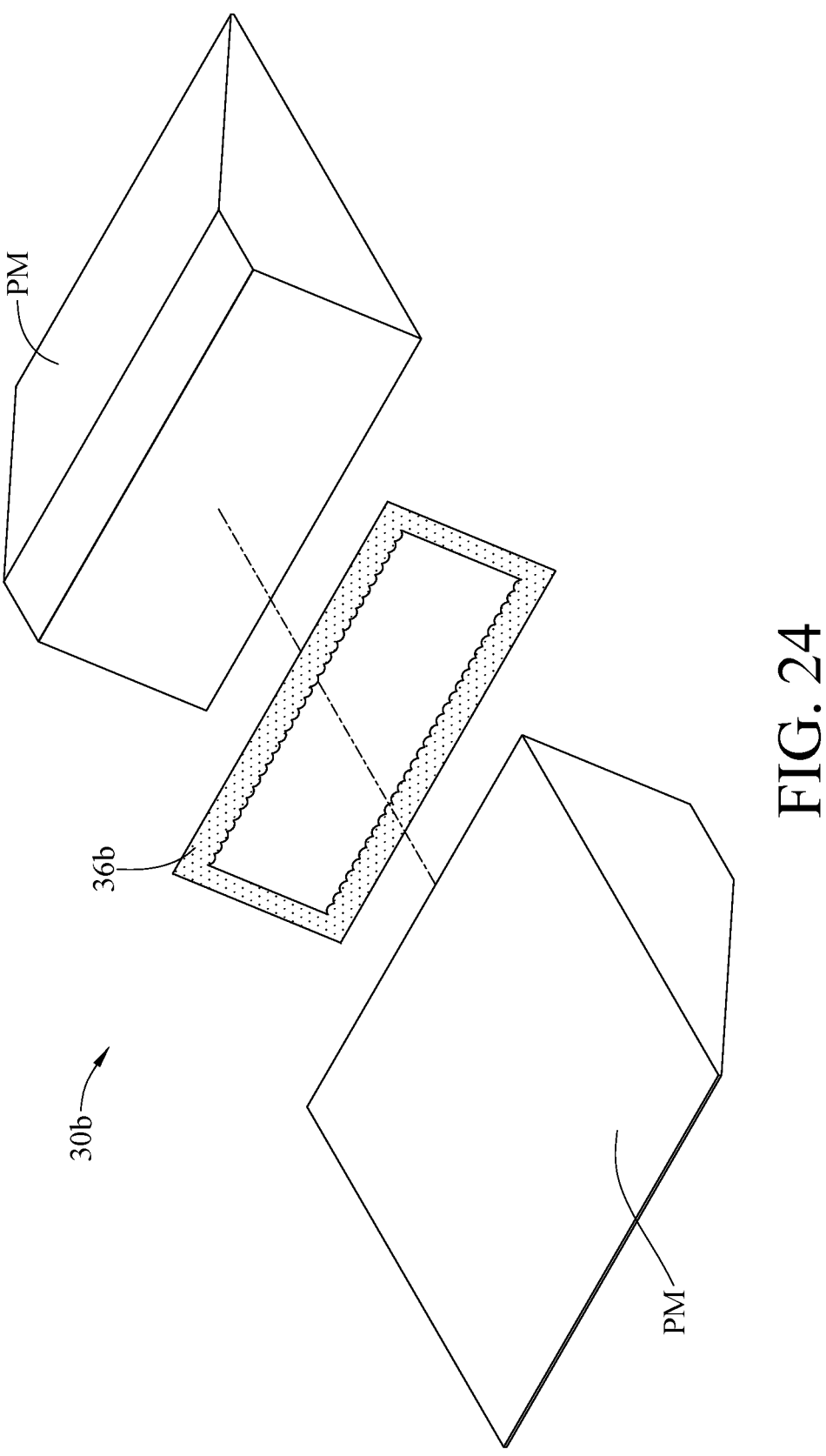
FIG. 24 is an exploded view of the light folding component of the imaging lens module in FIG. 16.

FIG. 16 is a perspective view of an imaging lens module according to the 2nd embodiment of the present disclosure, FIG. 17 is a cross-sectional view of the imaging lens module along line 17-17 in FIG. 16, FIG. 18 is a perspective view of a first retaining element of the imaging lens module in FIG. 16, FIG. 19 is a partial sectional view of the imaging lens module in FIG. 16, FIG. 20 is a bottom view of an optical element holder of the imaging lens module in FIG. 16, FIG. 21 is a perspective view of a light folding component of the imaging lens module in FIG. 16, FIG. 22 is a schematic view of the light folding component and a light shielding layer thereof in FIG. 21, FIG. 23 is an enlarged view of region EL4 in FIG. 22, and FIG. 24 is an exploded view of the light folding component of the imaging lens module in FIG. 16.

In this embodiment, an imaging lens module 1b includes an optical element holder 10b, a lens assembly 20b, an image surface IMG, a light folding component 30b, a first retaining element 40b and a plurality of alignment structures 50b.

The optical element holder 10b is one-piece formed and includes a lens element accommodation portion 11b and a folding component accommodation portion 12b. Each of two side surfaces of the optical element holder 10b has a light through hole LPH, and the light passes through the optical element holder 10b via the two light through holes LPH.

The lens assembly 20b is disposed in the lens element accommodation portion 11b of the optical element holder 10b, and the lens assembly 20b includes a plurality of lens elements LE, a second retaining element 22b and a plurality of optical shutters and spacers (their reference numerals are omitted). The light entering the optical element holder 10b passes through the lens elements LE of the lens assembly 20b. Furthermore, the second retaining element 22b supports and is in physical contact with the lens elements LE, such that the lens elements LE are fixed to the lens element accommodation portion 11b. Moreover, the lens element accommodation portion 11b is at a constant distance from the image surface IMG.

The light folding component 30b is disposed in the folding component accommodation portion 12b of the optical element holder 10b and disposed corresponding to the lens elements LE of the lens assembly 20b, and the light folding component 30b is located at an image side of the lens assembly 20b. The light folding component 30b includes a light receive surface 31b, four reflection surfaces 32b, 33b, 34b and 35b and a light exit surface 39b. The light enters the light folding component 30b from the light receive surface 31b, the reflection surfaces 32b, 33b, 34b and 35b are configured to reflect the light coming from the light receive surface 31b so as to redirect the light, and the light exits the light folding component 30b from the light exit surface 39b.

As shown in FIG. 18, the first retaining element 40b has a plurality of corresponsive surfaces 41b in physical contact with the light folding component 30b, and the corresponsive surfaces 41b provide the light folding component 30b with a normal force, such that the light folding component 30b tightly fits to the folding component accommodation portion 12b of the optical element holder 10b. As seen in FIG. 18 and FIG. 19, the first retaining element 40b includes a plurality of first recesses 43b, and adhesives GE1 are respectively disposed in the first recesses 43b, so that the first retaining element 40b and the folding component accommodation portion 12b are fixed to each other via the adhesives GE1.

Referring to FIG. 20, the alignment structures 50b are disposed on the folding component accommodation portion 12b of the optical element holder 10b, and each of the alignment structures 50b has a contact surface 51b in physical contact with the light folding component 30b. In this embodiment, the alignment structures 50b are protrusions protruding from the folding component accommodation portion 12b. In addition, as shown in FIG. 19 and FIG. 20, the folding component accommodation portion 12b includes a plurality of second recesses 120b, and adhesives GE2 are respectively disposed in the second recesses 120b, so that the folding component accommodation portion 12b and the light folding component 30b are fixed to each other via the adhesives GE2.

In this embodiment, the light folding component 30b reflects the light multiple times by the reflection surfaces 32b, 33b, 34b and 35b, and the light travelling path is thus folded multiple times. Furthermore, as shown in FIG. 17, the light undergoes total internal reflection at the reflection surface 33b and the reflection surface 34b of the light folding component 30b, and the light is reflected at the reflection surface 32b and the reflection surfaces 35b of the light folding component 30 by reflection layers on the reflection surface 32b and the reflection surfaces 35b. Moreover, the reflection surface 32b and the reflection surfaces 35b are disposed parallel to each other, and the reflection surface 33b and the reflection surface 34b are disposed parallel to each other.

In this embodiment, the light folding component 30b is a combination of two prisms PM, and the light folding component 30b further includes a plurality of light shielding layers 36b.

As shown in FIG. 21 to FIG. 24, the light shielding layers 36b are respectively disposed on a part of an outer surface of the light folding component 30b and between the two cemented prisms PM so as to prevent interference by external light rays and eliminating stray light, respectively. Moreover, when a light transmission rate of each of the light shielding layers 36b is T %, the following condition is satisfied: T % 0.2%. Moreover, the light shielding layer 36b disposed between the two cemented prisms PM is in an annular shape and surrounds a light passing region LPR in the light folding component 30b, and the annular light shielding layer 36b has a convex-concave structure VCS, such that the annular light shielding layer 36b has an undulating shape.

Figure 25:
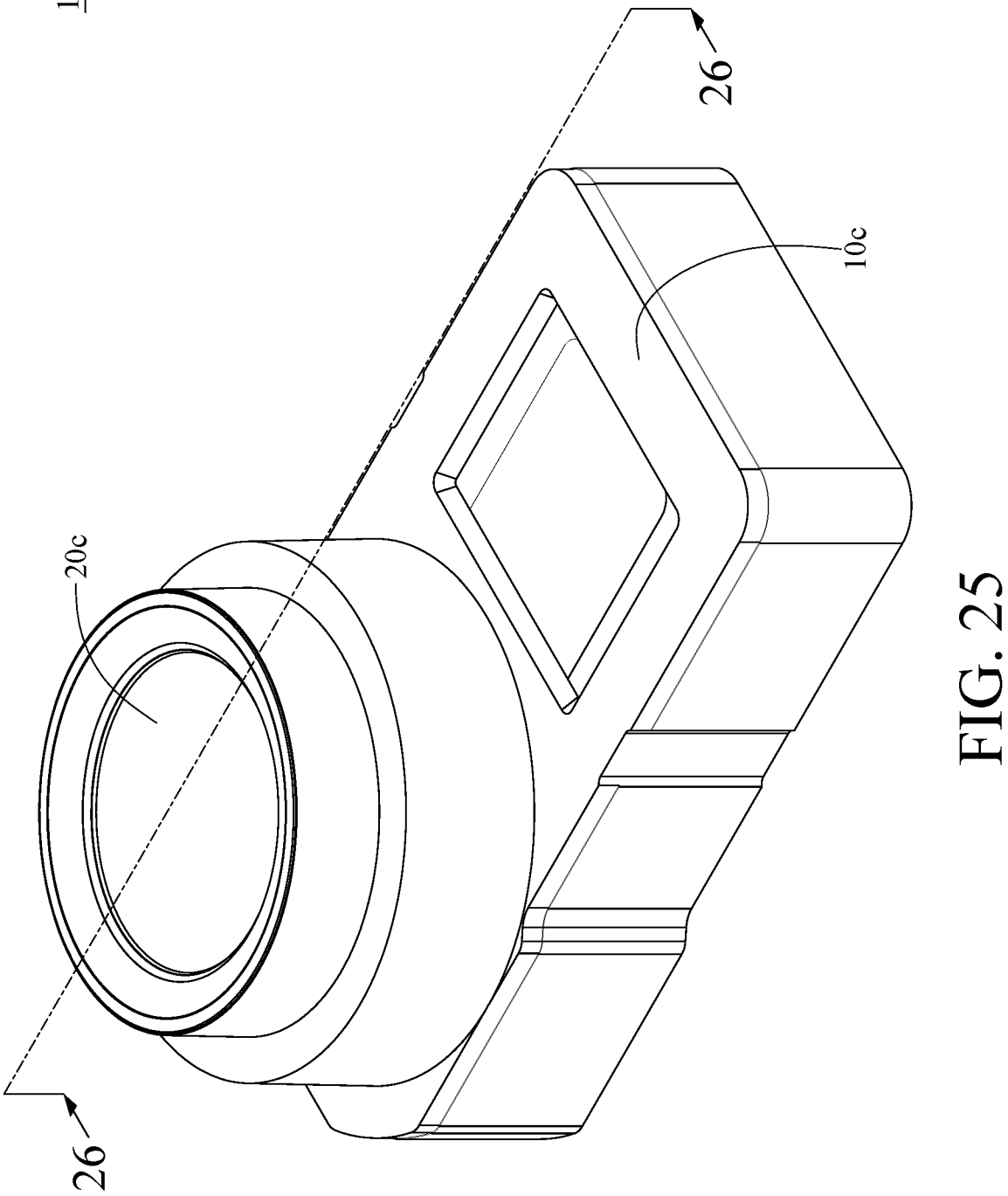
FIG. 25 is a perspective view of an imaging lens module according to the 3rd embodiment of the present disclosure.
Figure 26:
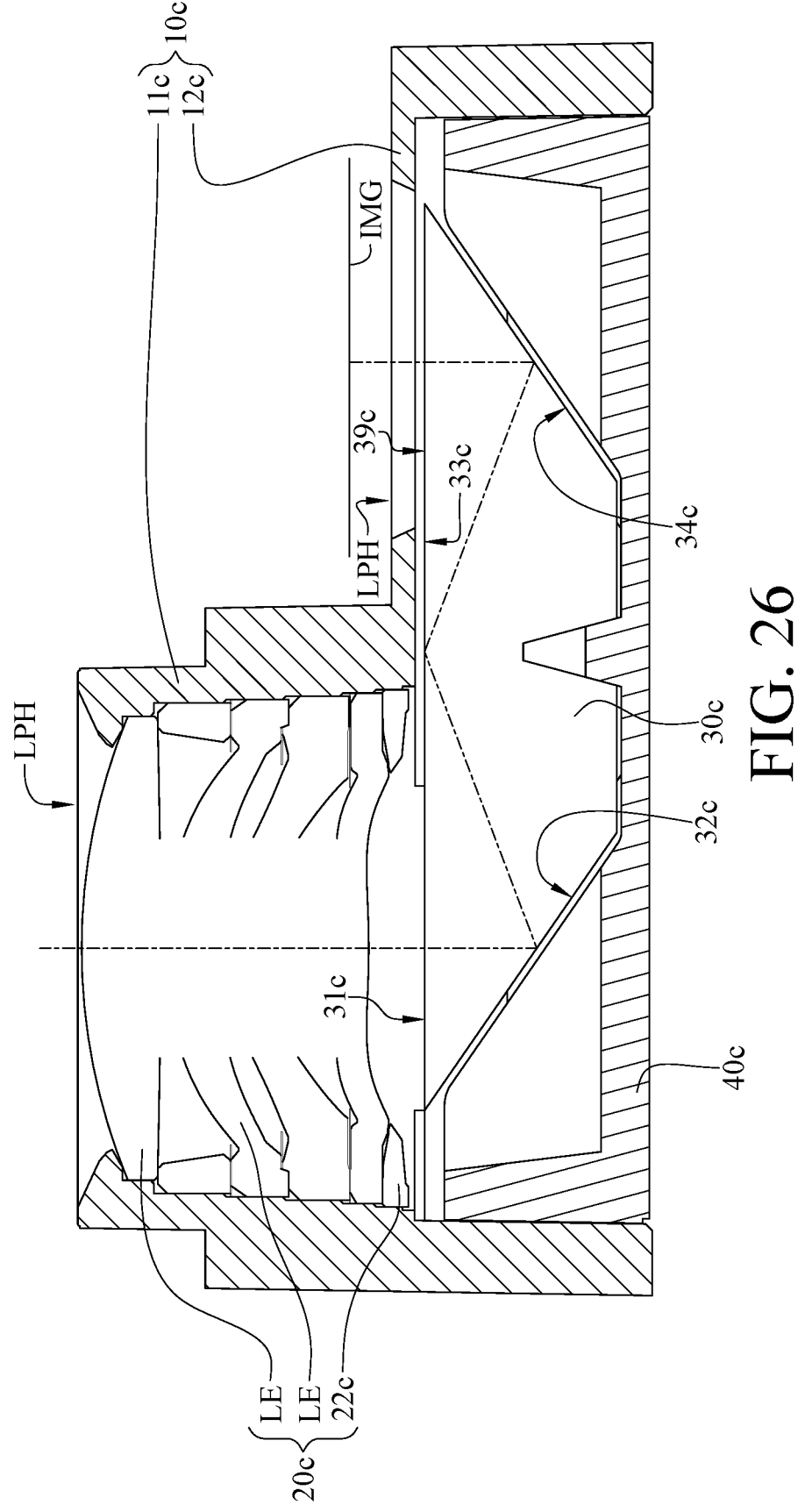
FIG. 26 is a cross-sectional view of the imaging lens module along line 26-26 in FIG. 25.
Figure 27:
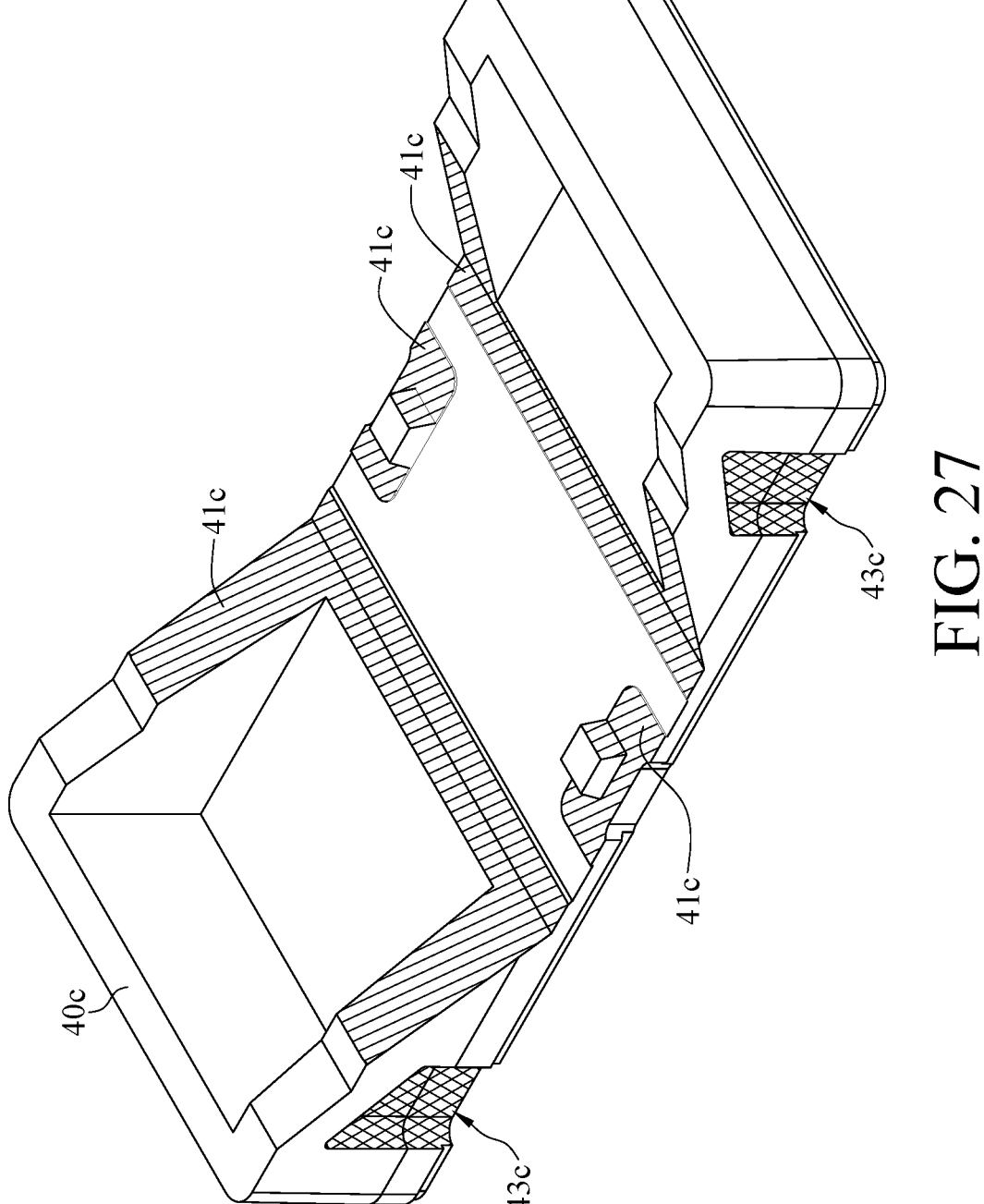
FIG. 27 is a perspective view of a first retaining element of the imaging lens module in FIG. 25.
Figure 28:
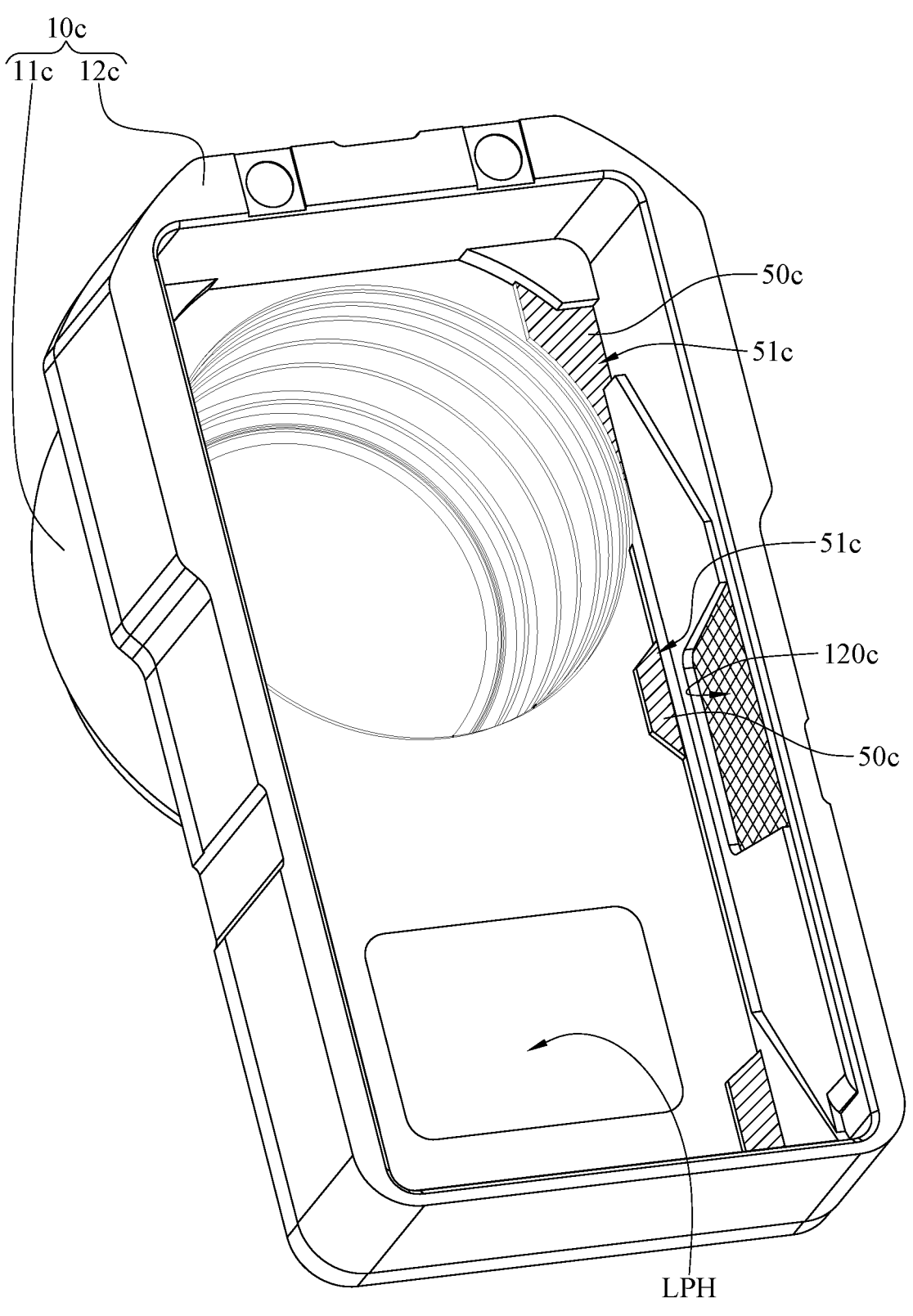
FIG. 28 is a bottom view of an optical element holder of the imaging lens module in FIG. 25.
Figure 29:
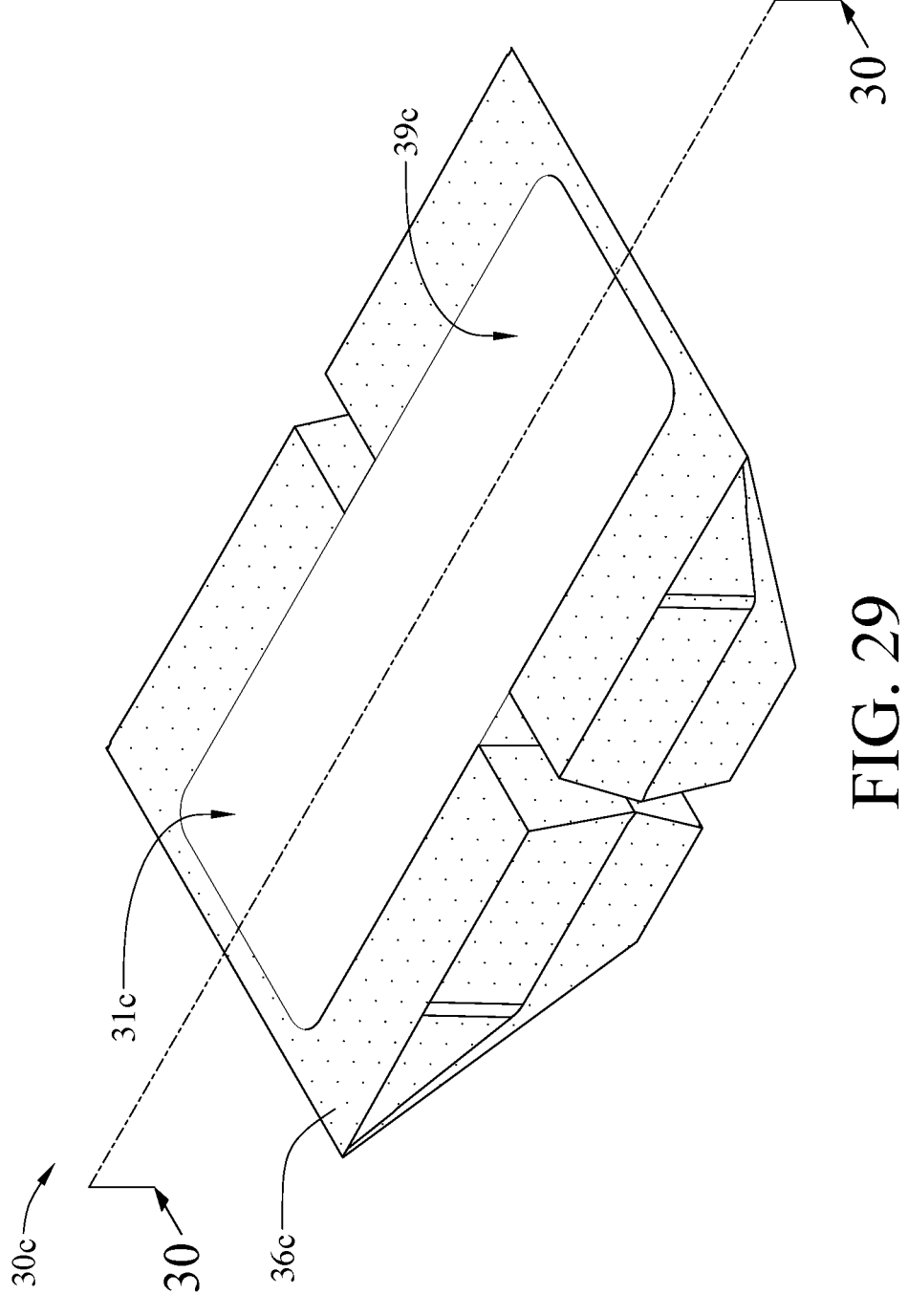
FIG. 29 is a perspective view of a light folding component of the imaging lens module in FIG. 25.
Figure 30:
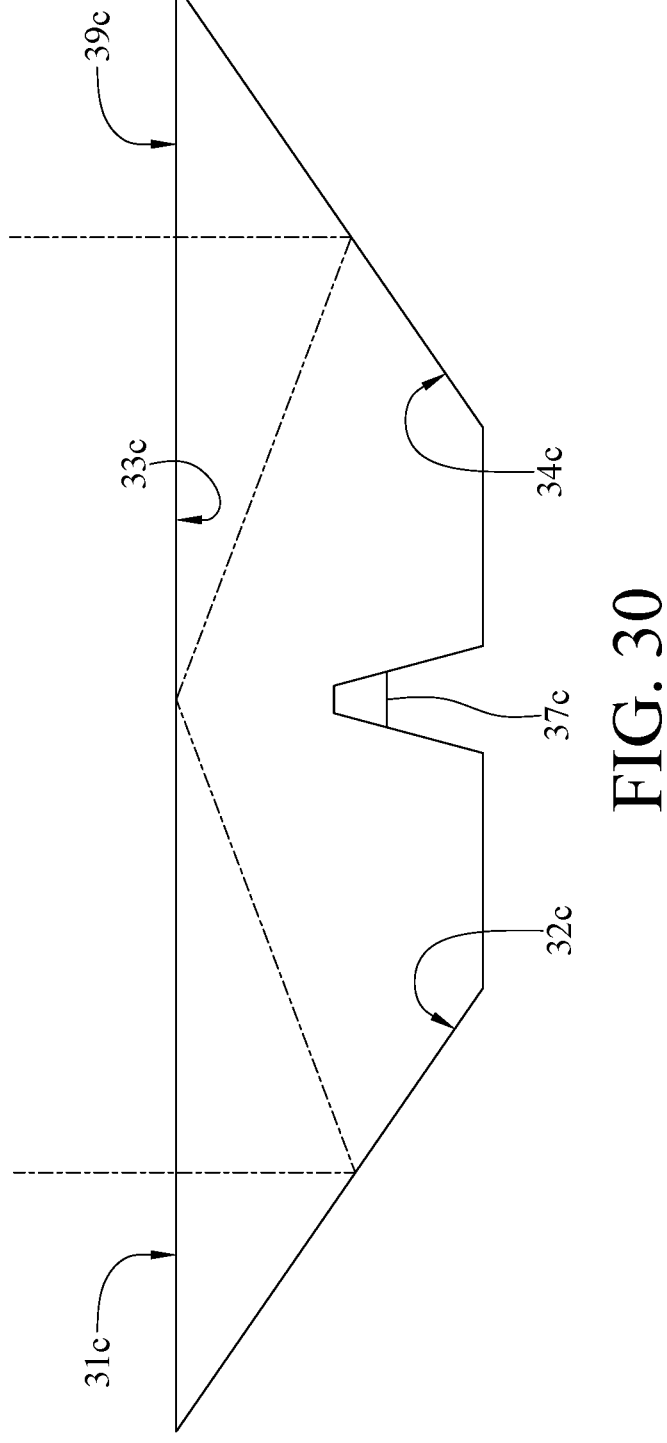
FIG. 30 is a cross-sectional view of the light folding component along line 30-30 in FIG. 29.

FIG. 25 is a perspective view of an imaging lens module according to the 3rd embodiment of the present disclosure, FIG. 26 is a cross-sectional view of the imaging lens module along line 26-26 in FIG. 25, FIG. 27 is a perspective view of a first retaining element of the imaging lens module in FIG. 25, FIG. 28 is a bottom view of an optical element holder of the imaging lens module in FIG. 25, FIG. 29 is a perspective view of a light folding component of the imaging lens module in FIG. 25, and FIG. 30 is a cross-sectional view of the light folding component along line 30-30 in FIG. 29.

In this embodiment, an imaging lens module 1c includes an optical element holder 10c, a lens assembly 20c, an image surface IMG, a light folding component 30c, a first retaining element 40c and a plurality of alignment structures 50c.

The optical element holder 10c is one-piece formed and includes a lens element accommodation portion 11c and a folding component accommodation portion 12c. Each of two side surfaces of the optical element holder 10c has a light through hole LPH, and the light passes through the optical element holder 10c via the two light through holes LPH.

The lens assembly 20c is disposed in the lens element accommodation portion 11c of the optical element holder 10c, and the lens assembly 20c includes a plurality of lens elements LE, a second retaining element 22c and a plurality of optical shutters and spacers (their reference numerals are omitted). The light entering the optical element holder 10c passes through the lens elements LE of the lens assembly 20c. Furthermore, the second retaining element 22c supports and is in physical contact with the lens elements LE, such that the lens elements LE are fixed to the lens element accommodation portion 11$c$. Moreover, the lens element accommodation portion 11$c$ is at a constant distance from the image surface IMG.

The light folding component 30$c$ is disposed in the folding component accommodation portion 12$c$ of the optical element holder 10$c$ and disposed corresponding to the lens elements LE of the lens assembly 20$c$, and the light folding component 30$c$ is located at an image side of the lens assembly 20$c$. The light folding component 30$c$ includes a light receive surface 31$c$, three reflection surfaces 32$c$, 33$c$ and 34$c$ and a light exit surface 39$c$. The light enters the light folding component 30$c$ from the light receive surface 31$c$, the reflection surfaces 32$c$, 33$c$ and 34$c$ are configured to reflect the light coming from the light receive surface 31$c$ so as to redirect the light, and the light exits the light folding component 30$c$ from the light exit surface 39$c$.

As shown in FIG. 27, the first retaining element 40$c$ has a plurality of corresponsive surfaces 41$c$ in physical contact with the light folding component 30$c$, and the corresponsive surfaces 41$c$ provide the light folding component 30$c$ with a normal force, such that the light folding component 30$c$ tightly fits to the folding component accommodation portion 12$c$ of the optical element holder 10$c$. Moreover, the first retaining element 40$c$ includes a plurality of first recesses 43$c$, and adhesives GE1 are respectively disposed in the first recesses 43$c$, so that the first retaining element 40$c$ and the folding component accommodation portion 12$c$ are fixed to each other via the adhesives GE1.

Referring to FIG. 28, the alignment structures 50$c$ are disposed on the folding component accommodation portion 12$c$ of the optical element holder 10$c$, and each of the alignment structures 50$c$ has a contact surface 51$c$ in physical contact with the light folding component 30$c$. In this embodiment, the alignment structures 50$c$ are protrusions protruding from the folding component accommodation portion 12$c$. In addition, the folding component accommodation portion 12$c$ includes a plurality of second recesses 120$c$, and adhesives GE2 are respectively disposed in the second recesses 120$c$, so that the folding component accommodation portion 12$c$ and the light folding component 30$c$ are fixed to each other via the adhesives GE2.

In this embodiment, the light folding component 30$c$ reflects the light multiple times by the reflection surfaces 32$c$, 33$c$ and 34$c$, and the light travelling path is thus folded multiple times. Furthermore, as shown in FIG. 26, the light undergoes total internal reflection at the reflection surface 33$c$ of the light folding component 30$c$, and the light is reflected at the reflection surface 32$c$ and the reflection surface 34$c$ of the light folding component 30$c$ by reflection layers on the reflection surface 32$c$ and the reflection surface 34$c$.

In this embodiment, the light folding component 30$c$ is a prism which is one-piece formed, and the light folding component 30$c$ further includes a light shielding layer 36$c$ and a light shielding structure 37$c$.

As shown in FIG. 29, the light shielding layer 36$c$ is disposed on a part of an outer surface of the light folding component 30$c$ so as to prevent interference by external light rays. Moreover, when a light transmission rate of the light shielding layer 36$c$ is T %, the following condition is satisfied: T % 0.2%.

As shown in FIG. 29 and FIG. 30, the light shielding structure 37$c$ is disposed between the reflection surface 32$c$ and the reflection surface 34$c$, and the light shielding structure 37$c$ is a recessed surface inwardly recessed from the outer surface of the light folding component 30$c$ so as to reduce an area of a light passing region in the light folding component 30$c$.

Figure 31:
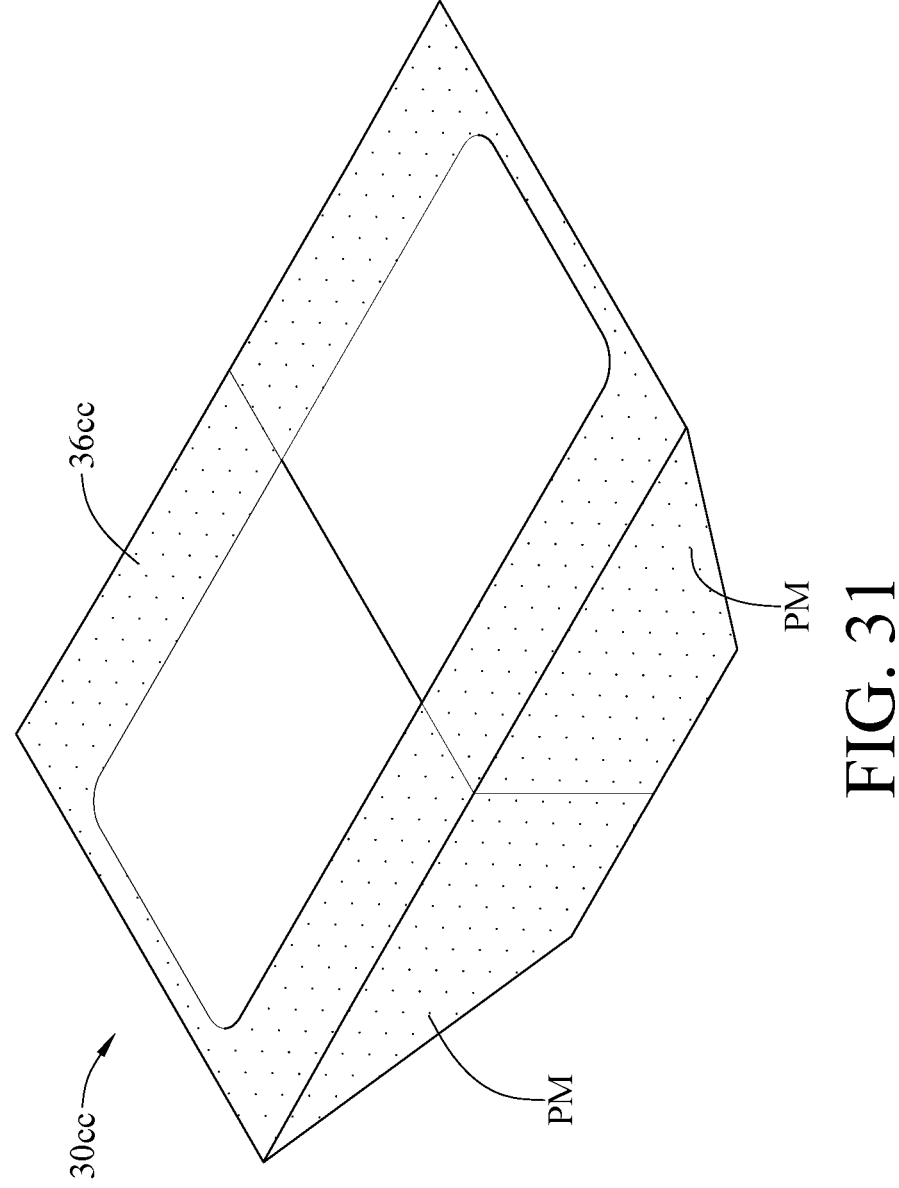
FIG. 31 is a perspective view of a light folding component of the imaging lens module in FIG. 25 according to another example of the present disclosure.
Figure 32:
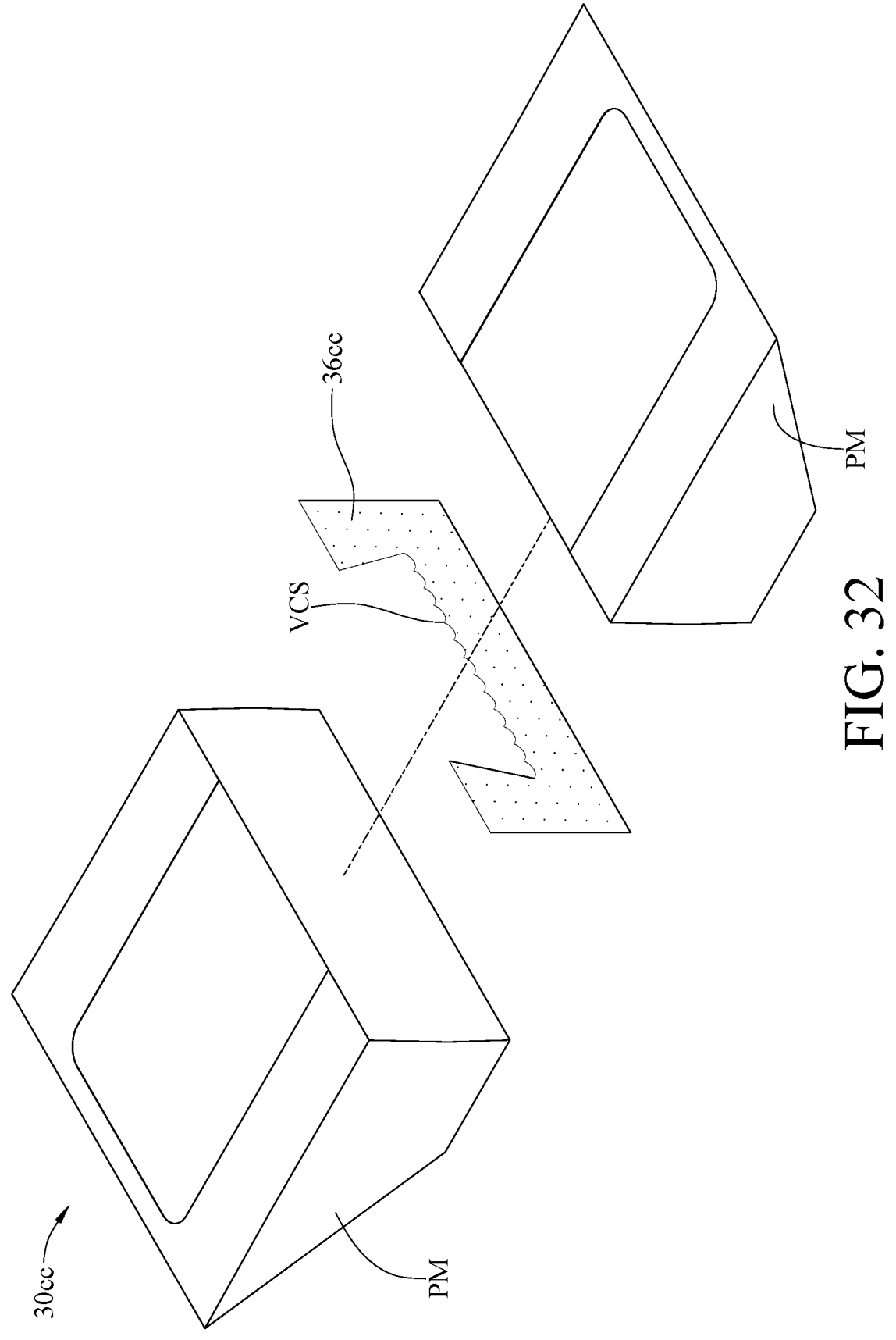
FIG. 32 is an exploded view of the light folding component in FIG. 31.

In this embodiment, the light folding component 30$c$ is a one-piece formed prism, but it is only one of various configurations, and the present disclosure is not limited thereto. Please refer to FIG. 31 and FIG. 32, where FIG. 31 is a perspective view of a light folding component of the imaging lens module in FIG. 25 according to another example of the present disclosure, and FIG. 32 is an exploded view of the light folding component in FIG. 31. In another example of this embodiment, a light folding component 30$cc$ is a combination of two prisms PM, and a plurality of light shielding layers 36$cc$ of the light folding component 30$cc$ are respectively disposed on a part of an outer surface of the light folding component 30$cc$ and between the two cemented prisms PM so as to prevent interference by external light rays and eliminating stray light, respectively. Moreover, the light shielding layer 36$cc$ disposed between the two cemented prisms PM has a convex-concave structure VCS, such that the annular light shielding layer 36$cc$ has an undulating shape.

4th Embodiment

Figure 33:
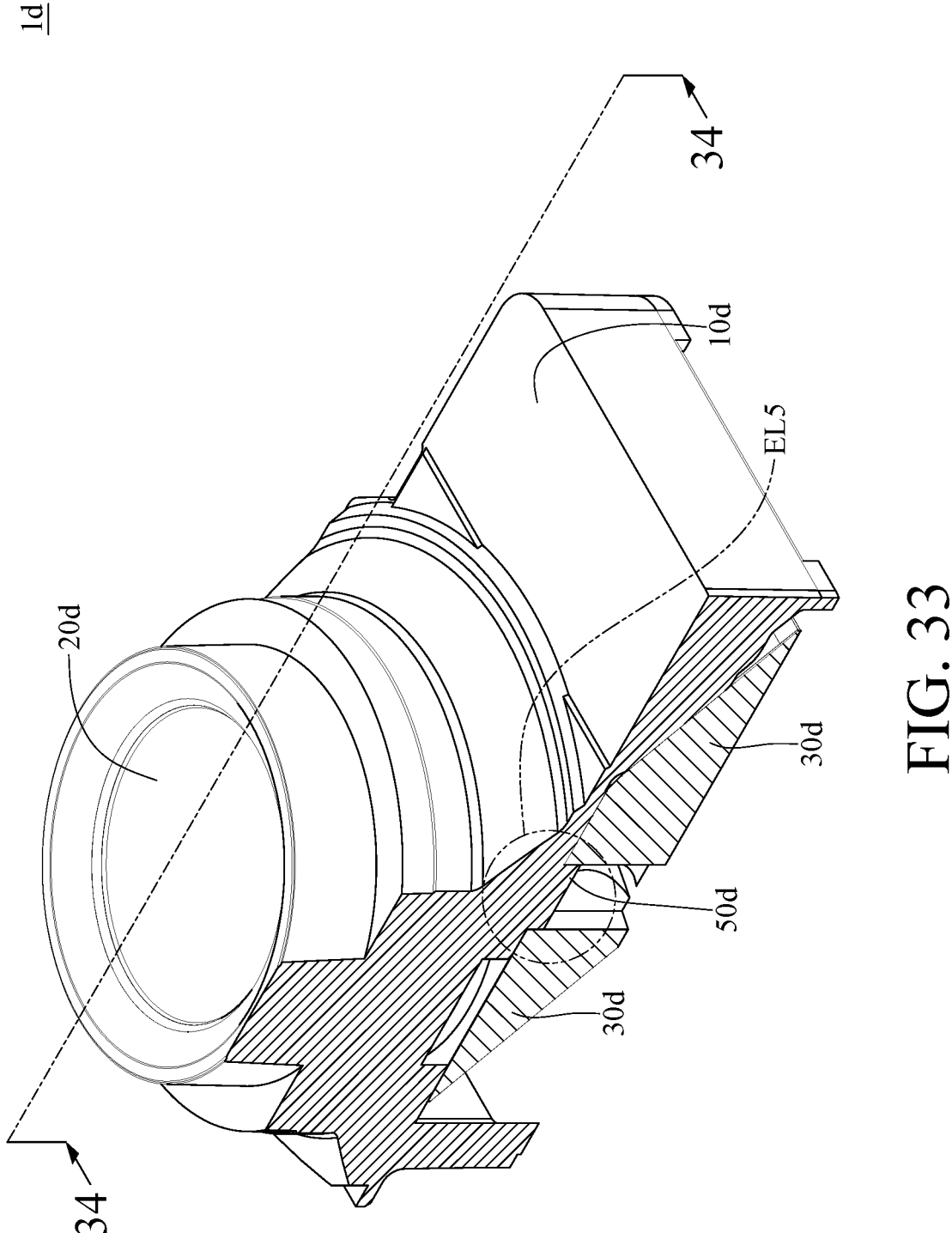
FIG. 33 is a sectional view of an imaging lens module according to the 4th embodiment of the present disclosure.
Figure 34:
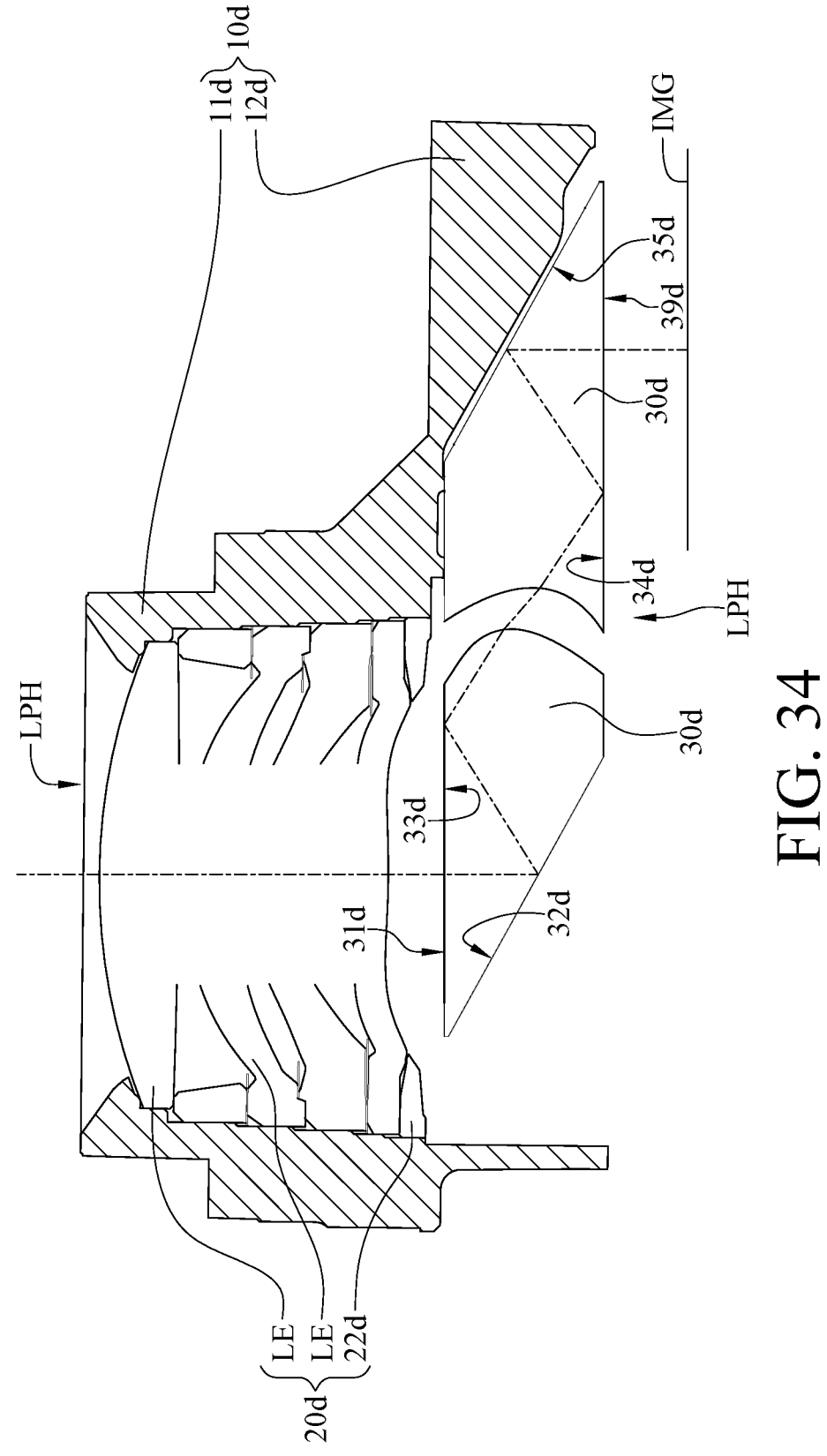
FIG. 34 is cross-sectional view of the imaging lens module along line 34-34 in FIG. 33.
Figure 35:
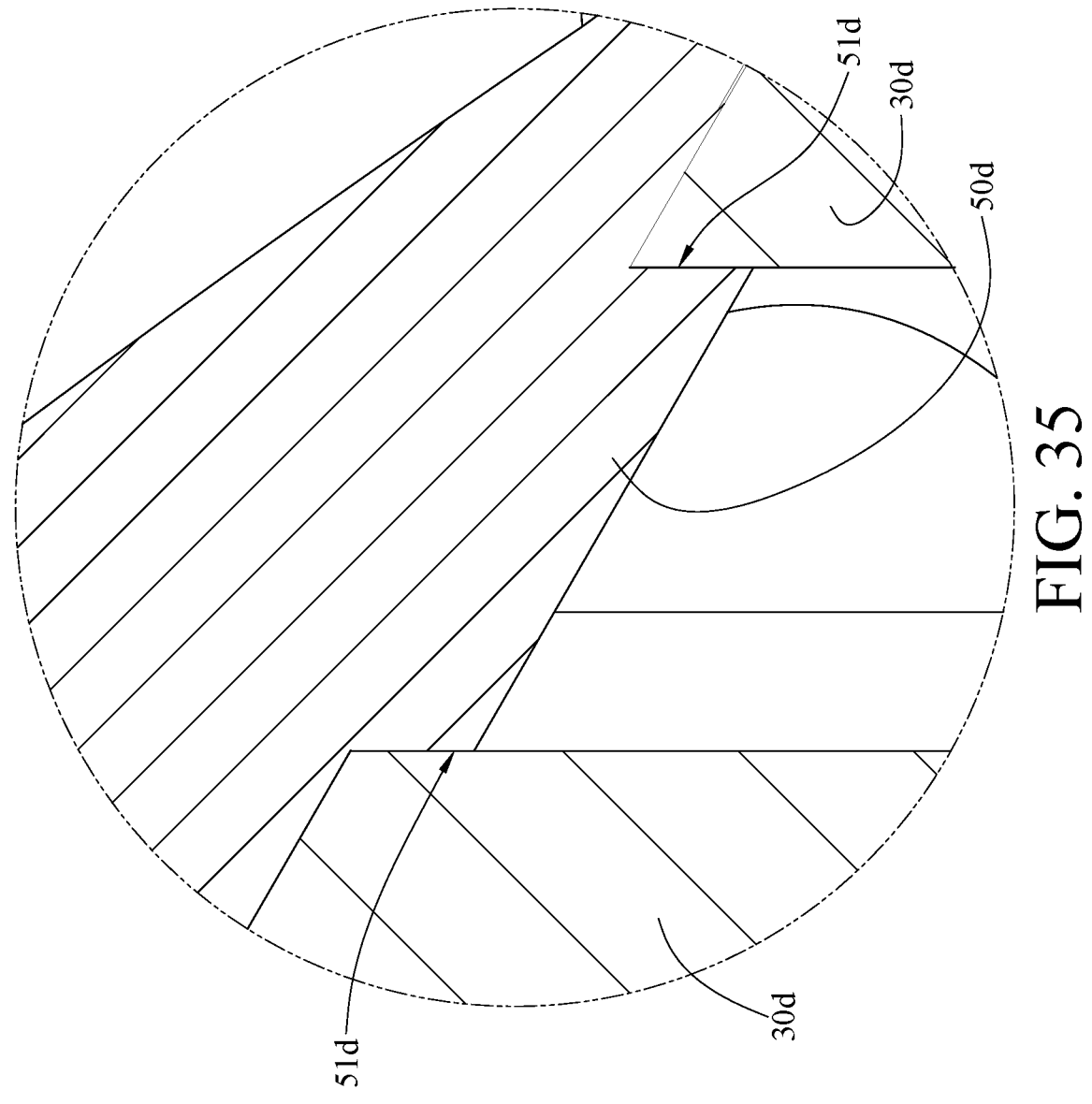
FIG. 35 is an enlarged view of region EL5 in FIG. 33.
Figure 36:
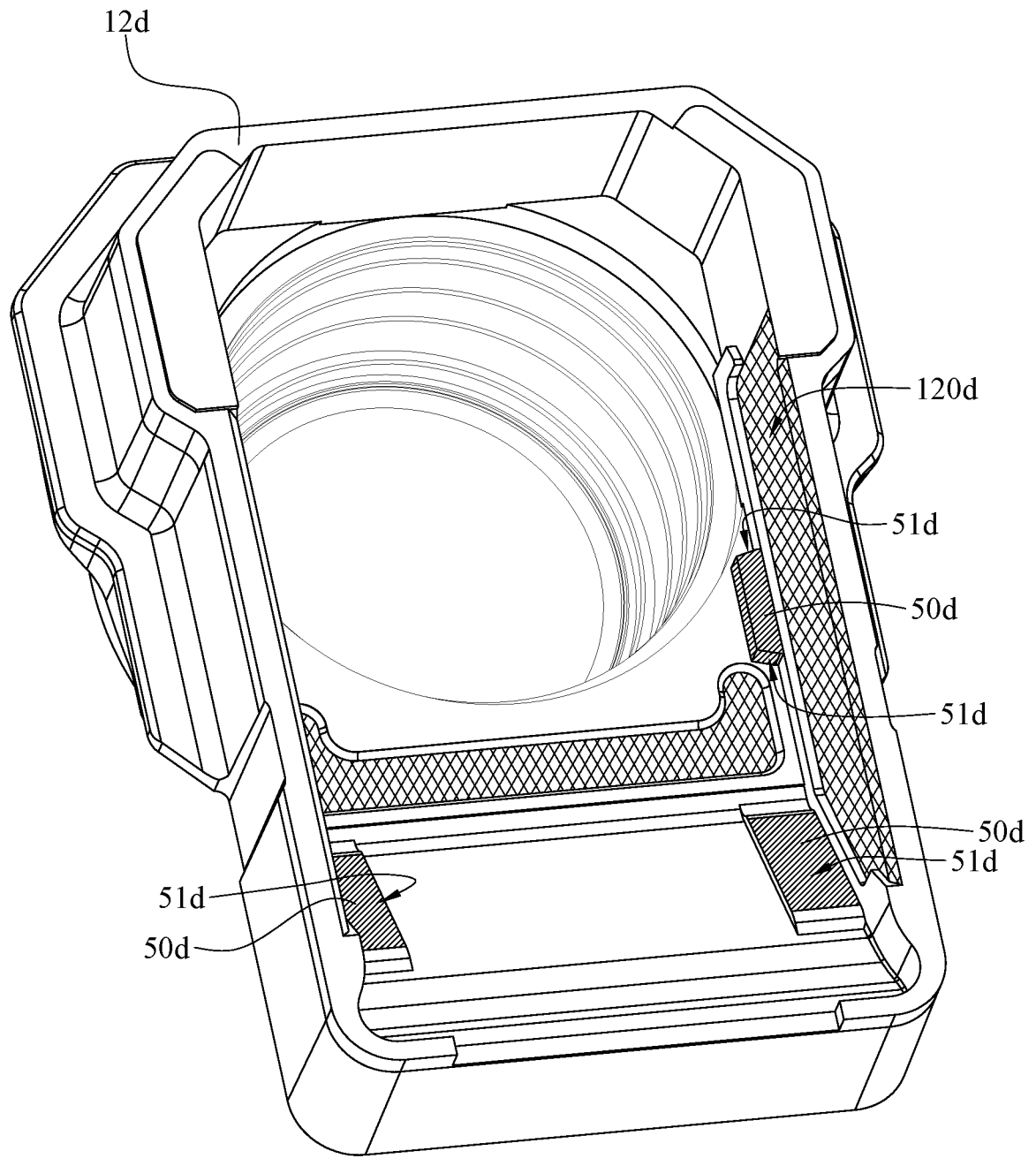
FIG. 36 is a bottom view of an optical element holder of the imaging lens module according to the 4th embodiment of the present disclosure.
Figure 37:
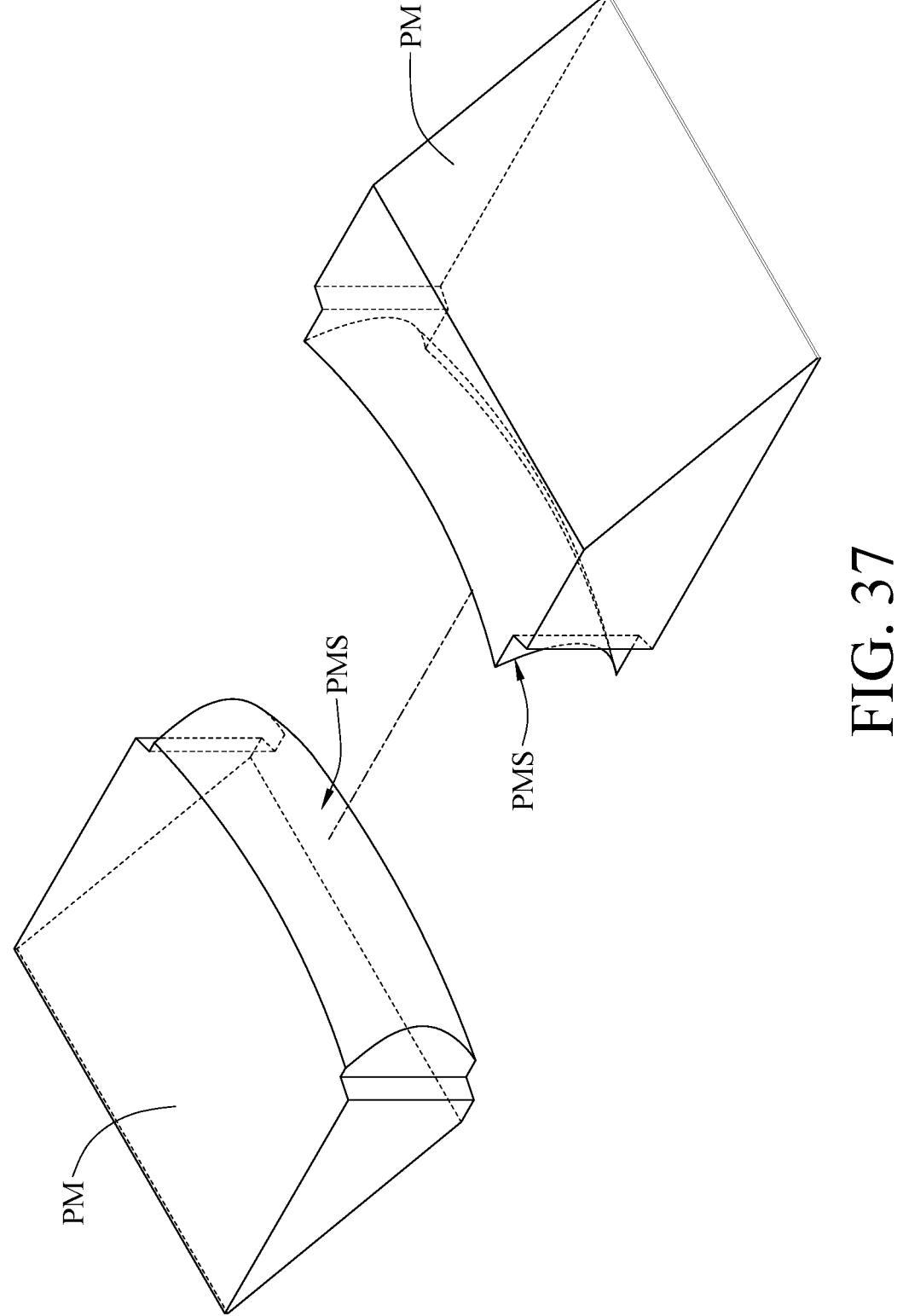
FIG. 37 is an exploded view of a light folding component of the imaging lens module according to the 4th embodiment of the present disclosure.

FIG. 33 is a sectional view of an imaging lens module according to the 4th embodiment of the present disclosure, FIG. 34 is cross-sectional view of the imaging lens module along line 34-34 in FIG. 33, FIG. 35 is an enlarged view of region EL5 in FIG. 33, FIG. 36 is a bottom view of an optical element holder of the imaging lens module according to the 4th embodiment of the present disclosure, and FIG. 37 is an exploded view of a light folding component of the imaging lens module according to the 4th embodiment of the present disclosure.

In this embodiment, an imaging lens module 1$d$ includes an optical element holder 10$d$, a lens assembly 20$d$, an image surface IMG, a light folding component 30$d$ and a plurality of alignment structures 50$d$.

The optical element holder 10$d$ is one-piece formed and includes a lens element accommodation portion 11$d$ and a folding component accommodation portion 12$d$. Each of two side surfaces of the optical element holder 10$d$ has a light through hole LPH, and the light passes through the optical element holder 10$d$ via the two light through holes LPH.

The lens assembly 20$d$ is disposed in the lens element accommodation portion 11$d$ of the optical element holder 10$d$, and the lens assembly 20$d$ includes a plurality of lens elements LE, a second retaining element 22$d$ and a plurality of optical shutters and spacers (their reference numerals are omitted). The light entering the optical element holder 10$d$ passes through the lens elements LE of the lens assembly 20$d$. Furthermore, the second retaining element 22$d$ supports and is in physical contact with the lens elements LE, such that the lens elements LE are fixed to the lens element accommodation portion 11$d$. Moreover, the lens element accommodation portion 11$d$ is at a constant distance from the image surface IMG.

The light folding component 30$d$ is disposed in the folding component accommodation portion 12$d$ of the optical element holder 10$d$ and disposed corresponding to the lens elements LE of the lens assembly 20$d$, and the light folding component 30$d$ is located at an image side of the lens assembly 20$d$. The light folding component 30$d$ includes a light receive surface 31$d$, four reflection surfaces 32$d$, 33$d$, 34$d$ and 35$d$ and a light exit surface 39$d$. The light enters the light folding component 30d from the light receive surface 31d, the reflection surfaces 32d, 33d, 34d and 35d are configured to reflect the light coming from the light receive surface 31d so as to redirect the light, and the light exits the light folding component 30d from the light exit surface 39d.

Referring to FIG. 33, FIG. 35 and FIG. 36, the alignment structures 50d are disposed on the folding component accommodation portion 12d of the optical element holder 10d, and each of the alignment structures 50d has a contact surface 51d in physical contact with the light folding component 30d. In this embodiment, the alignment structures 50d are protrusions protruding from the folding component accommodation portion 12d. In addition, as shown in FIG. 36, the folding component accommodation portion 12d includes a plurality of second recesses 120d, and adhesives GE2 are respectively disposed in the second recesses 120d, so that the folding component accommodation portion 12d and the light folding component 30d are fixed to each other via the adhesives GE2. In this embodiment, the light folding component 30d is positioned by the folding component accommodation portion 12d and the alignment structures 50d so as to be fixed in the folding component accommodation portion 12d.

In this embodiment, the light folding component 30d reflects the light multiple times by the reflection surfaces 32d, 33d, 34d and 35d, and the light travelling path is thus folded multiple times. Furthermore, as shown in FIG. 34, the light undergoes total internal reflection at the reflection surface 33d and the reflection surface 34d of the light folding component 30d, and the light is reflected at the reflection surface 32d and the reflection surface 35d of the light folding component 30d by reflection layers on the reflection surface 32d and the reflection surface 35d. Moreover, the reflection surface 32d and the reflection surface 35d are disposed parallel to each other, and the reflection surface 33d and the reflection surface 34d are disposed parallel to each other.

In this embodiment, the light folding component 30d is a combination of two prisms PM, and each of the prisms PM has a non-axisymmetric surface PMS, such that the prisms PM have refractive power.

5th Embodiment

Figure 38:
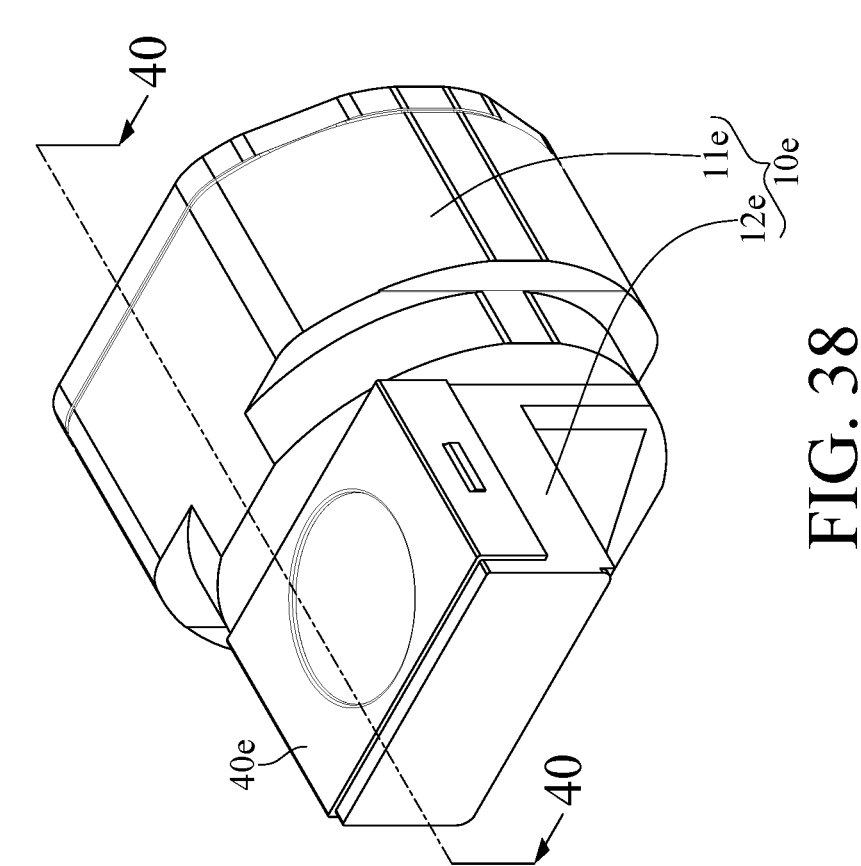
FIG. 38 is a perspective view of an imaging lens module according to the 5th embodiment of the present disclosure.
Figure 39:
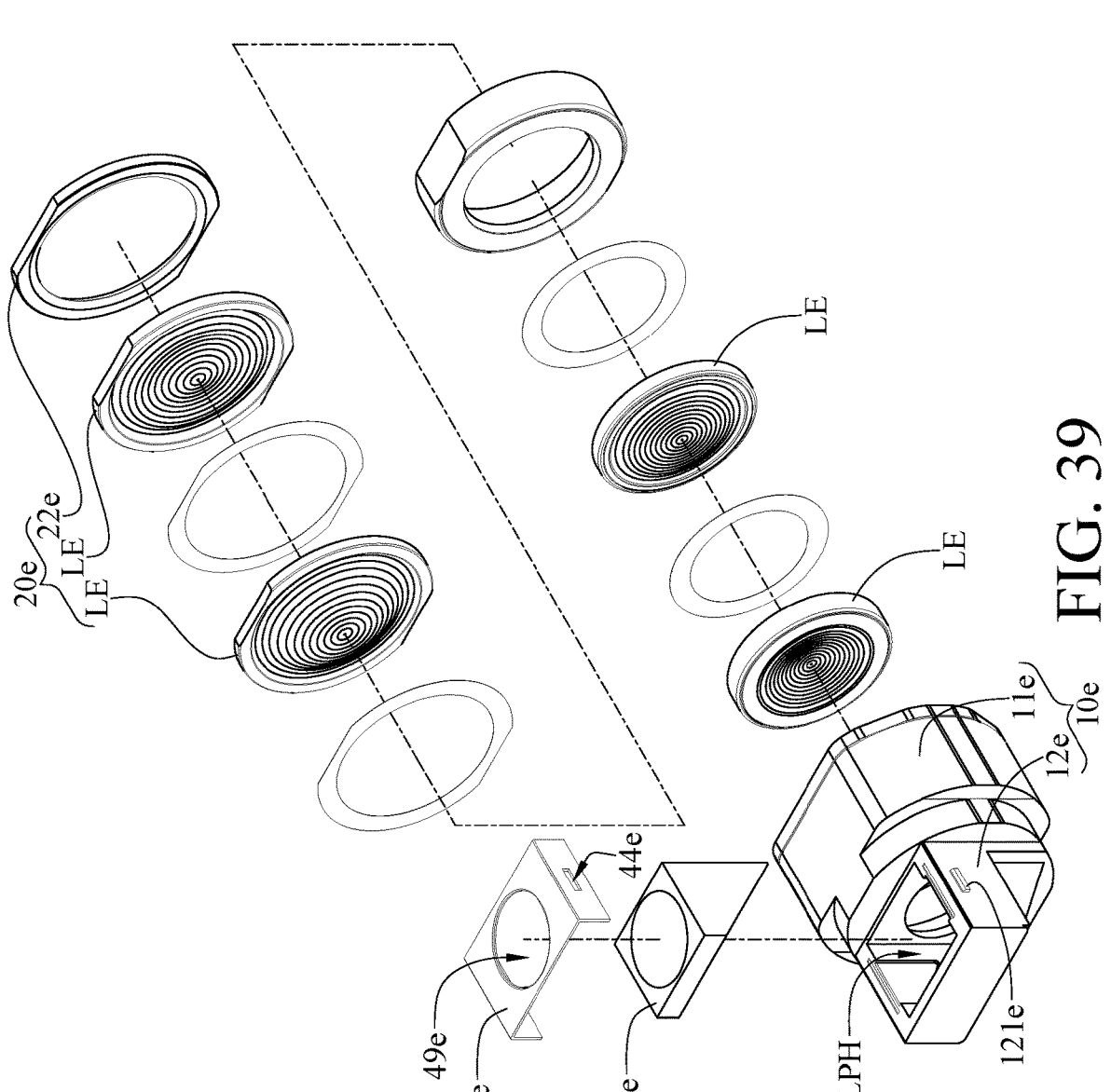
FIG. 39 is an exploded view of the imaging lens module in FIG. 38.
Figure 40:
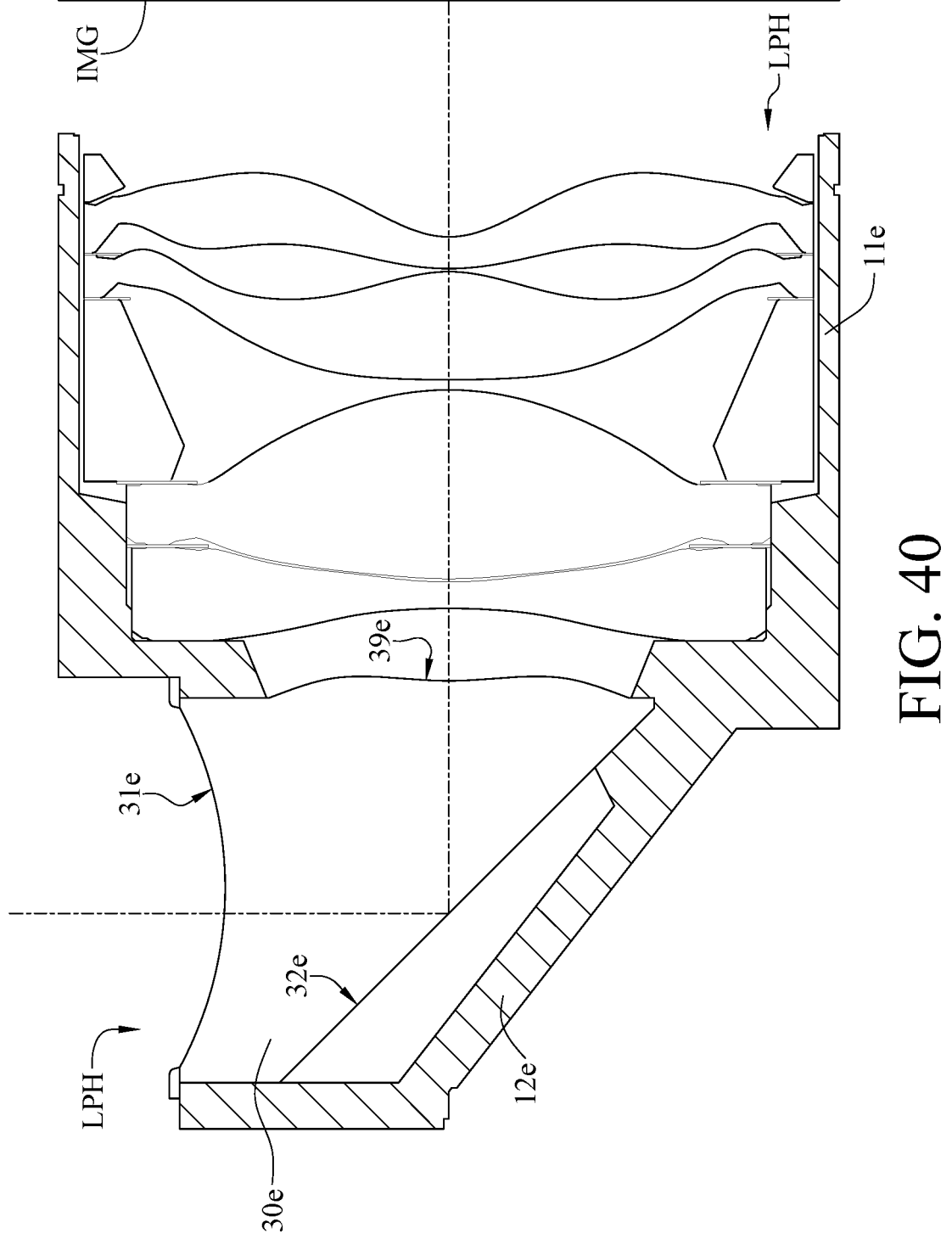
FIG. 40 is a cross-sectional view of the imaging lens module along line 40-40 in FIG. 38.
Figure 41:
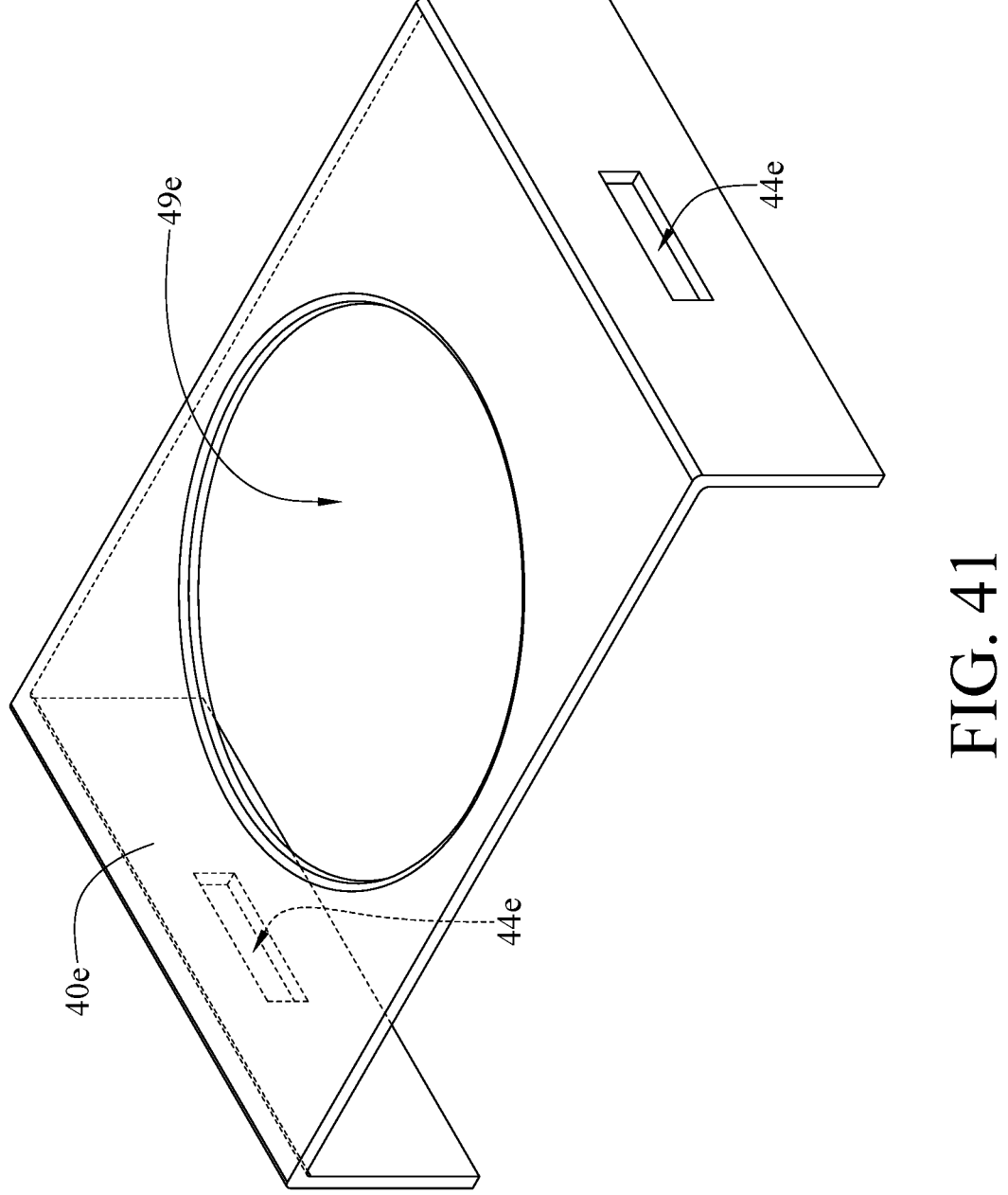
FIG. 41 is a perspective view of a first retaining element of the imaging lens module in FIG. 38.
Figure 42:
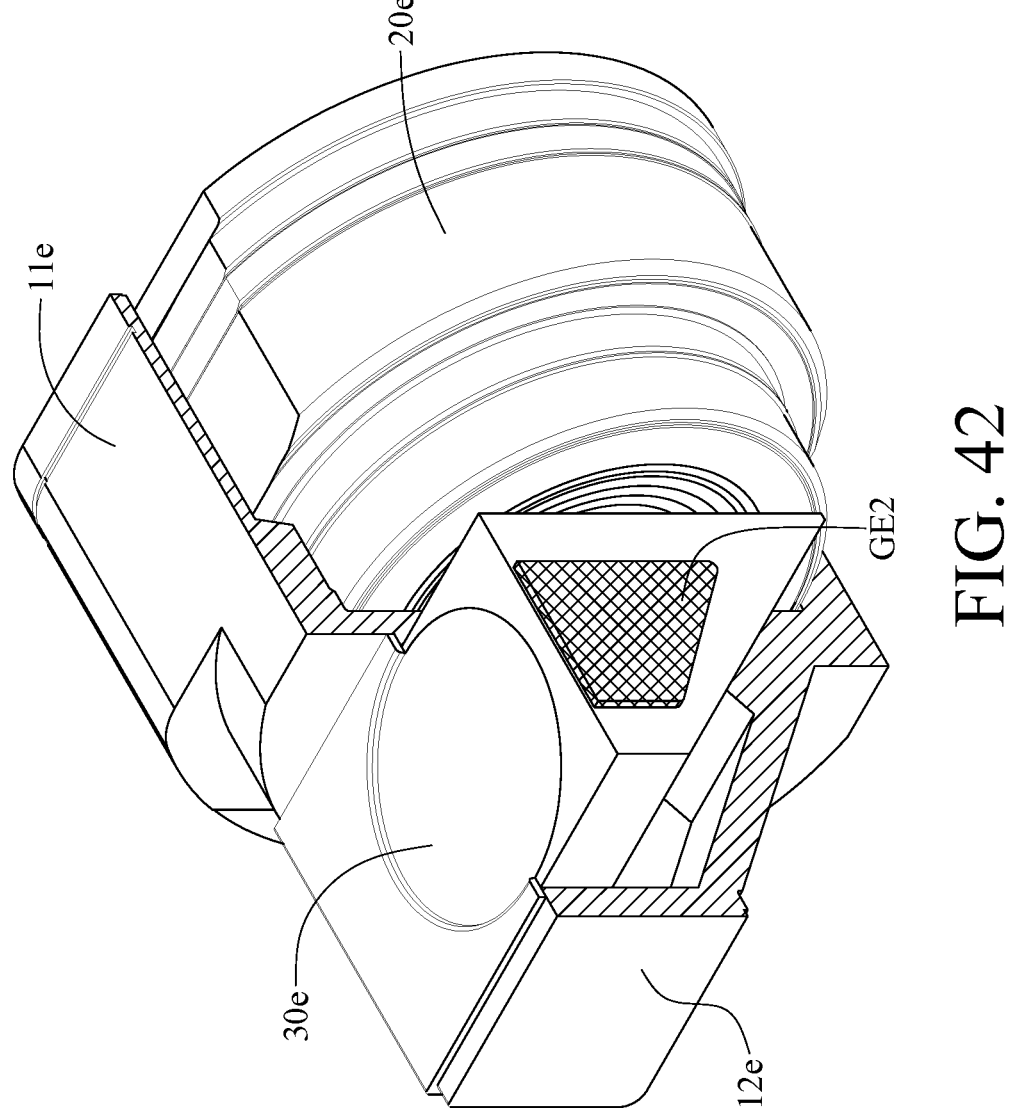
FIG. 42 is a partial sectional view of the imaging lens module in FIG. 38.
Figure 43:
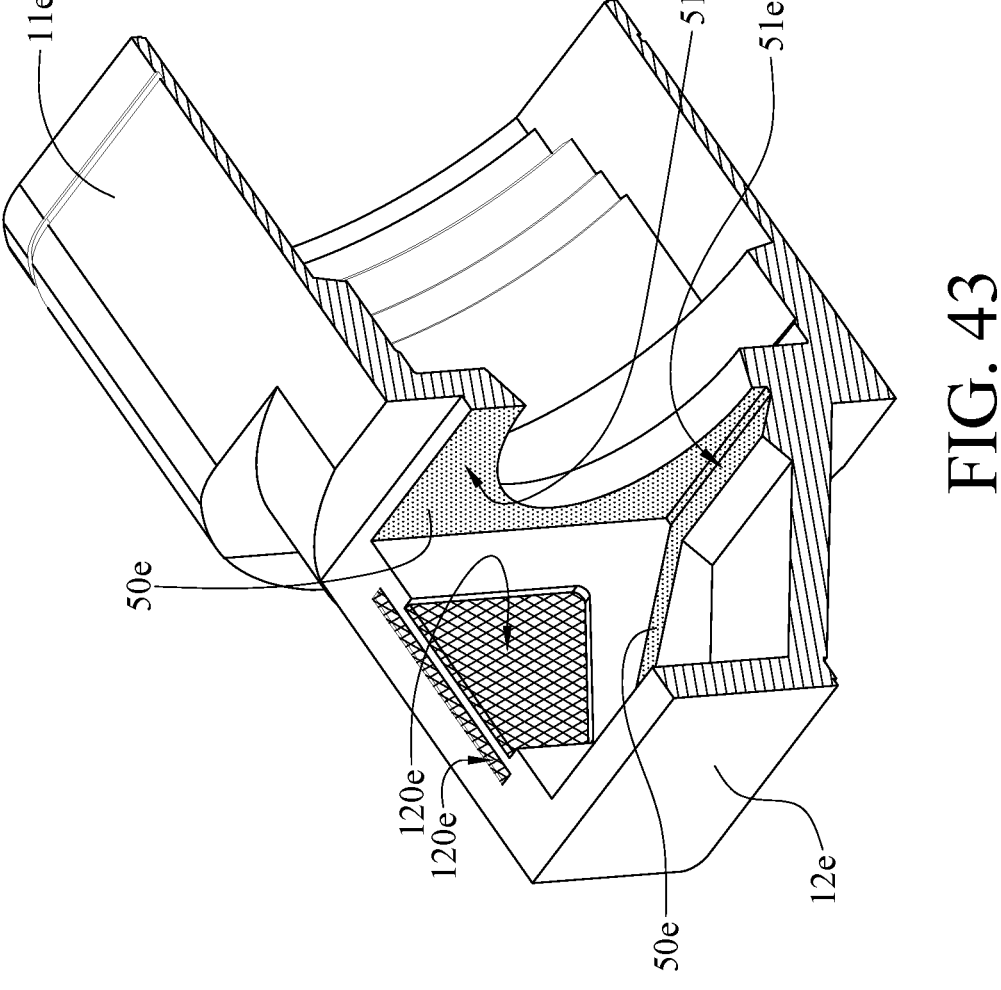
FIG. 43 is a sectional view of an optical element holder of the imaging lens module in FIG. 38.
Figure 44:
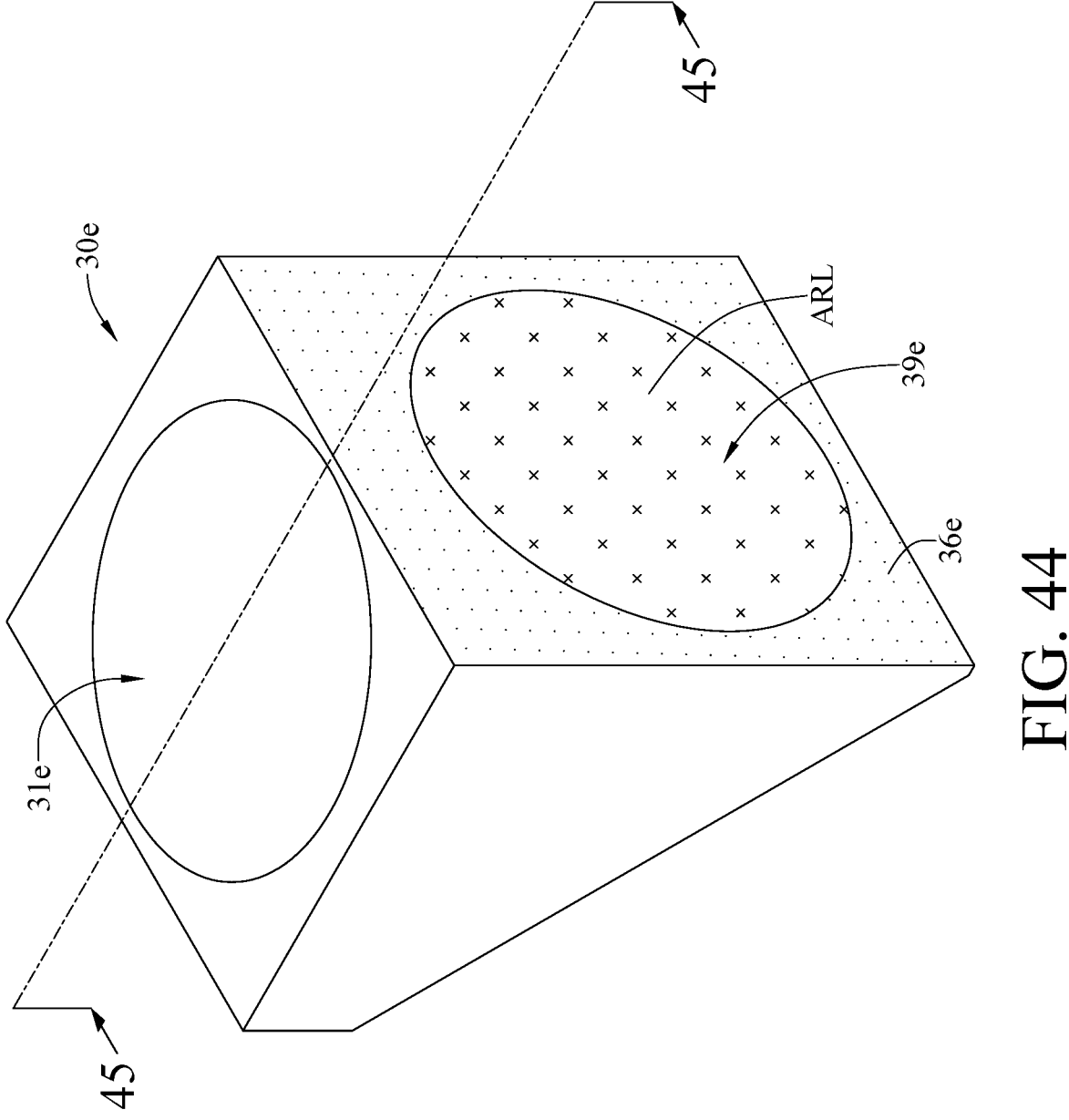
FIG. 44 is a perspective view of a light folding component of the imaging lens module in FIG. 38.
Figure 45:
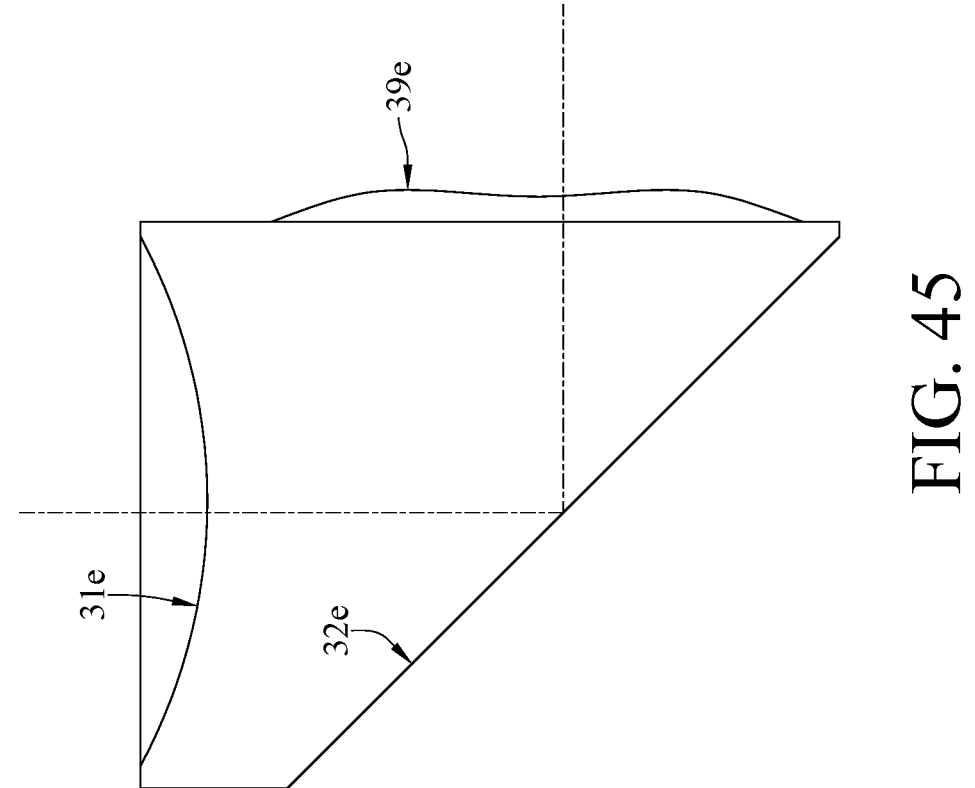
FIG. 45 is a cross-sectional view of the light folding component along line 45-45 in FIG. 44.

FIG. 38 is a perspective view of an imaging lens module according to the 5th embodiment of the present disclosure, FIG. 39 is an exploded view of the imaging lens module in FIG. 38, FIG. 40 is a cross-sectional view of the imaging lens module along line 40-40 in FIG. 38, FIG. 41 is a perspective view of a first retaining element of the imaging lens module in FIG. 38, FIG. 42 is a partial sectional view of the imaging lens module in FIG. 38, FIG. 43 is a sectional view of an optical element holder of the imaging lens module in FIG. 38, FIG. 44 is a perspective view of a light folding component of the imaging lens module in FIG. 38, and FIG. 45 is a cross-sectional view of the light folding component along line 45-45 in FIG. 44.

In this embodiment, an imaging lens module 1e includes an optical element holder 10e, a lens assembly 20e, an image surface IMG, a light folding component 30e, a first retaining element 40e and a plurality of alignment structures 50e.

The optical element holder 10e is one-piece formed and includes a lens element accommodation portion 11e and a folding component accommodation portion 12e. Each of two side surfaces of the optical element holder 10e has a light through hole LPH, and the light passes through the optical element holder 10e via the two light through holes LPH.

The lens assembly 20e is disposed in the lens element accommodation portion 11e of the optical element holder 10e, and the lens assembly 20e includes a plurality of lens elements LE, a second retaining element 22e and a plurality of optical shutters and spacers (their reference numerals are omitted). The light entering the optical element holder 10e passes through the lens elements LE of the lens assembly 20e. Furthermore, the second retaining element 22e supports and is in physical contact with the lens elements LE, such that the lens elements LE are fixed to the lens element accommodation portion 11e. Moreover, the lens element accommodation portion 11e is at a constant distance from the image surface IMG.

The light folding component 30e is disposed in the folding component accommodation portion 12e of the optical element holder 10e and disposed corresponding to the lens elements LE of the lens assembly 20e, and the light folding component 30e is located at an object side of the lens assembly 20e. The light folding component 30e includes a light receive surface 31e, a reflection surface 32e and a light exit surface 39e. The light enters the light folding component 30e from the light receive surface 31e, the reflection surface 32e is configured to reflect the light coming from the light receive surface 31e so as to redirect the light, and the light exits the light folding component 30e from the light exit surface 39e.

As shown in FIG. 38, FIG. 39 and FIG. 41, the first retaining element 40e is made of metal material and has two engagement holes 44e configured to engage two engagement protrusions 121e of the folding component accommodation portion 12e, such that the first retaining element 40e is fixed to the optical element holder 10e. Moreover, since the first retaining element 40e made of metal material is elastic, during assembly process, the first retaining element 40e can be pressed toward the optical element holder 10e so as to engage the engagement holes 44e of the first retaining element 40e with the engagement protrusions 121e of the folding component accommodation portion 12e, so that the first retaining element 40e is fixed to the optical element holder 10e. In this embodiment, a black material is coated on the surface of the first retaining element 40e, and an anti-reflection film layer is disposed on the surface of the black material so as to reduce a reflectivity of the metal surface of the first retaining element 40e, thereby preventing reflection of stray light.

The first retaining element 40e is in physical contact with the light folding component 30e so as to provide the light folding component 30e with a normal force, such that the light folding component 30e tightly fits to the folding component accommodation portion 12e of the optical element holder 10e. Moreover, the first retaining element 40e further has a light through hole 49e corresponding to the light receive surface 31e of the light folding component 30e.

Referring to FIG. 43, the alignment structures 50e are disposed on the folding component accommodation portion 12e of the optical element holder 10e, and each of the alignment structures 50e has a contact surface 51e in physical contact with the light folding component 30e. In this embodiment, the alignment structures 50e are flat surfaces on the folding component accommodation portion 12e. Furthermore, as shown in FIG. 42 and FIG. 43, the folding component accommodation portion 12e includes a plurality of second recesses 120e, and adhesives GE2 are respectively disposed in the second recesses 120e. The second recesses 120e respectively correspond to the light folding component 30e and the first retaining element 40e, so that the folding component accommodation portion 12e and the light folding component 30*e* are fixed to each other, and the folding component accommodation portion 12*e* and the first retaining element 40*e* are fixed to each other.

As shown in FIG. 40, the light is reflected at the reflection surface 32*e* of the light folding component 30*e* by a reflection layer on the reflection surface 32*e*. In this embodiment, the light folding component 30*e* is a prism which is one-piece formed, and the light folding component 30*e* further includes a light shielding layer 36*e*.

As shown in FIG. 44, the light shielding layer 36*e* is disposed on a part of an outer surface of the light folding component 30*e* so as to prevent interference by external light rays. Moreover, when a light transmission rate of the light shielding layer 36*e* is T %, the following condition is satisfied: T % 0.2%. In this embodiment, an anti-reflection layer ARL is disposed on the light exit surface 39*e* of the light folding component 30*e*.

Referring to FIG. 40 and FIG. 45, the light receive surface 31*e* and the light exit surface 39*e* of the light folding component 30*e* are freeform surfaces. In specific, the light receive surface 31*e* is a spherical surface, and the light exit surface 39*e* is an aspheric surface, such that the light folding component 30*e* has refractive power.

6th Embodiment

Figure 46:
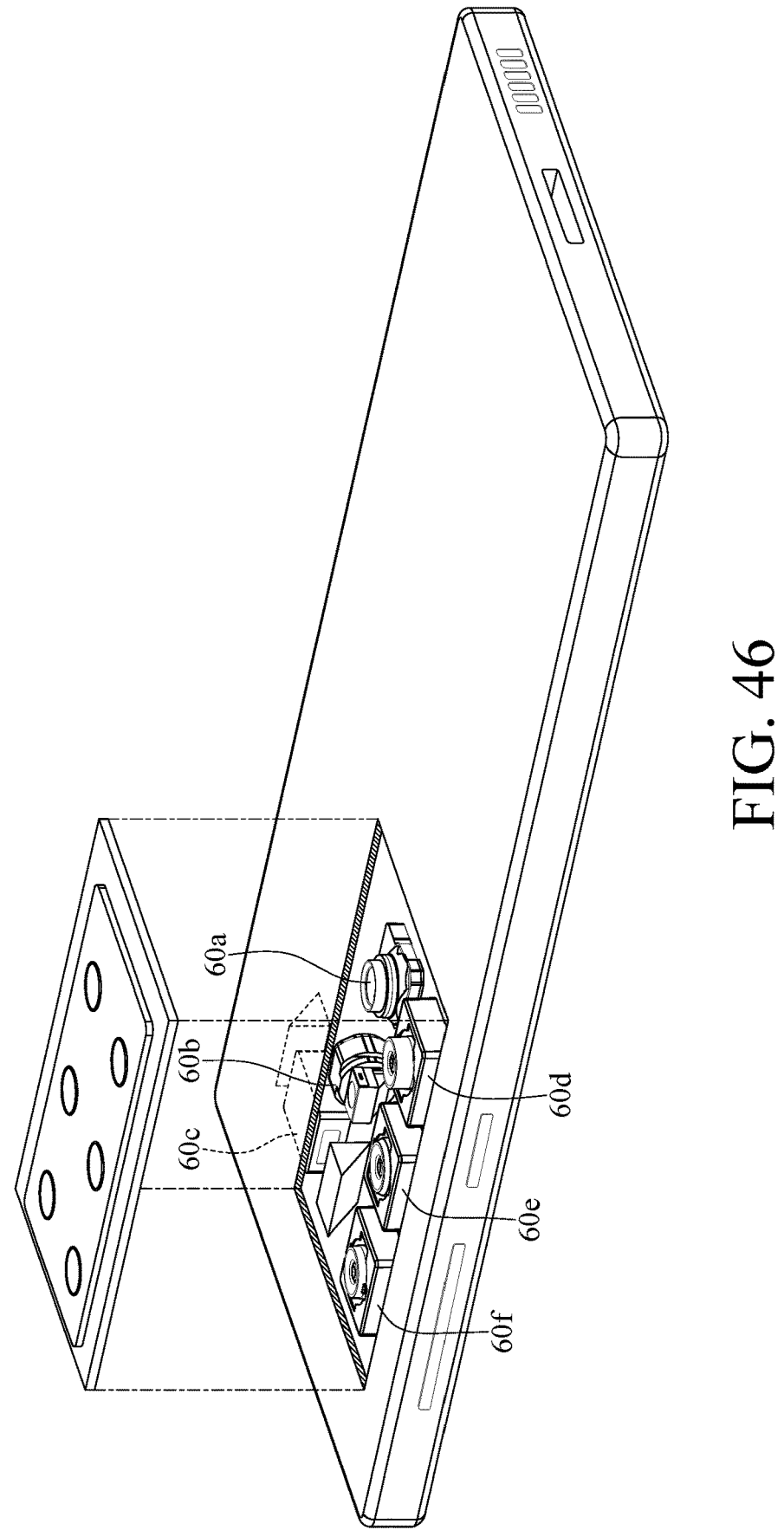
FIG. 46 is an exploded view of an electronic device according to the 6th embodiment of the present disclosure.

Please refer to FIG. 46, which is an exploded view of an electronic device according to the 6th embodiment of the present disclosure.

In this embodiment, an electronic device 6 is a smartphone including an image capturing unit 60*a*, an image capturing unit 60*b*, an image capturing unit 60*c*, an image capturing unit 60*d*, an image capturing unit 60*e*, an image capturing unit 60*f*, a flash module, an image signal processor, a display module and an image software processor (not shown). The image capturing unit 60*a*, the image capturing unit 60*b*, the image capturing unit 60*c*, the image capturing unit 60*d*, the image capturing unit 60*e* and the image capturing unit 60*f* are disposed on the same side of the electronic device 6, and the display module is disposed on the opposite side of the electronic device 6. The image capturing unit 60*a* includes the imaging lens module 1 as disclosed in the 1st embodiment, and the image capturing unit 60*b* includes the imaging lens module 1*e* as disclosed in the 5th embodiment, but the present disclosure is not limited thereto. The image capturing units 60*a* and 60*b* may each include one of the imaging lens modules as disclosed in other embodiments of the present disclosure. Moreover, each of the image capturing units 60*c*, 60*d*, 60*e* and 60*f* may include one of the imaging lens modules as disclosed in the embodiments of the present disclosure.

The image capturing unit 60*a* is an ultra-long-focus telephoto lens module, the image capturing unit 60*b* is an ultra-long-focus telephoto lens module, the image capturing unit 60*c* is an ultra-long-focus telephoto lens module, the image capturing unit 60*d* is a long-focus telephoto lens module, the image capturing unit 60*e* is a wide-angle main lens module, and the image capturing unit 60*f* is an ultra-wide-angle lens module. In this embodiment, the image capturing units 60*a*, 60*b*, 60*c*, 60*d*, 60*e* and 60*f* have different fields of view, such that the electronic device 6 can have various magnification ratios so as to meet the requirement of optical zoom functionality. In addition, the image capturing units 60*a*, 60*b* and 60*c* are ultra-long-focus telephoto lens modules each having a light-folding element configuration, such that it is favorable for the miniaturization of the electronic device 6. In this embodiment, the electronic device 6 includes multiple image capturing units 60*a*, 60*b*, 60*c*, 60*d*, 60*e* and 60*f*, but the present disclosure is not limited to the number and arrangement of image capturing unit. When a user captures images of an object, the light rays converge in the image capturing unit 60*a*, 60*b*, 60*c*, 60*d*, 60*e* or 60*f* to generate an image(s), and the flash module is activated for light supplement. The focus assist module detects the object distance of the imaged object to achieve fast auto focusing. The image signal processor is configured to optimize the captured image to improve image quality and provided zooming function. The light beam emitted from the focus assist module can be either conventional infrared or laser. The display module can be a touch screen or a physical button. The user is able to interact with the display module and the image software processor having multiple functions to capture images and complete image processing. The image processed by the image software processor can be displayed on the display module.

Note that the camera cover plate being separated from the main body of the device shown in FIG. 46 is only for the convenience of showing the lens modules inside the electronic device 6, which does not necessary indicate that the camera cover plate is detachable from the main body, and the present disclosure is not limited thereto.

7th Embodiment

Figure 47:
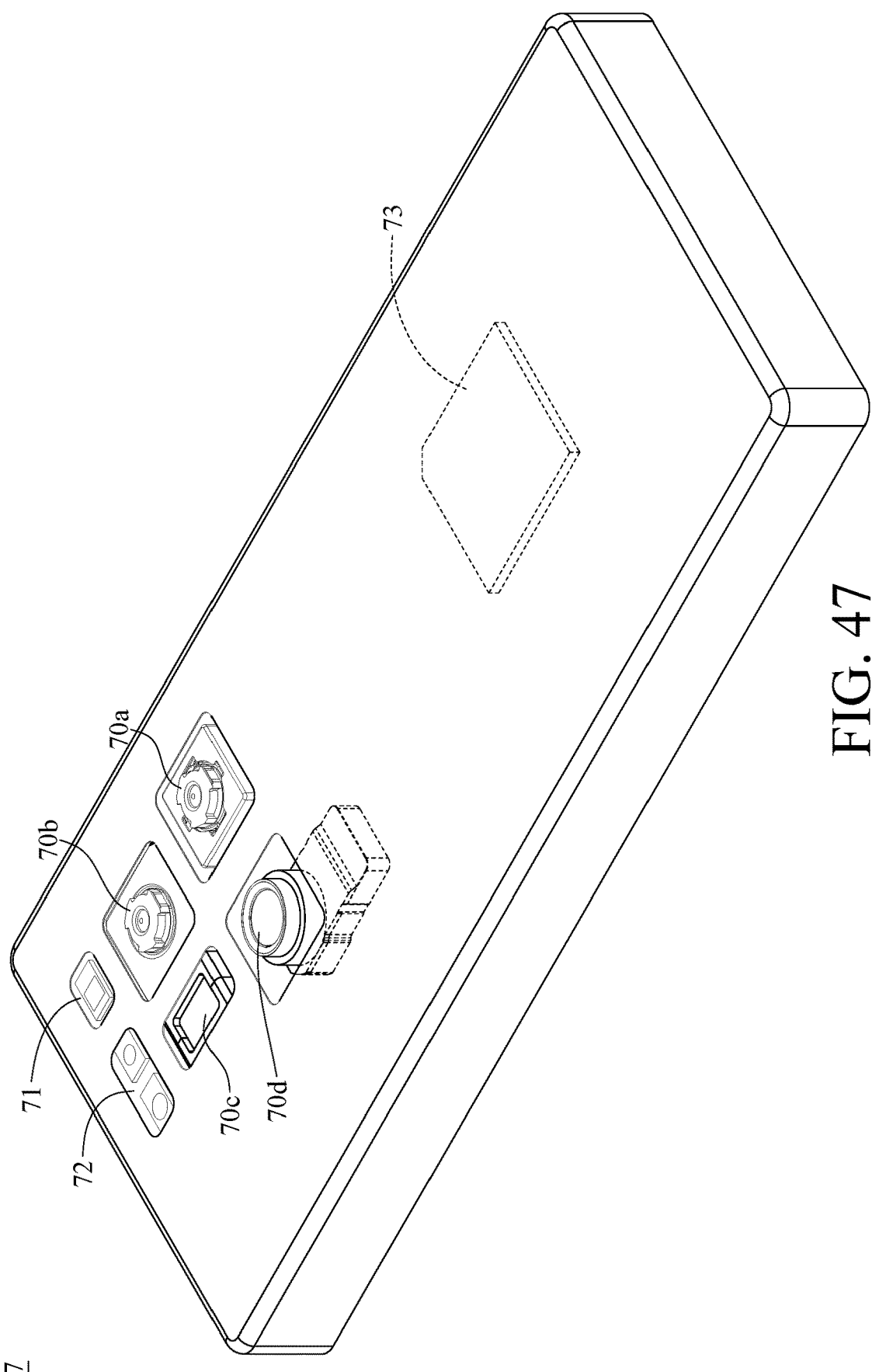
FIG. 47 is one perspective view of an electronic device according to the 7th embodiment of the present disclosure.
Figure 48:
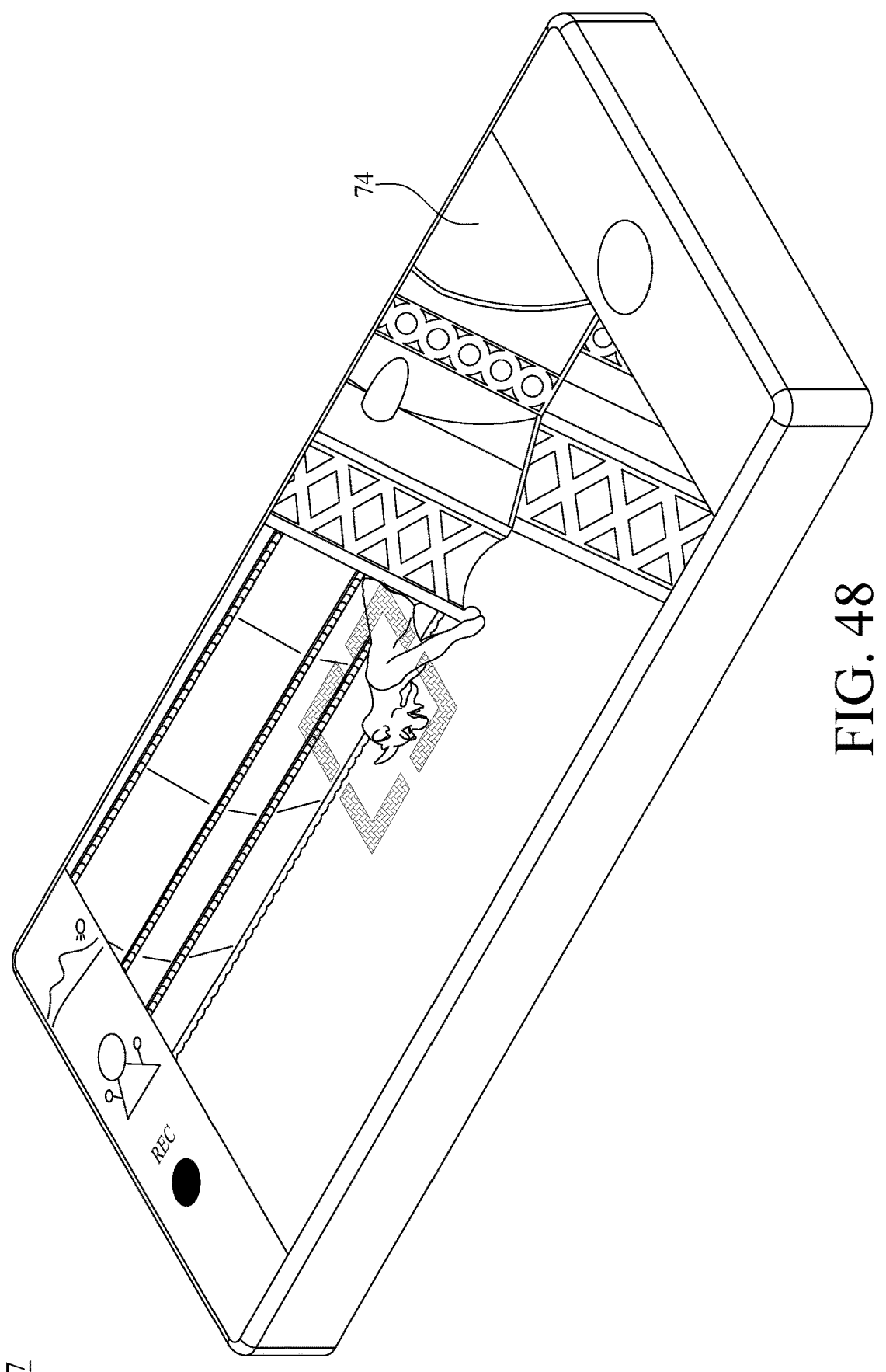
FIG. 48 is another perspective view of the electronic device in FIG. 47.

Please refer to FIG. 47 and FIG. 48. FIG. 47 is one perspective view of an electronic device according to the 7th embodiment of the present disclosure, and FIG. 48 is another perspective view of the electronic device in FIG. 47

In this embodiment, an electronic device 7 is a smartphone including a plurality of image capturing units, a flash module 71, a focus assist module 72, an image signal processor 73, a display module (user interface) 74 and an image software processor (not shown).

The image capturing units include an ultra-wide-angle camera module 70*a*, a high pixel camera module 70*b*, a telephoto camera module 70*c* and a telephoto camera module 70*d*. Moreover, the telephoto camera module 70*d* includes the imaging lens module 1 as disclosed in the 1st embodiment, but the present disclosure is not limited thereto. The telephoto camera module 70*d* may include one of the imaging lens modules as disclosed in other embodiments of the present disclosure. Furthermore, in addition to the telephoto camera module 70*d*, at least one of the image capturing units 70*a*, 70*b* and 70*c* can include one of the imaging lens modules as disclosed in the embodiments of the present disclosure.

Figure 49:
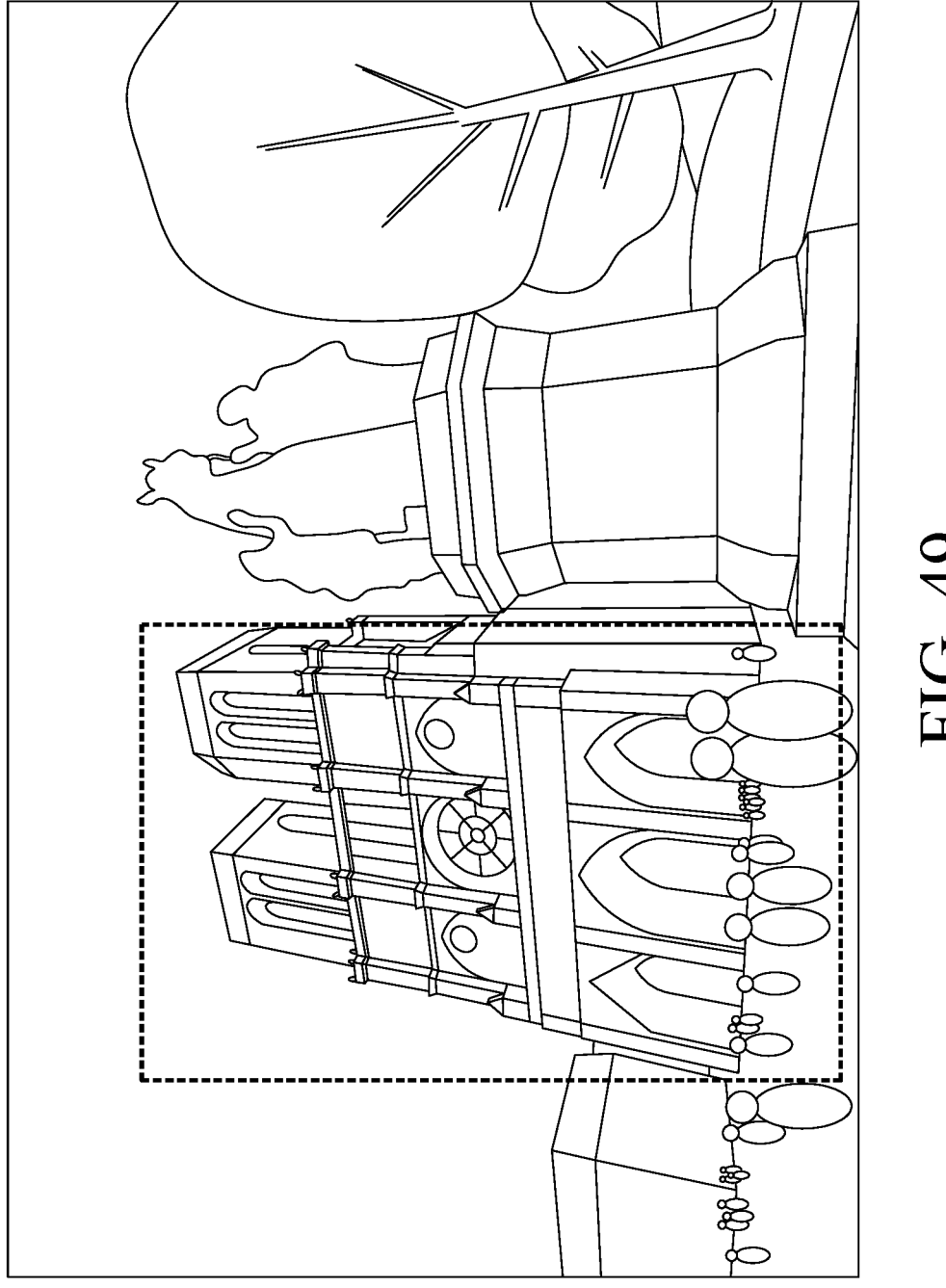
FIG. 49 is an image captured by an ultra-wide-angle camera module.

The image captured by the ultra-wide-angle camera module 70*a* enjoys a feature of multiple imaged objects. FIG. 49 is an image captured by the ultra-wide-angle camera module 70*a*.

Figure 50:
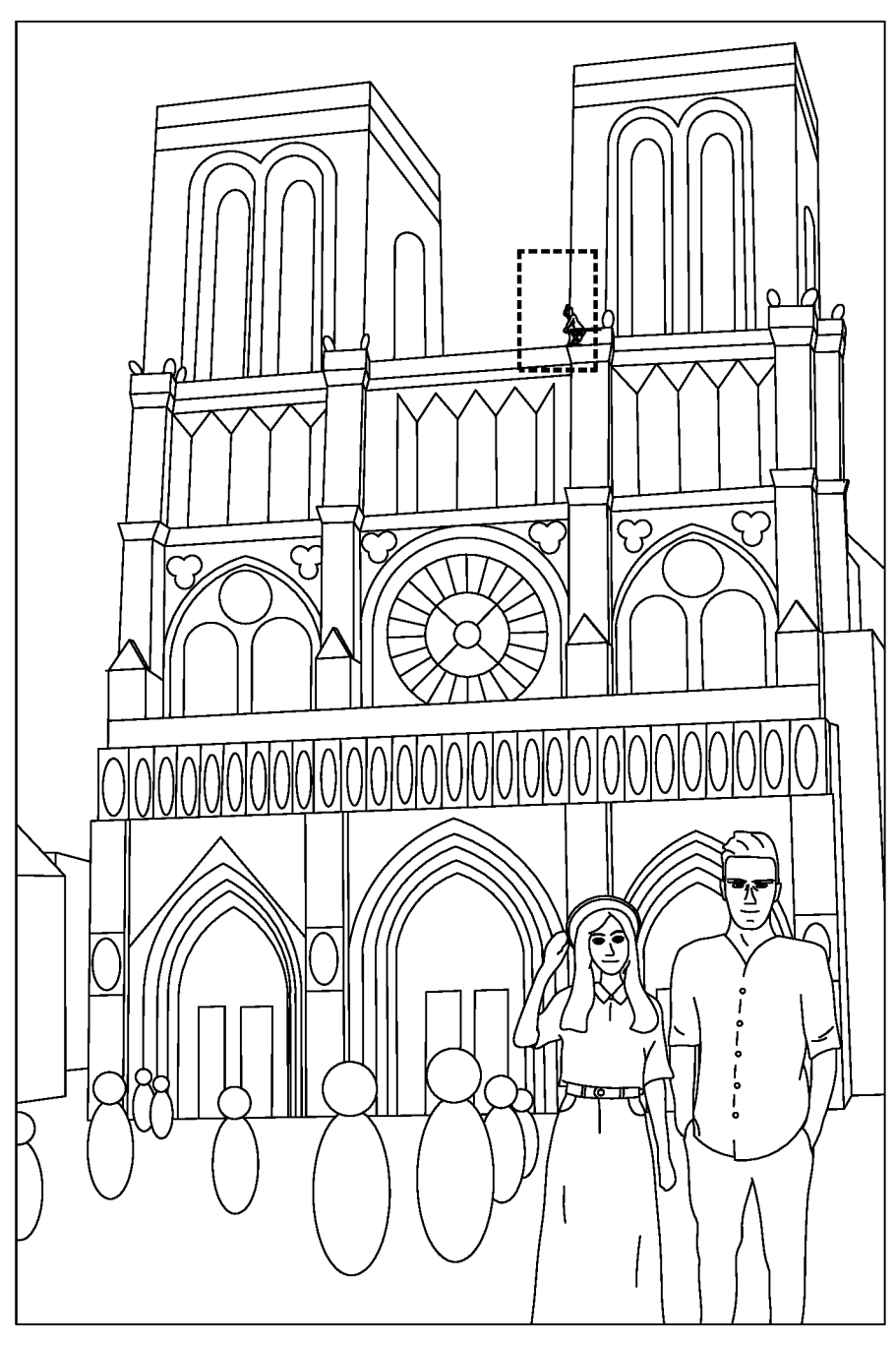
FIG. 50 is an image captured by a high pixel camera module.

The image captured by the high pixel camera module 70*b* enjoys a feature of high resolution and less distortion, and the high pixel camera module 70*b* can capture part of the image in FIG. 49. FIG. 50 is an image captured by the high pixel camera module 70*b*.

Figure 51:
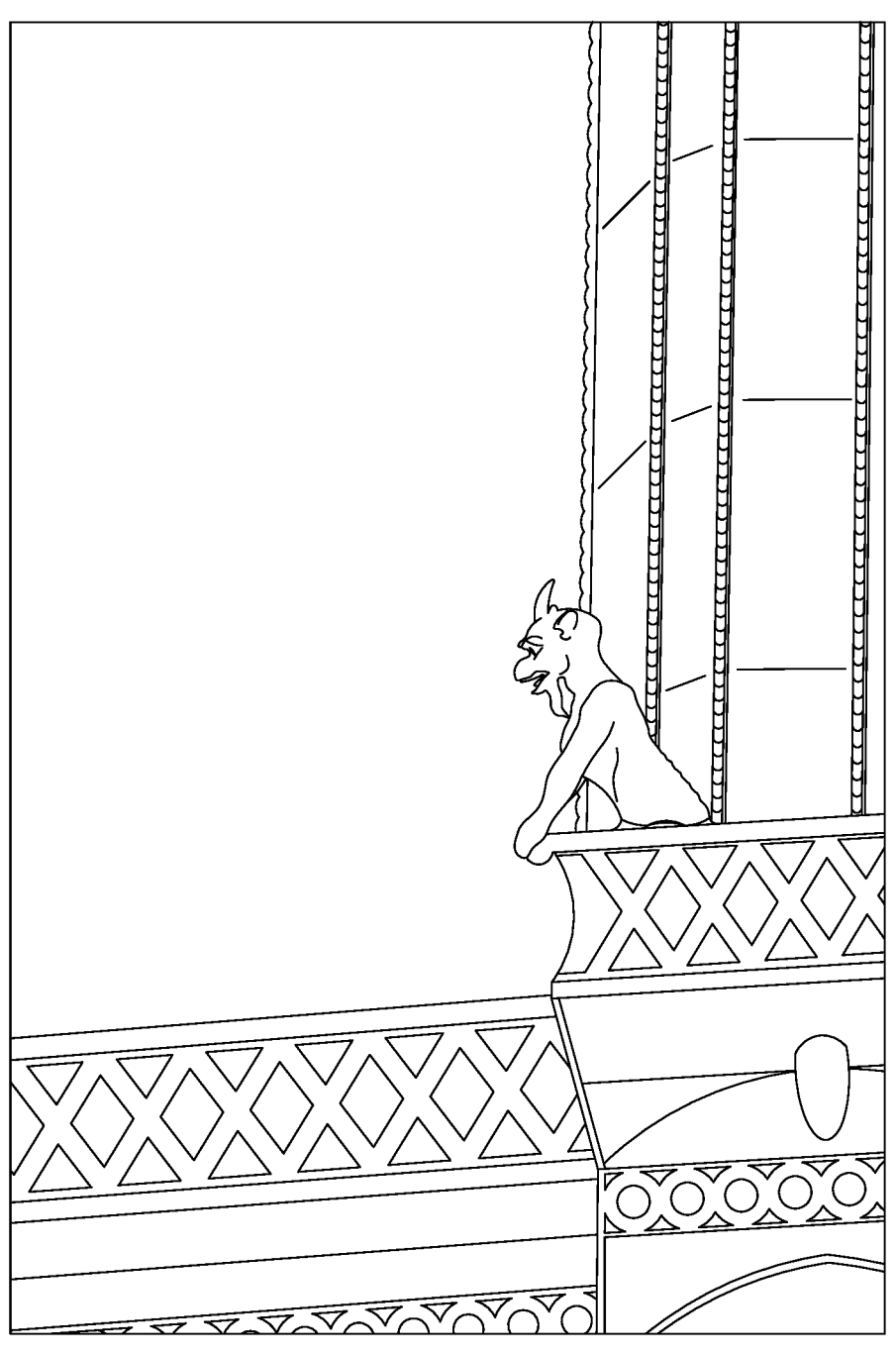
FIG. 51 is an image captured by a telephoto camera module.

The image captured by the telephoto camera module 70*c* and the telephoto camera module 70*d* enjoys a feature of high optical magnification, and the telephoto camera module 70*c* or the telephoto camera module 70*d* can capture part of the image in FIG. 50. FIG. 51 is an image captured by the telephoto camera module 70*c* or the telephoto camera module 70*d*. The maximum field of view of the camera module corresponds to the field of view in FIG. 51.

When a user captures images of an object, the light rays converge in the ultra-wide-angle camera module 70a, the high pixel camera module 70b, the telephoto camera module 70c or the telephoto camera module 70d to generate images, and the flash module 71 is activated for light supplement. The focus assist module 72 detects the object distance of the imaged object to achieve fast auto focusing. The image signal processor 73 is configured to optimize the captured image to improve image quality and provided zooming function. The light beam emitted from the focus assist module 72 can be either conventional infrared or laser. The display module 74 can include a touch screen, and the user is able to interact with the display module 74 to adjust the angle of view and switch between different image capturing units, and the image software processor having multiple functions to capture images and complete image processing. Alternatively, the user may capture images via a physical button. The image processed by the image software processor can be displayed on the display module 74.

The smartphones in the embodiments are only exemplary for showing the imaging lens module of the present disclosure installed in an electronic device, and the present disclosure is not limited thereto. The imaging lens module can be optionally applied to optical systems with a movable focus. Furthermore, the imaging lens module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module comprising:
an optical element holder being one-piece formed, wherein each of two side surfaces of the optical element holder has a light through hole, light passes through the optical element holder via the light through holes, and the optical element holder comprises a lens element accommodation portion and a folding component accommodation portion;
at least one lens element disposed in the lens element accommodation portion, and the light passing through the at least one lens element;
a light folding component disposed in the folding component accommodation portion and corresponding to the at least one lens element, and the light folding component comprising:
a light receive surface, the light entering the light folding component from the light receive surface;

a first reflection surface configured to reflect the light coming from the light receive surface so as to redirect the light; and
a light exit surface, the light exiting the light folding component from the light exit surface; and
a first retaining element having at least one corresponsive surface, wherein the at least one corresponsive surface is in physical contact with the light folding component;
wherein the at least one lens element is in physical contact with the lens element accommodation portion;
wherein the light through holes are parallel to each other and a length of the folding component accommodation portion is greater than a length of the lens element accommodation portion in a direction parallel to the light through holes.

2. The imaging lens module of claim 1, further comprising an alignment structure, wherein the alignment structure is disposed on the folding component accommodation portion, the alignment structure has at least one contact surface, and the at least one contact surface is in physical contact with the light folding component.

3. The imaging lens module of claim 1, wherein the first retaining element comprises a first recess, an adhesive is disposed in the first recess, and the first retaining element and the folding component accommodation portion are fixed to each other via the adhesive.

4. The imaging lens module of claim 1, wherein the folding component accommodation portion comprises a second recess, an adhesive is disposed in the second recess, and the folding component accommodation portion and the light folding component are fixed to each other via the adhesive.

5. The imaging lens module of claim 1, wherein the light folding component further comprises a light shielding layer;
wherein a light transmission rate of the light shielding layer is T %, and the following condition is satisfied:

$$T\% \leq 0.2\%.$$

6. The imaging lens module of claim 1, wherein at least one of the light receive surface, the first reflection surface and the light exit surface is a freeform surface.

7. The imaging lens module of claim 1, wherein the light folding component further comprises a second reflection surface, and the second reflection surface is configured to reflect the light coming from the first reflection surface.

8. The imaging lens module of claim 7, wherein the second reflection surface and the first reflection surface are disposed parallel to each other.

9. The imaging lens module of claim 7, wherein the light in the light folding component undergoes at least one total internal reflection.

10. The imaging lens module of claim 7, wherein the light folding component is a prism which is one-piece formed.

11. The imaging lens module of claim 7, wherein the light folding component is a combination of a plurality of prisms.

12. The imaging lens module of claim 7, wherein the light folding component further comprises a light shielding structure, and an area of a light passing region in the light folding component is reduced by the light shielding structure.

13. The imaging lens module of claim 12, wherein the light shielding structure is disposed between the first reflection surface and the second reflection surface.

14. The imaging lens module of claim 12, wherein the light shielding structure has a convex-concave structure, such that the light shielding structure has an undulating shape.

15. The imaging lens module of claim 1, further comprising an image surface, wherein the lens element accommodation portion is at a constant distance from the image surface.

16. The imaging lens module of claim 1, further comprising a second retaining element, wherein the second retaining element supports and is in physical contact with the at least one lens element, such that the at least one lens element is fixed to the lens element accommodation portion.

17. The imaging lens module of claim 1, wherein an anti-reflection layer is disposed on at least one of the light receive surface and the light exit surface.

18. An imaging lens module comprising:
an optical element holder being one-piece formed, wherein each of two side surfaces of the optical element holder has a light through hole, light passes through the optical element holder via the light through holes, and the optical element holder comprises a lens element accommodation portion and a folding component accommodation portion;
at least one lens element disposed in the lens element accommodation portion, and the light passing through the at least one lens element;
a light folding component disposed in the folding component accommodation portion and corresponding to the at least one lens element, and the light folding component comprising:
a light receive surface, the light entering the light folding component from the light receive surface;
a first reflection surface configured to reflect the light coming from the light receive surface so as to redirect the light; and
a light exit surface, the light exiting the light folding component from the light exit surface; and
an alignment structure disposed on the folding component accommodation portion, and the alignment structure has at least one contact surface in physical contact with the light folding component;
wherein the at least one lens element is in physical contact with the lens element accommodation portion;
wherein the light through holes are parallel to each other and a length of the folding component accommodation portion is greater than a length of the lens element accommodation portion in a direction parallel to the light through holes.

19. The imaging lens module of claim 18, wherein the folding component accommodation portion comprises a second recess, an adhesive is disposed in the second recess, and the folding component accommodation portion and the light folding component are fixed to each other via the adhesive.

20. The imaging lens module of claim 18, wherein the light folding component further comprises a light shielding layer;
wherein a light transmission rate of the light shielding layer is T %, and the following condition is satisfied:

$$T\% \ 0.2\%.$$

21. The imaging lens module of claim 18, wherein at least one of the light receive surface, the first reflection surface and the light exit surface is a freeform surface.

22. The imaging lens module of claim 18, wherein the light folding component further comprises a second reflection surface, and the second reflection surface is configured to reflect the light coming from the first reflection surface.

23. The imaging lens module of claim 22, wherein the second reflection surface and the first reflection surface are disposed parallel to each other.

24. The imaging lens module of claim 22, wherein the light in the light folding component undergoes at least one total internal reflection.

25. The imaging lens module of claim 22, wherein the light folding component is a prism which is one-piece formed.

26. The imaging lens module of claim 22, wherein the light folding component is a combination of a plurality of prisms.

27. The imaging lens module of claim 22, wherein the light folding component further comprises a light shielding structure, and an area of a light passing region in the light folding component is reduced by the light shielding structure.

28. The imaging lens module of claim 27, wherein the light shielding structure is disposed between the first reflection surface and the second reflection surface.

29. The imaging lens module of claim 27, wherein the light shielding structure has a convex-concave structure, such that the light shielding structure has an undulating shape.

30. The imaging lens module of claim 18, further comprising an image surface, wherein the lens element accommodation portion is at a constant distance from the image surface.

31. The imaging lens module of claim 18, wherein an anti-reflection layer is disposed on at least one of the light receive surface and the light exit surface.

32. An electronic device comprising:
the imaging lens module of claim 1.

33. An electronic device comprising:
the imaging lens module of claim 18.

* * * * *